(12) United States Patent
Kato

(10) Patent No.: US 8,794,608 B2
(45) Date of Patent: Aug. 5, 2014

(54) VIBRATION ISOLATION APPARATUS

(75) Inventor: Hironori Kato, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 259 days.

(21) Appl. No.: 13/314,535

(22) Filed: Dec. 8, 2011

(65) Prior Publication Data
US 2012/0146270 A1    Jun. 14, 2012

(30) Foreign Application Priority Data
Dec. 9, 2010   (JP) ................................ 2010-275159

(51) Int. Cl.
*B60G 11/22* (2006.01)
*F16F 1/38* (2006.01)
*F16M 1/00* (2006.01)

(52) U.S. Cl.
CPC .................................. *F16F 1/3849* (2013.01)
USPC ..................... 267/292; 267/140.2; 267/141.3; 267/141.7

(58) Field of Classification Search
USPC .............. 267/136, 140.12, 140.4, 141, 141.2, 267/141.3, 141.4, 141.5, 292, 293, 141.7; 248/560, 293
See application file for complete search history.

(56) References Cited

U.S. PATENT DOCUMENTS

| | | | | |
|---|---|---|---|---|
| 4,858,899 | A * | 8/1989 | Saotome et al. | 267/219 |
| 5,290,018 | A * | 3/1994 | Watanabe et al. | 267/293 |
| 7,252,298 | B2 * | 8/2007 | Hughes | 280/124.128 |
| 8,087,647 | B2 * | 1/2012 | Endo | 267/140.12 |
| 2009/0174126 | A1 * | 7/2009 | Takeshima et al. | 267/140.4 |
| 2012/0049426 | A1 * | 3/2012 | Sakata | 267/141 |
| 2012/0146271 | A1 * | 6/2012 | Kato et al. | 267/293 |
| 2012/0319337 | A1 * | 12/2012 | Kato et al. | 267/141 |

FOREIGN PATENT DOCUMENTS

| | | |
|---|---|---|
| JP | 8-192442 A | 7/1996 |
| JP | 8-192443 A | 7/1996 |
| WO | 2011/114784 A1 | 9/2011 |

OTHER PUBLICATIONS

English Machine Translation of WO-2011114784 equivalent.*
Extended European Search Report mailed Feb. 22, 2012, issued in corresponding European Patent Application No. 11192299.3 (5 pages).

* cited by examiner

*Primary Examiner* — Melody Burch
(74) *Attorney, Agent, or Firm* — Westerman, Hattori, Daniels & Adrian, LLP

(57) ABSTRACT

To provide a vibration isolation apparatus which prevents a vibration isolation leg from being pushed by a resin material injected in a resin molding process and to prevent generation of resin burrs. Because a rubber notch is formed in a first molding product, when the first molding product is placed in a resin mold in an insert molding process, the pressure of the flowing resin material injected in the resin mold through the injection gate can be relieved and thus first wall covering rubber parts may be less pushed by the resin material. This reduces positional deviation of a vibration isolation leg and sealing errors caused by deformation of the first wall covering rubber parts, and thus generation of resin burrs can be suppressed.

5 Claims, 38 Drawing Sheets

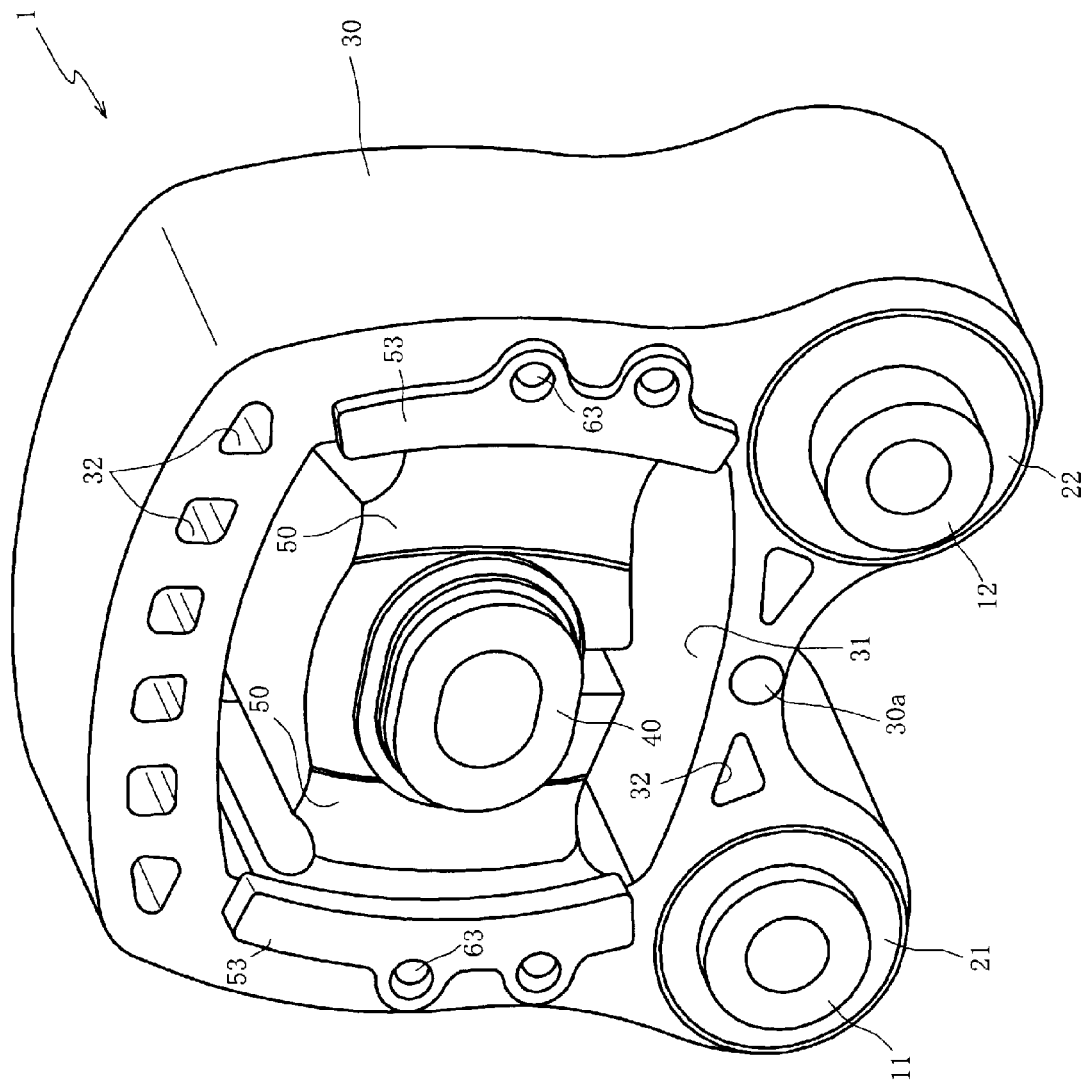
FIG. 1
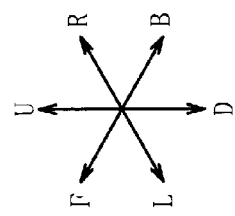

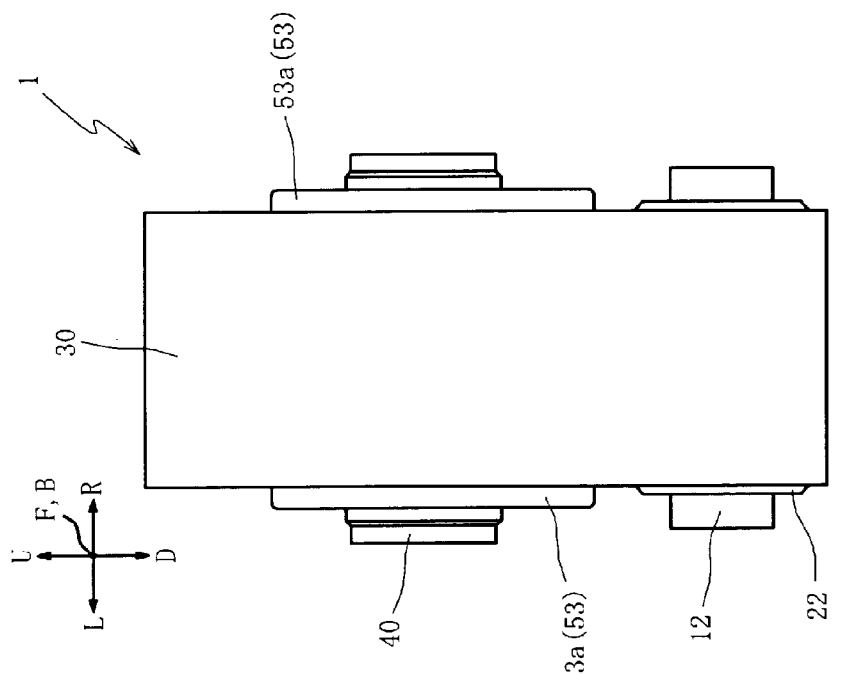
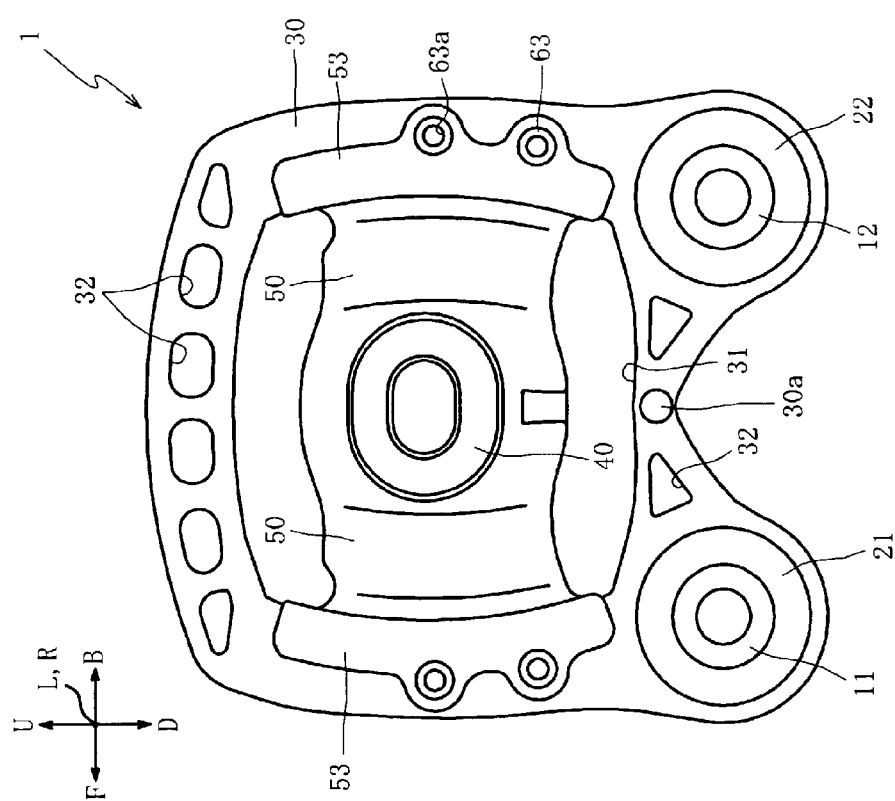
FIG. 2B
FIG. 2A

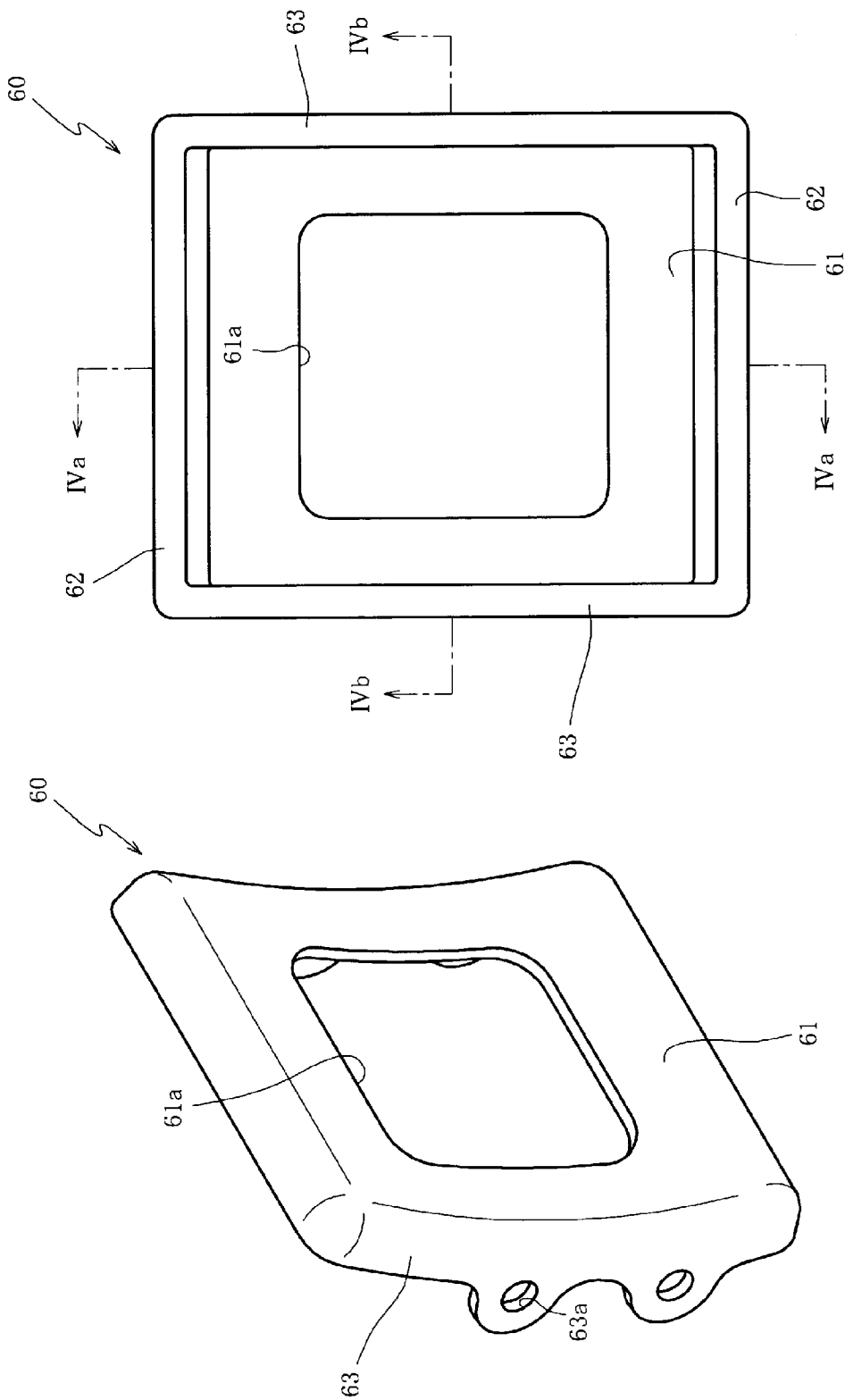

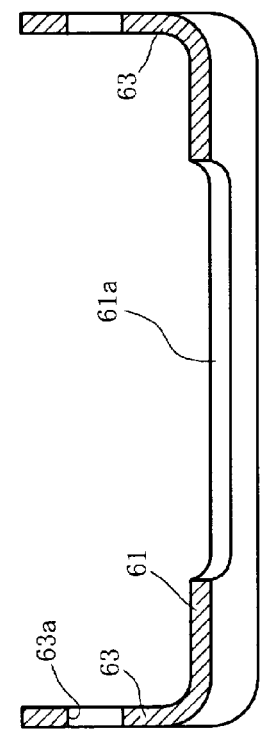
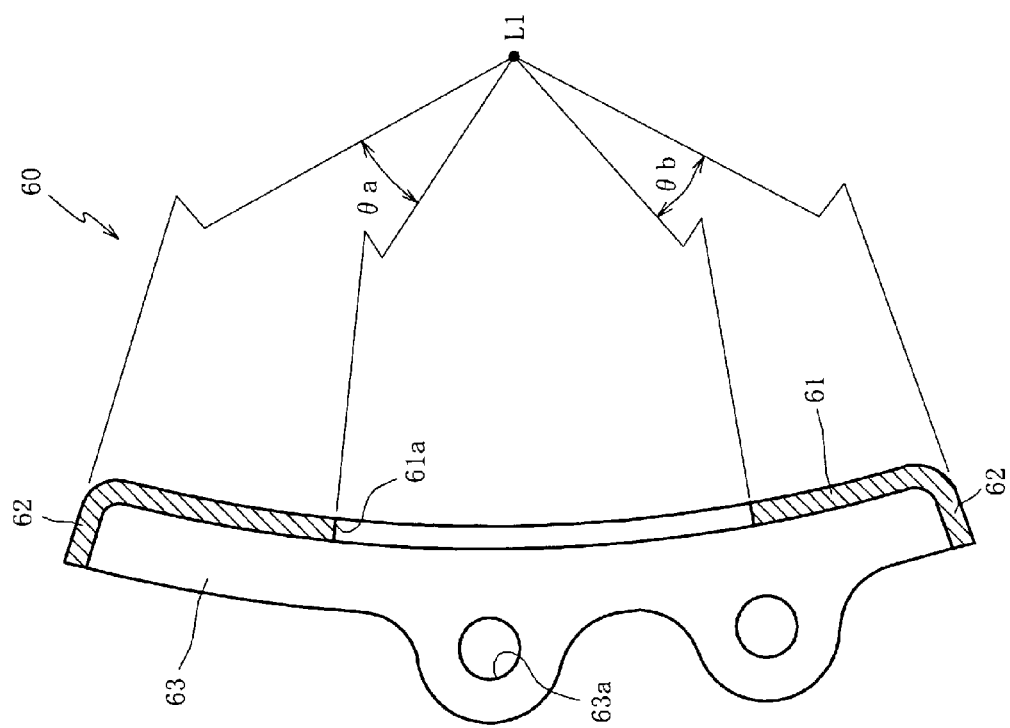
FIG. 4B
FIG. 4A

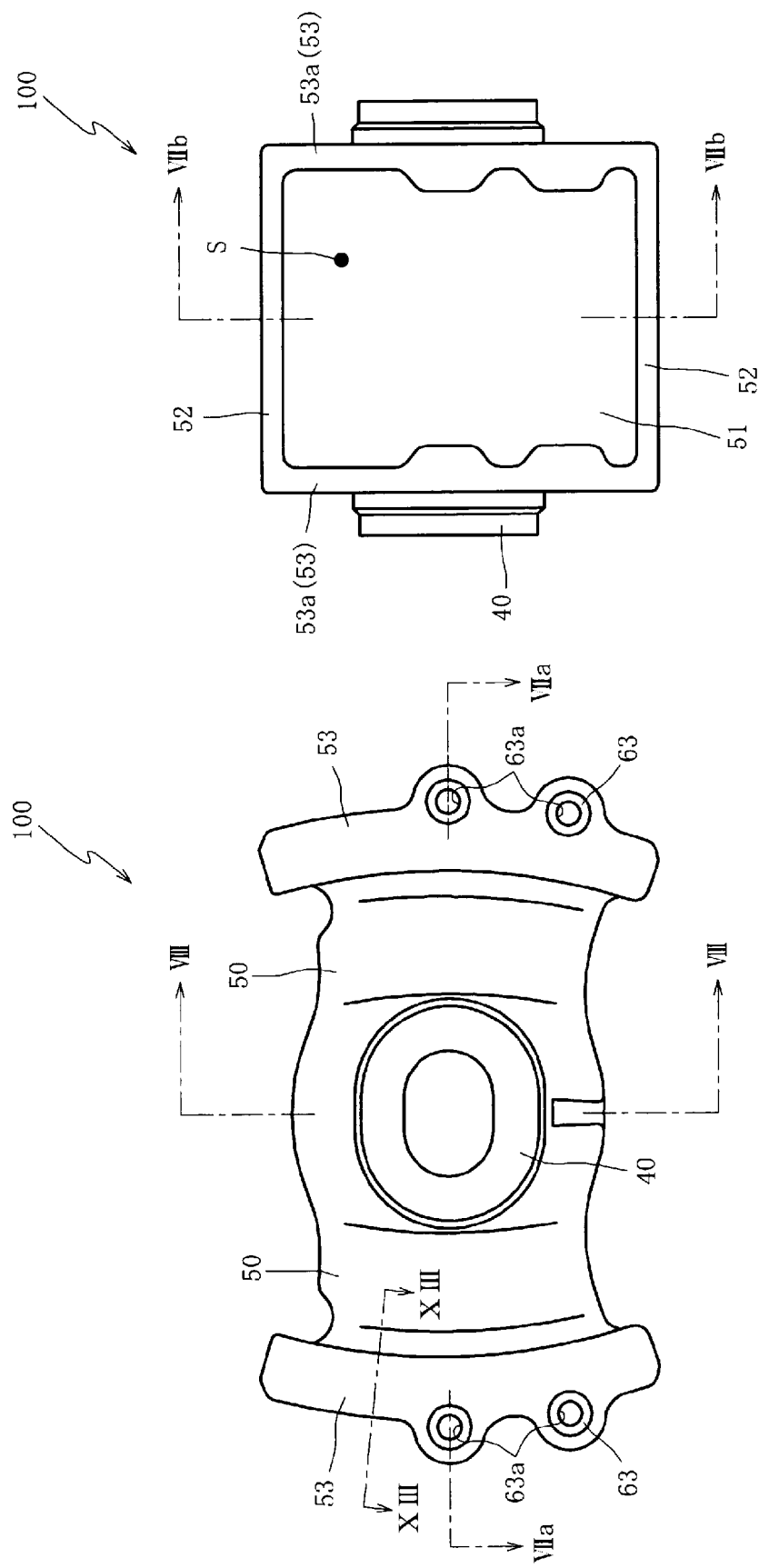

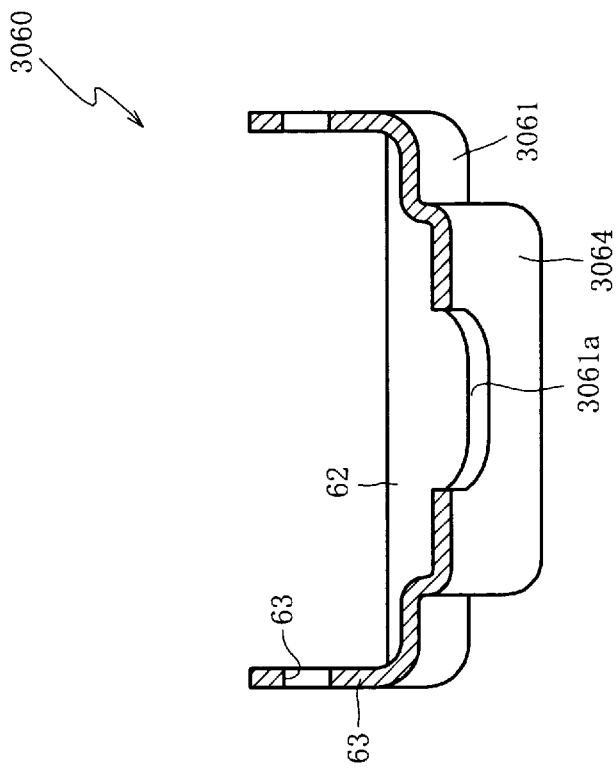
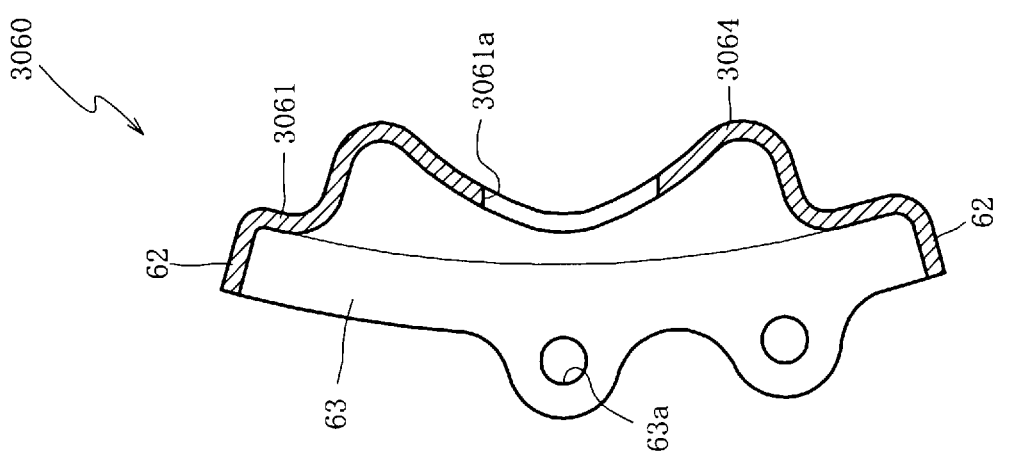
FIG. 21B
FIG. 21A

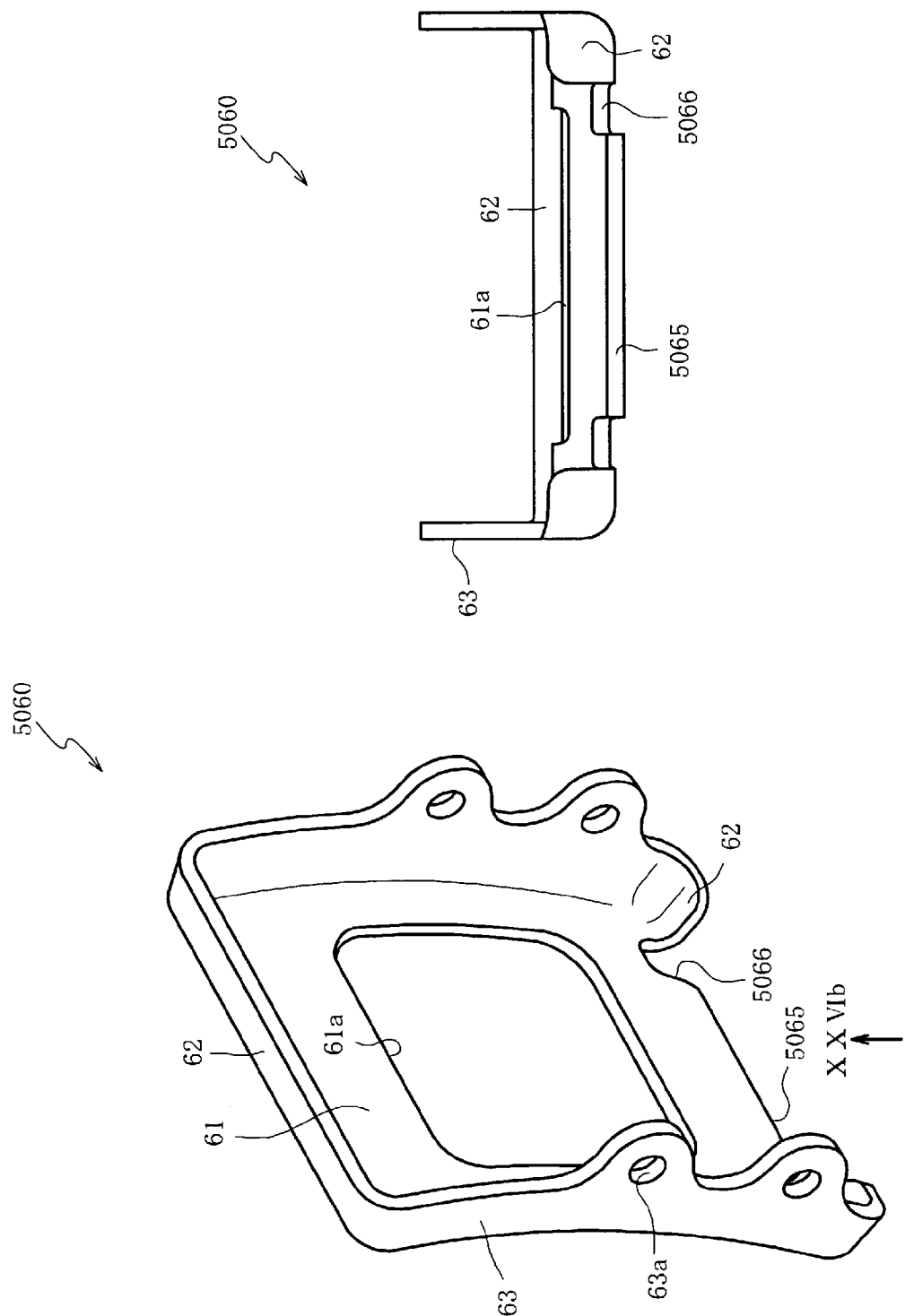

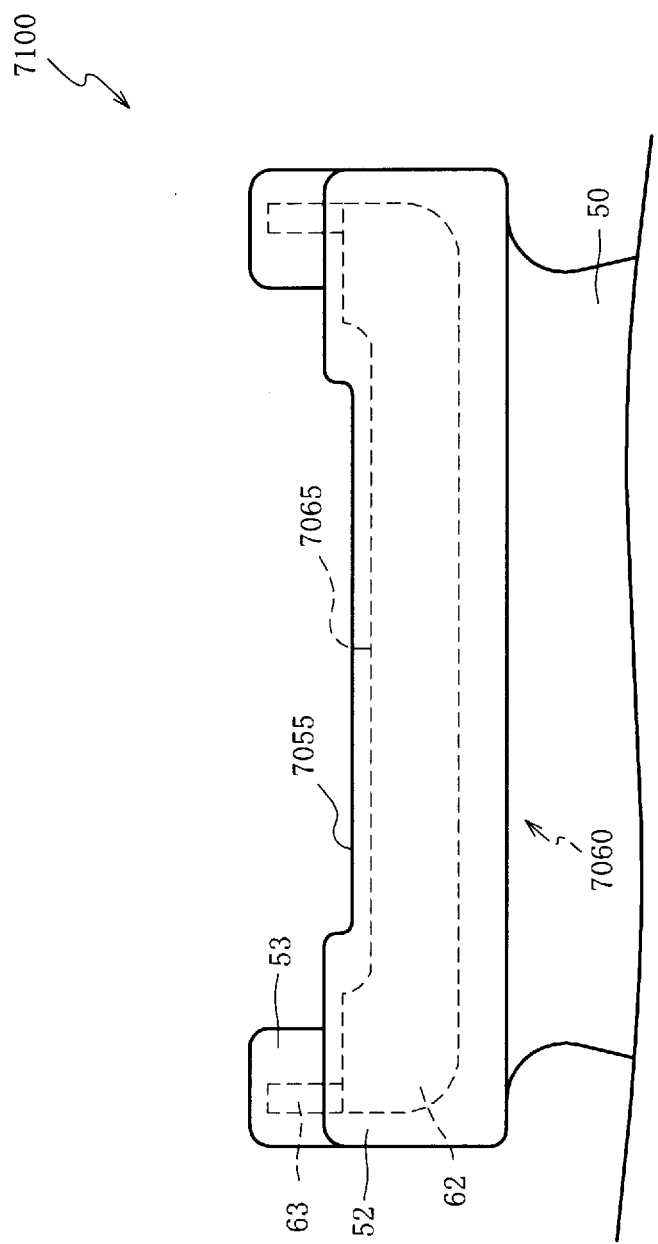

VIBRATION ISOLATION APPARATUS

CLAIM OF PRIORITY

The present application claims of priority from Japanese patent application JP 2010-275159 filed on Dec. 9, 2011, the content of which is hereby incorporated by reference into this application.

FIELD OF THE INVENTION

The present invention relates to a vibration isolation apparatus in which a vibration isolation leg formed of a rubber-like elastic material is inserted in a bracket member formed of a resin material by insert molding in a state where a portion of the vibration isolation leg protrudes from the outer surface of the bracket member, and more particularly, to a vibration isolation apparatus configured to prevent a vibration isolation leg from being pushed by a resin material injected in a resin molding process and prevent generation of resin burrs.

BACKGROUND OF THE INVENTION

For example, an example of known vibration isolation apparatuses is configured as follows: an inner hole is formed in a bracket member attached to a vehicle body; an internal cylinder member disposed in the inner hole of the bracket member is attached to a vibration source (such as an engine, a motor, and a transmission); and the inner surface of the inner hole and the outer surface of the internal cylinder member are connected through a vibration isolation leg formed of a rubber-like elastic material.

In recent years, it has been tried to form the bracket member using a resin for weight and cost reduction. For example, JP-A-Hei 8 (1996)-192442 (refer to FIG. 1, paragraphs [0013] and [0014]) discloses a resin bracket vibration isolation apparatus (vibration isolation apparatus) including: an elastic vibration isolation body 10 formed by sticking out an elastic column 16 (vibration isolation leg) from a rigid internal cylinder 14 (internal cylinder member) and bonding a rigid plate 18 (outer member) having an outer circumference greater than the elastic column 16 to an outer end of the elastic column 16; and a bracket 12 (bracket member) formed of a resin material and in which the elastic vibration isolation body 10 is inserted by insert molding.

SUMMARY OF THE INVENTION

However, in the case of such a vibration isolation apparatus of the related art, when an opponent member connected to the internal cylinder member is moved in a direction toward the bracket member, it is impossible to restrict the movement of the opponent member. Thus, the opponent member and the bracket member may collide with each other and be damaged.

Therefore, the applicant of the present invention made a portion of a vibration isolation leg protrude from the outer surface of a bracket member to use the protruded portion (covering rubber part) as a stopper member. Then, an opponent member could be elastically received while absorbing shock, and thus the opponent member and the bracket member could be protected (this is not known when the present application is filed).

Next, an explanation will be given of a method for manufacturing such a vibration isolation apparatus with reference to FIGS. 36 to 38. FIG. 36A is a front view illustrating a vibration isolation apparatus A001, and FIG. 36B is a side view illustrating the vibration isolation apparatus A001.

As shown in FIGS. 36A and 36B, the vibration isolation apparatus A001 mainly includes: a bracket member A030 formed of a resin material; an internal cylinder member A040 disposed in an inner hole A031 formed in the bracket member A030; a pair of vibration isolation legs A050 formed of a rubber-like elastic material, the vibration isolation legs A050 including ends connected to the internal cylinder member A040 and the other ends inserted in the inner surface of the inner hole A031 of the bracket member A030 by insert molding; and a pair of outer members A060 (refer to FIG. 37) buried in the other ends of the vibration isolation legs A050.

Covering rubber parts A053 are formed on the other ends of the vibration isolation legs A050 to cover the outer members A060. The covering rubber parts A053 function as stopper members and protrude from the outer surface of the bracket member A030 in an axis direction of the internal cylinder member A040. That is, movement of an opponent part can be restricted as the opponent part makes contact with the covering rubber parts A053.

FIG. 37 is a sectional view illustrating a rubber vulcanization mold A300 which is closed, and FIG. 38 is a sectional view illustrating a resin mold A400 which is closed. FIGS. 37 and 38 are sectional views corresponding to sections taken along line XXXVII-XXXVII of FIG. 36A. The vibration isolation apparatus A001 is manufactured as follows. First, the internal cylinder member A040 and the outer members A060 are placed in a lower mold A301 of the rubber vulcanization mold A300, and after placing middle molds A303 at predetermined positions of the lower mold A301, an upper mold A302 is moved down to close the rubber vulcanization mold A300. Then, as shown in FIG. 37, a cavity having a predetermined shape is formed in the rubber vulcanization mold A300, and a rubber-like elastic material is injected in the cavity through an injection gate (not shown) and is vulcanized (into the vibration isolation legs A050 and the Covering rubber parts A053). In this way, a first molding product A100 (refer to FIG. 38) is formed.

Next, the first molding product A100 is placed in a lower mold A401 of the resin mold A400, and an upper mold A402 is lower to close the resin mold A400. Then, as shown in FIG. 38, a cavity having a predetermined shape is formed in the resin mold A400, and a resin material is injected in the cavity through an injection gate (not shown) and is hardened. In this way, the other ends of the vibration isolation legs A050 are inserted in the bracket member A030. In this way, the vibration isolation apparatus A001 is manufactured.

In this case, the outer members A060 are formed in a shape (container shape) in which four extension wall parts A062 extend from outer edges of a base plate part A061 having a rectangular front shape in a state where the four extension wall parts A062 are connected along the periphery of the base plate part A061, so as to prevent the vibration isolation legs A050 from separating from the bracket member A030 and receive a load when the covering rubber parts A053 functions as stopper members. Therefore, the first molding product A100 is accordingly formed. Therefore, in a resin molding process using the resin molding die A400, if a resin material is injected through an injection gate A030a (refer to FIG. 36A) and flows in the circumferential direction of the bracket member A030 (refer to FIG. 30), since portions corresponding to the extension wall parts A062 are pushed by the resin material, the position of the first molding product A100 may be deviated or the covering rubber parts A053 may be deformed, and thus sealing errors may occur. Therefore, resin burrs may be formed in the vicinity of the covering rubber parts A053, and thus elastic stopper functions of the covering rubber parts A053 may be decreased.

The present invention has been made in an effort to provide a vibration isolation apparatus in which a vibration isolation leg formed of a rubber-like elastic material is inserted in a bracket member formed of a resin material by insert molding in a state where a portion of the vibration isolation leg protrudes from the outer surface of the bracket member, for preventing the vibration isolation leg from being pushed by a resin material injected in a resin molding process and thus to prevent generation of resin burrs.

According to an embodiment of the present invention, there is provided a vibration isolation apparatus including: an internal cylinder member attached to a vibration source or a vehicle body; a bracket member formed of a resin material and comprising an inner hole in which the internal cylinder member is disposed, the bracket member being attached to the other of the vibration source and the vehicle body; a pair of vibration isolation legs formed of a rubber-like elastic material, the vibration isolation legs comprising ends connected to an outer surface of the internal cylinder member and the other ends connected to an inner surface of the inner hole of the bracket member by insert molding; and a pair of outer members formed of a metal material and buried respectively in the other ends of the vibration isolation legs. The vibration isolation legs and the outer members are symmetrically arranged with the internal cylinder member being disposed therebetween, and an injection gate for injecting the resin material of the bracket member is disposed at a position spaced the same distance from the vibration isolation legs and the outer members. Each of the outer members includes: a base plate part to which the other end of the vibration isolation leg is connected by vulcanization adhesion; and plate-shaped extension wall parts extending from outer edges of the base plate part toward the bracket member for being buried in the bracket member for engagement with the bracket member. Each of the vibration isolation legs includes: a base plate covering rubber part that covers the base plate part; and wall covering rubber parts extending from the base plate covering rubber part and covering the extension wall parts in a state where at least a portion of the wall covering rubber parts protrude from an outer surface of the bracket member, wherein a portion of the bracket member is fitted in a space surrounded by the base plate covering rubber part and the wall covering rubber parts. A notch is formed in at least portions of the extension wall parts of the outer member and the wall covering rubber parts of the vibration isolation leg that are close to the injection gate.

According to a first embodiment of the present invention, in the vibration isolation apparatus, an end of the vibration isolation leg is connected to the internal cylinder member disposed in the inner hole of the bracket member; the other end of the vibration isolation leg connected to the base plate part of the outer member formed of a metal material by vulcanization adhesion; and the extension wall parts of the outer member are engaged with the bracket member to connect the other end of the vibration isolation leg to the inner surface of the inner hole of the bracket member. Therefore, the internal cylinder member can be supported by the vibration isolation leg and the outer member in a state where the internal cylinder member can be moved relative to the inner surface of the inner hole of the bracket member.

Further, the outer member includes: a base plate part to which the other end of the vibration isolation leg is connected by vulcanization adhesion; and plate-shaped extension wall parts extending from outer edges of the base plate part toward the bracket member for being buried in the bracket member for engagement with the bracket member. The vibration isolation leg includes: a base plate covering rubber part that covers the base plate part; and wall covering rubber parts extending from the base plate covering rubber part and covering the extension wall parts in a state where at least a portion of the wall covering rubber parts protrude from an outer surface of the bracket member. A portion of the bracket member is fitted in a space surrounded by the base plate covering rubber part and the wall covering rubber parts. Therefore, separation of the other end of the vibration isolation leg from the bracket member can be prevented.

In addition, since at least portions of the wall covering rubber parts protrude from the outer surface of the bracket member, if an opponent member connected to the internal cylinder member is moved toward the bracket member, portions of the wall covering rubber parts can function as stoppers to elastically receive the opponent member while absorbing shock. In addition, since the extension wall parts are buried in the wall covering rubber parts, the extension wall parts can receive a load when the opponent member is brought into contact with the wall covering rubber parts, and thus movement of the opponent member can be surely restricted.

In this case, since notches are formed in at least portions of the extension wall parts of the outer member and the wall covering rubber parts of the vibration isolation leg that are close to the injection gate, when the vibration isolation leg is placed in the resin mold in an insert molding process, the pressure of a resin material injected into the resin mold through the injection gate can re released through the notches. Therefore, the extension wall parts (wall covering rubber parts) can be less pushed by the resin material. This reduces positional deviation of the vibration isolation leg and sealing errors caused by deformation of the wall covering rubber parts, and thus generation of resin burrs can be suppressed in the vicinity of the wall covering rubber parts. As a result, the elastic stopper function of the wall covering rubber parts can be ensured.

Furthermore, as described above, since flows of the resin material are less disturbed owing to the notches, the fluidity of the resin material can be improved, and thus, the injection pressure of the resin material can be reduced.

In the vibration isolation apparatus of the first embodiment of the present invention, the base plate part of the outer member may have a rectangular front shape, four extension wall parts may extend from four sides of the base plate part toward the bracket member in a state where the four extension wall parts are connected along a periphery of the base plate part, and mutually facing two sides of the base plate part may be parallel with a circumferential direction of the inner hole of the bracket member, wherein the notch may be formed as a depression portion in one of the extension wall parts close to the injection gate and one of the wall covering rubber parts covering the extension wall part in a manner such that at least both end portions of the extension wall part adjoining two extension wall parts extending in the circumferential direction are not removed. The vibration isolation apparatus with this structure may be referred to as a second embodiment of the present invention.

According to the vibration isolation apparatus of the second embodiment of the present invention, the base plate part of the outer member has a rectangular front shape; the four extension wall parts extends from four sides of the base plate part toward the bracket member in a state where the four extension wall parts are connected along the periphery of the base plate part; the notch is formed as a depression portion in one of the extension wall parts close to the injection gate and one of the wall covering rubber parts covering the extension wall part in a manner such that at least both end portions of the extension wall part adjoining two extension wall parts extending in the circumferential direction are not removed. Therefore, an area of the outer member necessary for engagement with the bracket member can be ensured to prevent separation of the vibration isolation leg from the bracket member, and since the outer member is connected to the bracket member through two extension wall parts and both the end portions, the strength of the extension wall parts can be ensured.

Further, since the notch is formed as a depression portion, a resin material does not flow into plural branch passages unlike in the case where plural notches are formed in one extension wall part. Therefore, generation of fusing zones of a resin material can be suppressed, and the yield of a manufacturing process of the vibration isolation apparatus can be improved.

In the vibration isolation apparatus according to the second embodiment of the present invention, the notch may be formed as a depression portion in one of the extension wall parts close to the injection gate and one of the wall covering rubber parts covering the extension wall part in a manner such that the notch is formed only in an end side of the extension wall part while not removing both end portions of the extension wall part adjoining two extension wall parts extending in the circumferential direction and a portion of the extension wall part connected to the both end portions and the base plate part. The vibration isolation apparatus with this structure may be referred to as a third embodiment of the present invention.

According to the vibration isolation apparatus of the third embodiment of the present invention, the notch is formed only in an end side of one of the extension wall parts. That is, since the notch is formed while not removing both end portions and a portion adjoining the base plate part, an area of the outer member necessary for engagement with the bracket member can be ensured to prevent separation of the vibration isolation leg from the bracket member, and owing to the remaining parts, the strength of the extension wall part can be increased.

In the vibration isolation apparatus according to the second or third embodiment of the present invention, another notch may be formed in one of the extension wall parts opposite to the extension wall part close to the injection gate and one of the wall covering rubber parts covering the opposite extension wall part. The vibration isolation apparatus with this structure may be referred to as a fourth or fifth embodiment of the present invention.

In the vibration isolation apparatus of the fourth or fifth embodiment of the present invention, the two notches can function as an inlet and an outlet of a resin material for the space surrounded by the four extension wall part. Therefore, a resin material injected into the resin mold through the injection gate can flow more smoothly, and thus the extension wall parts (wall covering rubber parts) can surely be prevented from being pushed by the resin material. This reduces positional deviation of the vibration isolation leg and sealing errors caused by deformation of the wall covering rubber parts, and thus generation of resin burrs can be suppressed in the vicinity of the wall covering rubber parts. As a result, the elastic stopper function of the wall covering rubber parts can be ensured.

BRIEF DESCRIPTION OF THE DRAWINGS

FIG. 1 is a perspective view illustrating a vibration isolation apparatus according to a first embodiment of the present invention.

FIG. 2A is a front view illustrating the vibration isolation apparatus, and FIG. 2B is a side view illustrating the vibration isolation apparatus.

FIG. 3A is a perspective view illustrating an outer member, and FIG. 3B is a rear view illustrating the outer member.

FIG. 4A is a sectional view of the outer member taken along line IVa-IVa of FIG. 3B, and FIG. 4B is a sectional view of the outer member taken along line IVb-IVb of FIG. 3B.

FIG. 6A is a front view illustrating the first molding product, and FIG. 6B is a side view illustrating the first molding product.

FIG. 21A is a sectional view of the outer member taken along line XXIa-XXIa of FIG. 20B, and FIG. 21B is a sectional view of the outer member taken along line XXIb-XXIb of FIG. 20B.

FIG. 26A is a perspective view illustrating an outer member according to a fifth embodiment, and FIG. 26B is a side view of the outer member taken in the direction of an arrow XXVIb.

FIG. 35 is a side view of the first molding product taken in the direction of an arrow XXXV of FIG. 34.

DETAILED DESCRIPTION OF THE EMBODIMENTS

Figure 5:
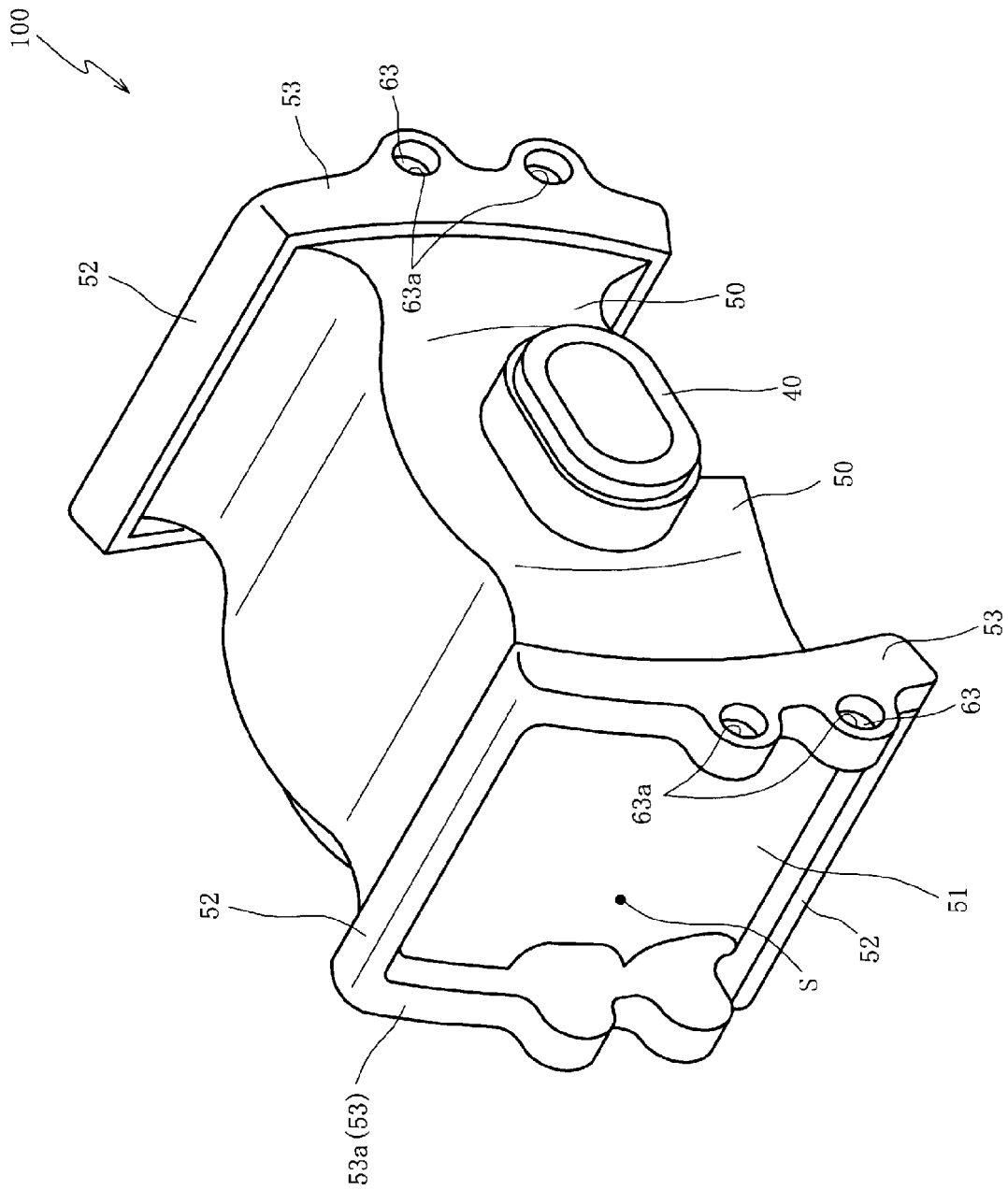
FIG. 5 is a perspective view illustrating a first molding product.

Hereinafter, preferred embodiments of the present invention will be described with reference to the accompanying drawings. First, the overall structure of a vibration isolation apparatus 1 will be described with reference to FIGS. 1, 2A, and 2B. FIG. 1 is a perspective view illustrating the vibration isolation apparatus 1 according to a first embodiment of the present invention; FIG. 2A is a front view illustrating the vibration isolation apparatus 1; and FIG. 2B is a side view illustrating the vibration isolation apparatus 1. In FIGS. 1, 2A, and 2B, the directions of arrows F and B denote the front and back directions of a vehicle, the directions of arrows L and R denote the left and right directions of the vehicle, and the directions of arrows U and D denote the upper and down directions of the vehicle.

As shown in FIGS. 1, 2A, and 2B, the vibration isolation apparatus 1 is used to support and fix a vehicle vibration source (not shown) and block transmission of vibration from the vibration source to a vehicle body (not shown). The vibration isolation apparatus 1 mainly include: a cylindrical short metal fitting 11 and a cylindrical long metal fitting 12; elastic parts 21 and 22 formed of a rubber-like elastic material and disposed around the metal fittings 11 and 12 by vulcanization adhesion; a bracket member 30 formed of a resin and having press-fitting holes in which the elastic parts 21 and 22 are respectively press-fitted; an internal cylinder member 40 disposed in an inner hole 31 of the bracket member 30 for being installed on a vibration source side; a pair of vibration isolation legs 50 having end sides connected to the internal cylinder member 40 and formed of a rubber-like elastic material; and a pair of outer members 60 (refer to FIGS. 7A and 7B) respectively connected to the other end sides of the vibration isolation legs 50 and engaged with the bracket member 30.

In the embodiment, the vibration source is a motor. However, the vibration source may be an engine, a transmission, etc.

The short metal fitting 11 and the long metal fitting 12 are formed of a steel material for being installed on the vehicle body. Each of the metal fittings 11 and 12 has a cylindrical shape with a penetration hole so that end surfaces of the metal fittings 11 and 12 can be respectively installed on the vehicle body by inserting bolts (not shown) in the penetration holes and tightening the bolts.

The bracket member 30 is formed of a resin and has an approximately rectangular frame shape when viewed from the front, and the press-fitting holes and the inner hole 31 are formed through the thickness of the bracket member 30. The metal fittings 11 and 12 around which the elastic parts 21 and 22 are disposed by vulcanization adhesion are press-fitted and held in the press-fitting holes. The internal cylinder member 40 is disposed in the inner hole 31. Further, when large amplitude vibration is input, the inner circumferential surface of the inner hole 31 receives the internal cylinder member 40 and restricts movement of the internal cylinder member 40 as a stopper.

Plural lightening holes 32 are formed through the upper and lower ends of the bracket member 30 in the thickness direction of the bracket member 30. Further, the press-fitting holes, the inner hole 31, and the lightening holes 32 have tapered inner surfaces so that the inner diameters thereof can be increased toward opened sides. The press-fitting holes, the inner hole 31, and the lightening holes 32 are parallel with the center axis lines of the internal cylinder member 40 and holes 63a (described later) of the outer members 60. Owing to this, the bracket member 30 can be easily separated from a resin mold 400 (refer to FIGS. 11 to 14).

The bracket member 30 is symmetric with respect to an imaginary plane parallel with the upper, down, left, and right directions of the vehicle (the directions of the arrows U, D, L, and R and including the center of the internal cylinder member 40, and an injection gate formed at a position located on the imaginary plane at the front side of the bracket member 30 and at the lower side of the inner hole 31 (as an injection hole for injecting a resin material into a cavity (C) when the bracket member 30 is formed by resin molding using the resin mold 400 (refer to FIGS. 11 to 14)). Further, a position of the bracket member 30 corresponding to the injection gate is referred to as an injection gate mark 30a.

The internal cylinder member 40 is formed of an aluminum alloy. The internal cylinder member 40 has an elliptical cross section and a penetration hole. The internal cylinder member 40 is fixedly coupled to the vibration source by inserting a bolt (not shown) through the penetration hole. The pair of vibration isolation legs 50 are formed of a rubber-like elastic material for blocking transmission of vibration from the vibration source to the vehicle body. Ends of the vibration isolation legs 50 are connected to the outer circumferential surface of the internal cylinder member 40, and the other ends of the vibration isolation legs 50 are connected to the inner circumferential surface of the inner hole 31 of the bracket member 30.

The vibration isolation legs 50 are connected to the inner circumferential surface of the inner hole 31 at positions facing each other in the front and back directions of the vehicle (the directions of the arrows F and B), and spaces are formed between the vibration isolation legs 50 and the inner circumferential surface of the inner hole 31 in the upper and down directions of the vehicle (the directions of the arrows U and D). Therefore, the upper-down spring constant of the vibration isolation legs 50 related to displacement of the internal cylinder member 40 in the upper and down directions of the vehicle is smaller than the left-right spring constant of the vibration isolation legs 50 related to displacement of the internal cylinder member 40 in the left and right direction of the vehicle.

Second wall covering rubber parts 53 extend from the other ends of the vibration isolation legs 50 in a manner such that the second wall covering rubber parts 53 protrude from front and back outer surfaces of the bracket member 30 (left and right sides in FIG. 2B) in the center axis direction (left and right directions in FIG. 2B) of the internal cylinder member 40. If an opponent part 500 (refer to FIG. 15) fixedly coupled to the internal cylinder member 40 is moved relative to the internal cylinder member 40 in response to large amplitude vibration, the second wall covering rubber parts 53 make contact with the opponent part 500 for stopping the opponent part 500 while elastically absorbing shock. In this way, the second wall covering rubber parts 53 function as stopper members for restricting movement of an opponent part.

Next, the outer member 60 will be described with reference to FIGS. 3A to 4B. FIG. 3A is a perspective view illustrating the outer member 60, and FIG. 3B is a rear view illustrating the outer member 60. FIG. 4A is a sectional view of the outer member 60 taken along line IVa-IVa of FIG. 3B, and FIG. 4B is a sectional view of the outer member 60 taken along line IVb-IVb of FIG. 3B.

Referring to FIGS. 3A to 4B, the outer member 60 is formed of a metal plate through a drawing process using a press machine. The outer member 60 has a container shape with an opened side (the front side of the plane of the paper in FIG. 3B). The outer member 60 is embedded in the other side of the vibration isolation leg 50 and is engaged with the bracket member 30.

The outer member 60 includes: a base plate part 61 having a rectangular shape when viewed from the back; a pair of first wall parts 62 extending from two edges of the base plate part 61 (upper and lower edges in FIG. 3B) in the backward direction of the base plate part 61 (the forward direction of the plane of the paper in FIG. 3B); and a pair of second wall parts 63 extending from the other two edges of the base plate part 61 in the backward direction of the base plate part 61. Further, ends of the first wall parts 62 and the second wall parts 63 are connected. That is, the wall parts 62 and 63 are continuously connected along the perimeter of the outer member 60 when viewed from the back of the outer member 60.

The base plate part 61 is curved in an arc shape having a center L1 so that the base plate part 61 is convex in the backward direction (refer to FIG. 4A). That is, the base plate part 61 is shaped like a part cut from a cylinder having a center axis L1 perpendicular to the plane of the paper in FIG. 4A. A penetration hole 61a is formed through a center region of the base plate part 61. The penetration hole 61a has an approximately rectangular shape when viewed from the back.

The penetration hole 61a is disposed at a center position between the second wall parts 63. However, the penetration hole 61a is not centered between the first wall parts 62 but closer to one of the first wall parts 62 (closer to the lower first wall part 62 in FIGS. 3B and 4B) Therefore, a portion of the base plate part 61 located above the penetration hole 61a has a central angle θa greater than a central angle θb of a portion of the base plate part 61 located under the penetration hole 61a.

Figure 16:
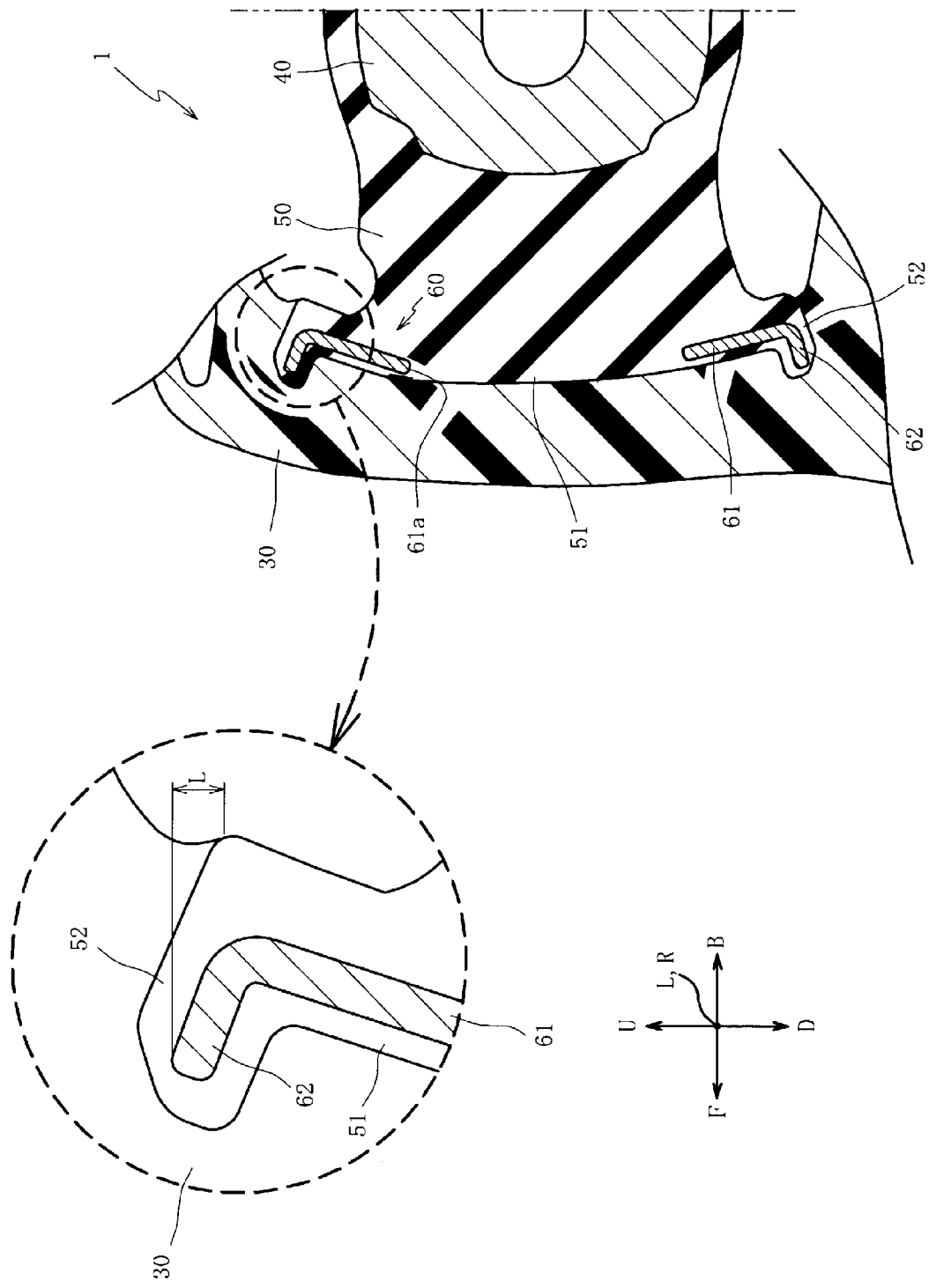
FIG. 16 is a partial sectional view illustrating the vibration isolation apparatus.

The first wall parts 62 are plate-shaped parts the main function of which is to regulate movement of the outer member 60 relative to the bracket member 30 in the front and back directions of the vehicle (the directions of the arrows F and B) and the upper and lower directions of the vehicle (the directions of the arrows U and D) (refer to FIG. 16). The first wall parts 62 are disposed at positions facing each other, and the space between the first wall parts 62 widens as it goes away from the backside of the base plate part 61 (refer to FIG. 4A). Further, the first wall parts 62 have the same shape.

Figure 15:
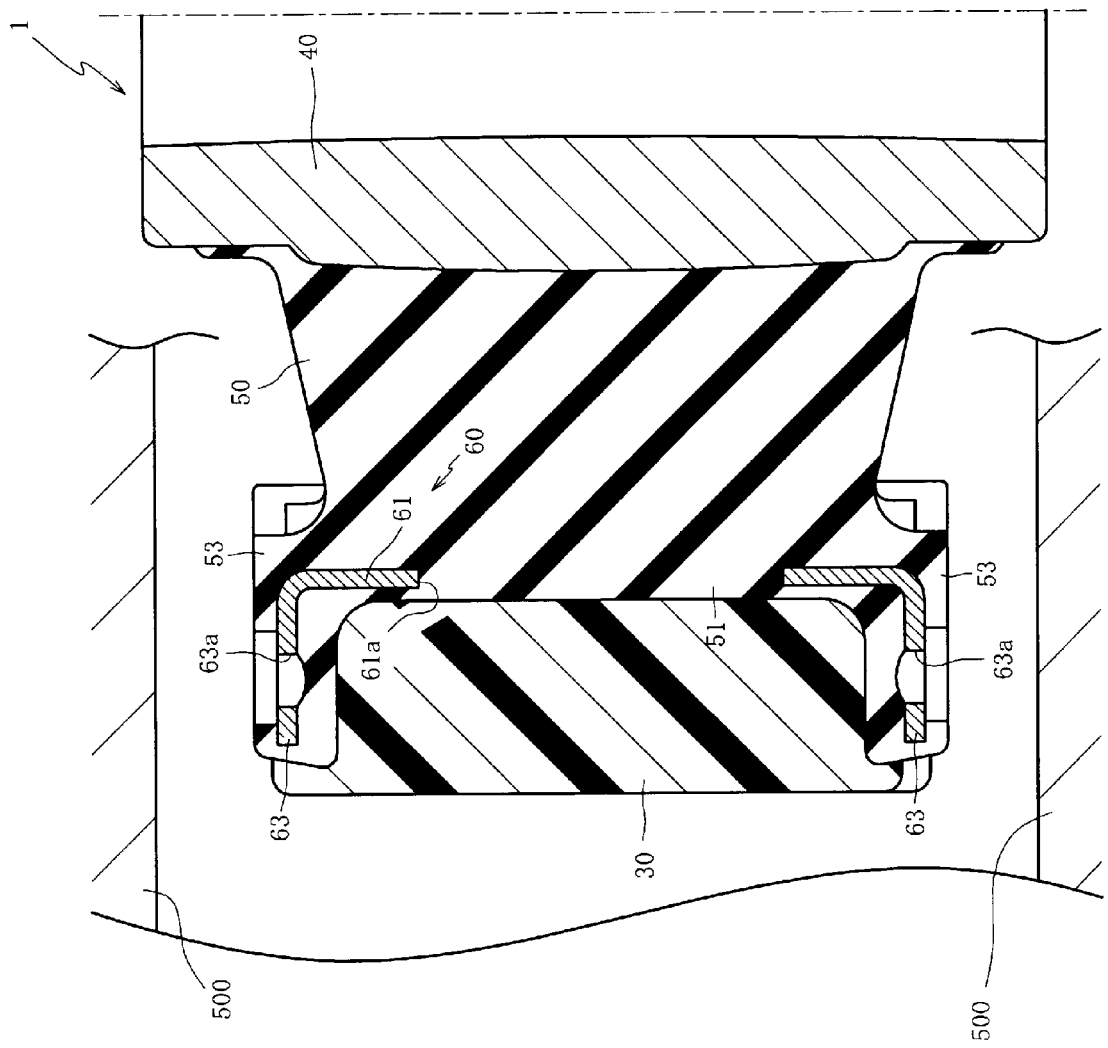
FIG. 15 is a partial sectional view illustrating the vibration isolation apparatus.

The second wall parts 63 are plate-shaped parts the main function of which is to regulate movement of the outer member 60 relative to the bracket member 30 in the left and right directions of the vehicle (the directions of the arrows L and R) (refer to FIG. 15). The second wall parts 63 are parallel with each other and face each other (refer to FIG. 4S). Holes 63a having a circular shape when viewed from the front are formed at two positions of each of the second wall parts 63. That is, the holes 63a are formed totally at four positions.

As shown in FIG. 4A, the holes 63a are closer to one of the first wall parts 62 than the other of the first wall parts 62 (closer to the lower first wall part 62 in FIG. 4A). Specifically, one of the two holes 63a formed at the two positions is located approximately at the center between the first wall parts 62, and the other of the two holes 63a is located at a side of one of the first wall parts 62.

Extensions having a semicircular shape when viewed from the front are formed on the outer edges of the second wall parts 63, and the holes 63a are formed concentrically with the extensions. As described above, since the extensions and the penetration hole 61a are not centered between the first wall parts 62 but closer to one of the first wall parts 62, the extensions can compensate for a strength decrease caused by the penetration hole 61a, and the total strength of the outer member 60 can be improved.

The second wall parts 63 and the holes 63a of the second wall parts 63 are formed into the same shape. Therefore, the outer member 60 can be used at any of the left and right sides of the vibration isolation apparatus 1 (first molding product 100) (refer to FIG. 7).

Figure 7A:
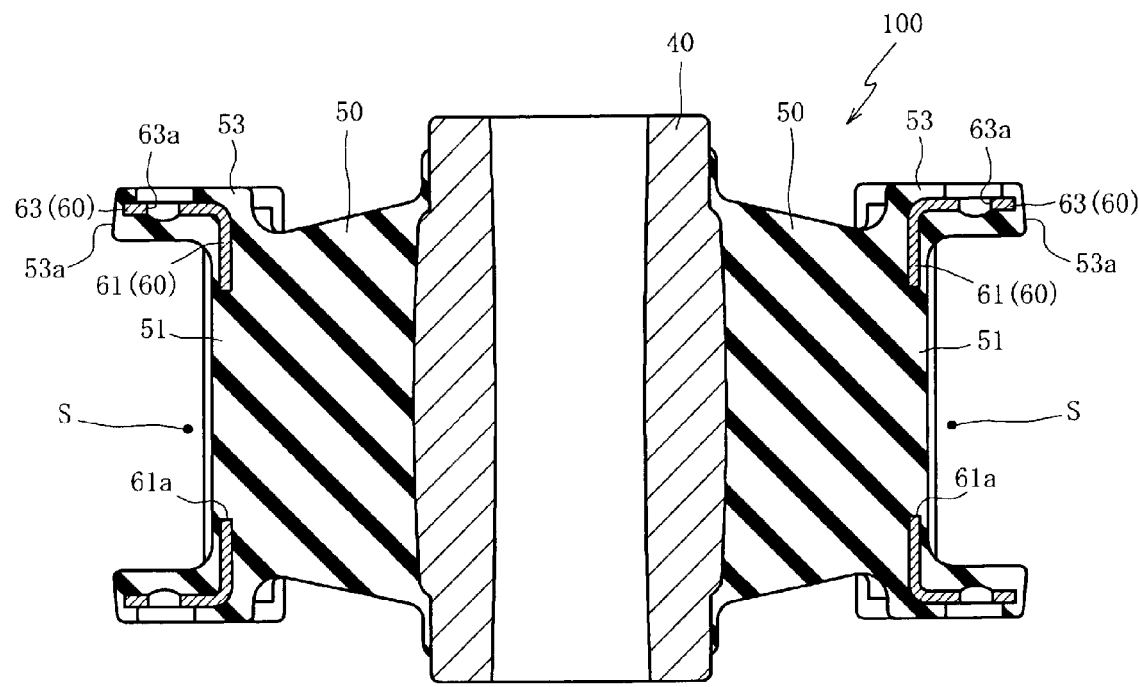
FIG. 7A is a sectional view of the first molding product taken along line VIIa-VIIa of FIG. 6A.
Figure 7B:
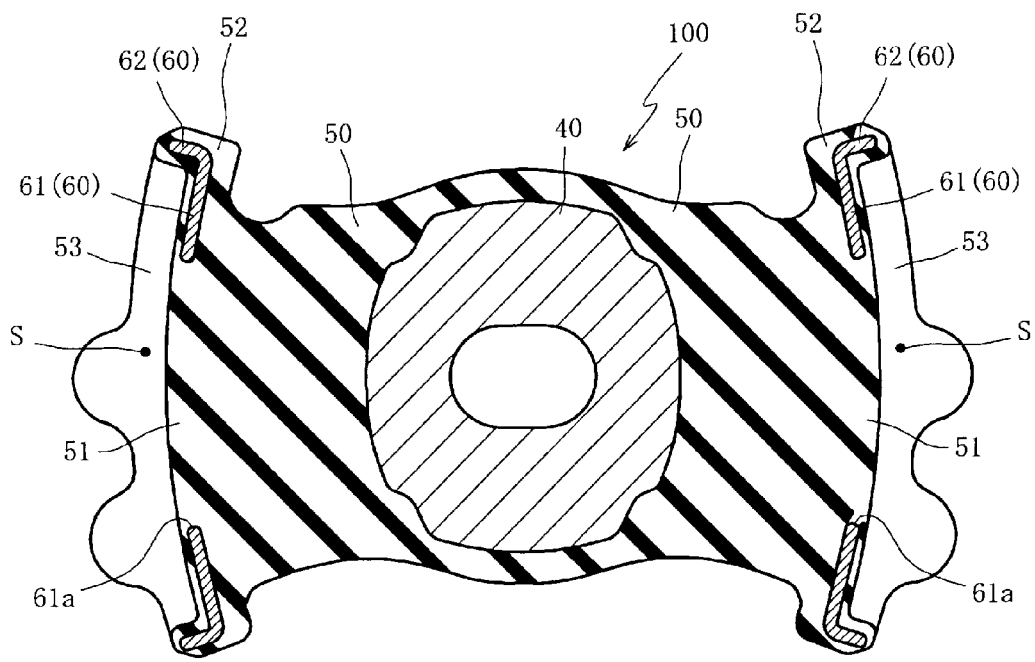
FIG. 7B is a sectional view of the first molding product taken along line VIIb-VIIb of FIG. 6B.
Figure 8:
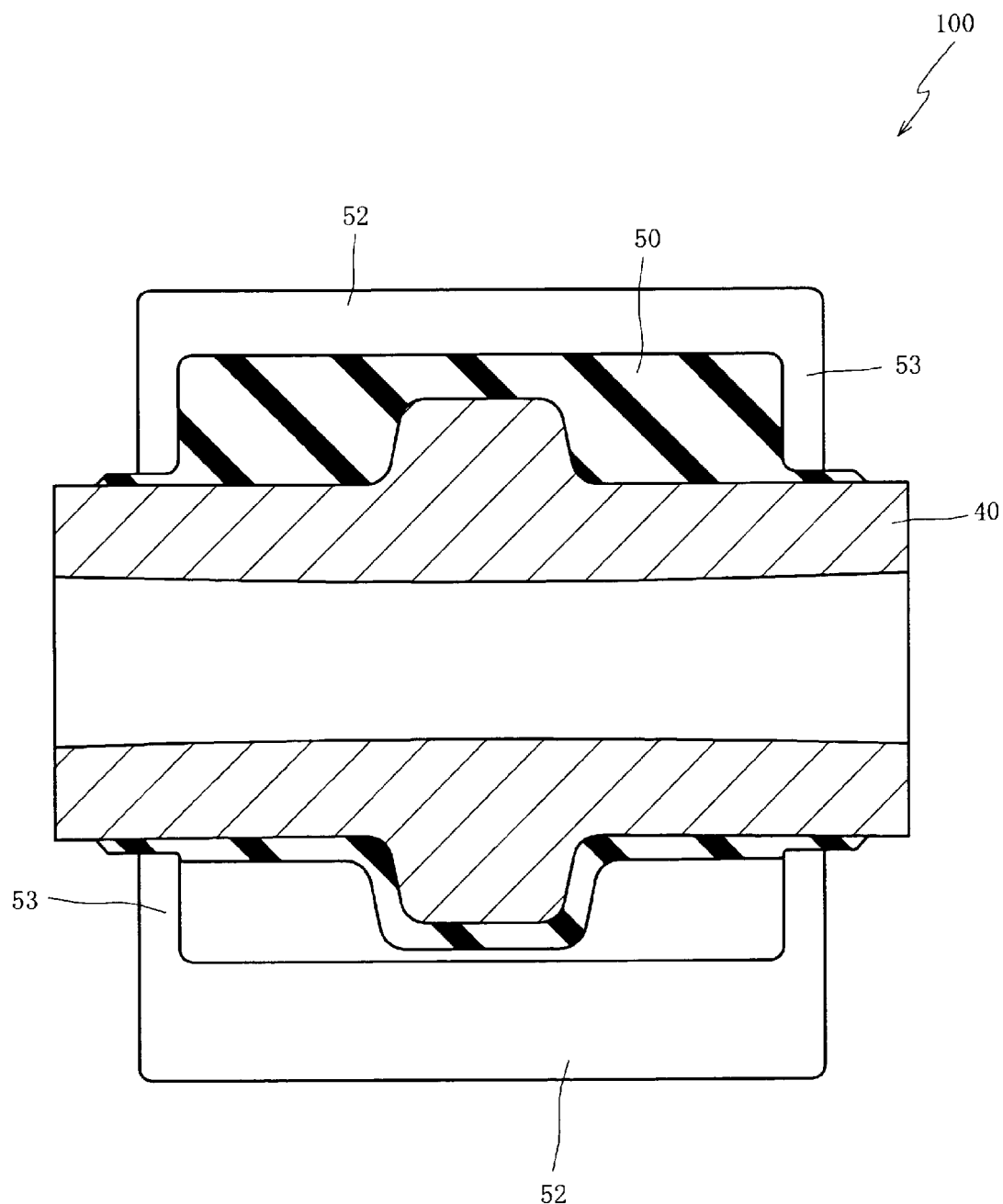
FIG. 8 is a sectional view of the first molding product taken along line VIII-VIII of FIG. 6A.

Next, the first molding product 100 will be described with reference to FIGS. 5 to 8. FIG. 5 is a perspective view illustrating the first molding product 100. FIG. 6A is a front view illustrating the first molding product 100, and FIG. 6B is a side view illustrating the first molding product 100. FIG. 7A is a sectional view of the first molding product 100 taken along line VIIa-VIIa of FIG. 6A, and FIG. 7B is a sectional view of the first molding product 100 taken along line VIIb-VIIb of FIG. 6B. FIG. 8 is a sectional view of the first molding product 100 taken along line VIII-VIII of FIG. 6A.

As shown in FIGS. 5 to 8, the first molding product 100 is a primary processed product obtained through a manufacturing process of the vibration isolation apparatus 1 (a vulcanization process using a rubber vulcanization mold 300 (refer to FIGS. 9 and 10)). The first molding product 100 mainly includes the internal cylinder member 40, the pair of vibration isolation legs 50 having ends connected to the internal cylinder member 40, the pair of outer members 60 to which the other ends of the vibration isolation legs 50 are connected, and covering rubber parts 51 to 53 that cover the outer members 60. The first molding product 100 has bilateral symmetry (refer to the left and right in FIG. 6A).

As shown in FIGS. 5 to 8, since the upper and lower sides of the internal cylinder member 40 are covered with a rubber-like elastic material by extending ends of the pair of vibration isolation legs 50 on the upper and lower sides of the internal cylinder member 40, if the vehicle is largely vibrated in upper and lower directions (the directions of the arrows U and D), the internal cylinder member 40 is brought into contact with the inner circumferential surface of the inner hole 31 with the rubber-like elastic material being disposed therebetween (refer to FIG. 1).

The pair of outer members 60 are spaced a predetermined distance from each other in a state where the front sides of the outer members 60 are oriented to face each other, and the internal cylinder member 40 is disposed between the outer members 60. Further, the center axes L1 (refer to FIG. 4A) of the base plate parts 61 of the outer members 60 are parallel with the center axis of the internal cylinder member 40.

The pair of vibration isolation legs 50 connect the outer circumferential surface of the internal cylinder member 40 to the front sides of the base plate parts 61 of the outer members 60. When viewed from the front, the pair of vibration isolation legs 50 extend left and right in a linear shape. The covering rubber parts 51 to 53 extend from the vibration isolation legs 50 to cover the outer members 60.

Base plate covering rubber parts 51 are filled in the penetration holes 61a and cover the outer surface of the base plate parts 61 to a constant thickness. The thickness of the base plate covering rubber parts 51 on the front sides of the base plate parts 61 (where the first and second wall parts 62 and 63 are extended) is sufficiently thin. In the embodiment, the thickness of the base plate covering rubber parts 51 is smaller than the thickness of the base plate parts 61. Therefore, as described later, when a resin material is filled in spaces (S) in a resin molding process, due to an injection pressure of the resin material, the resin material may be caught in the penetration holes 61a in a direction from the backsides of the outer members 60 to the internal cylinder member 40.

First wall covering rubber parts 52 cover the outer surfaces of the pair of first wall parts 62 to a constant thickness, and second wall covering rubber parts 53 cover the outer surfaces of the pair of second wall parts 63 to a constant thickness. Further, rubber lower mold pins 301b and rubber upper mold pins 302b (refer to FIG. 9) of the rubber vulcanization mold 300 are inserted in the holes 63a of the second wall parts 63 so that the second wall covering rubber parts 53 are not filled in the holes 63a. Similarly, since rubber mold seat parts 301c and 302c (refer to FIG. 9) of the rubber vulcanization mold 300 make contact with the outer surfaces of the second wall parts 63 (surfaces of the second wall parts 63 opposite to the mutually facing surfaces of the second wall parts 63), depressions corresponding to the rubber mold seat parts 301c and 302c are formed in the second wall covering rubber parts 53. In addition, the second wall covering rubber parts 53 that cover the mutually facing surfaces of the second wall parts 63 are thick only at portions corresponding to the holes 63a.

As described above, since the covering rubber parts 51 to 53 cover the outer members 60 to predetermined thicknesses, the spaces (S) can be formed among the mutually facing surfaces of the first wall parts 62 and the second wall parts 63 of the outer members 60 (that is, the spaces (C) can be formed in regions surrounded by the base plate parts 61, the first wall parts 62, and the second wall parts 63). Portions of the bracket member 30 are fitted in the spaces (S) as described later.

Further, the second wall covering rubber parts 53 have sloped surfaces 53a at sides opposite to the internal cylinder member 40 (for example, refer to the front side of the paper in FIG. 6B). Specifically, the sloped surfaces 53a rise from outer sides of the second wall covering rubber parts 53 toward the spaces (S).

Figure 9:
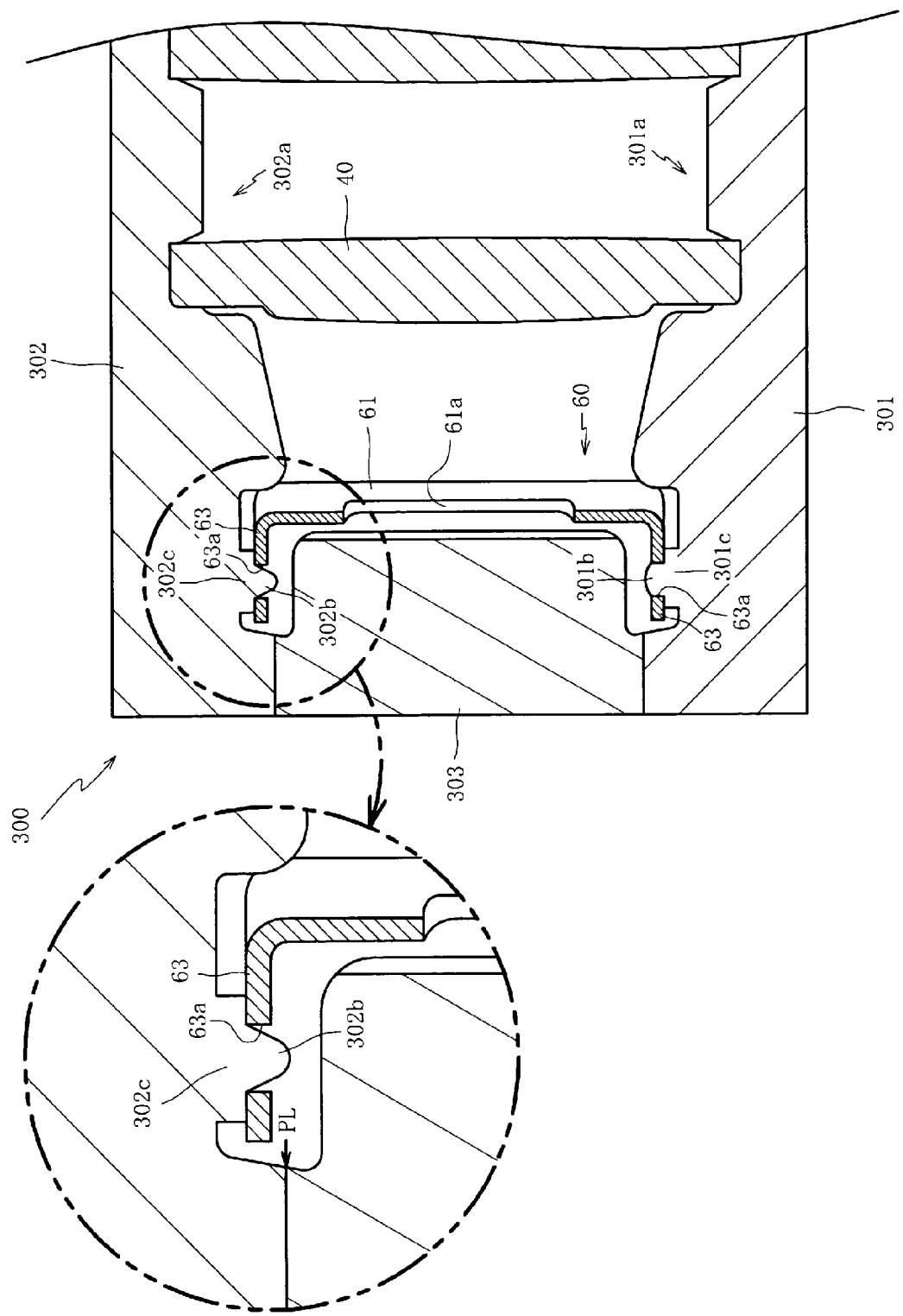
FIG. 9 is a sectional view illustrating a closed rubber vulcanization mold in which an internal cylinder member and the outer member are placed.
Figure 10:
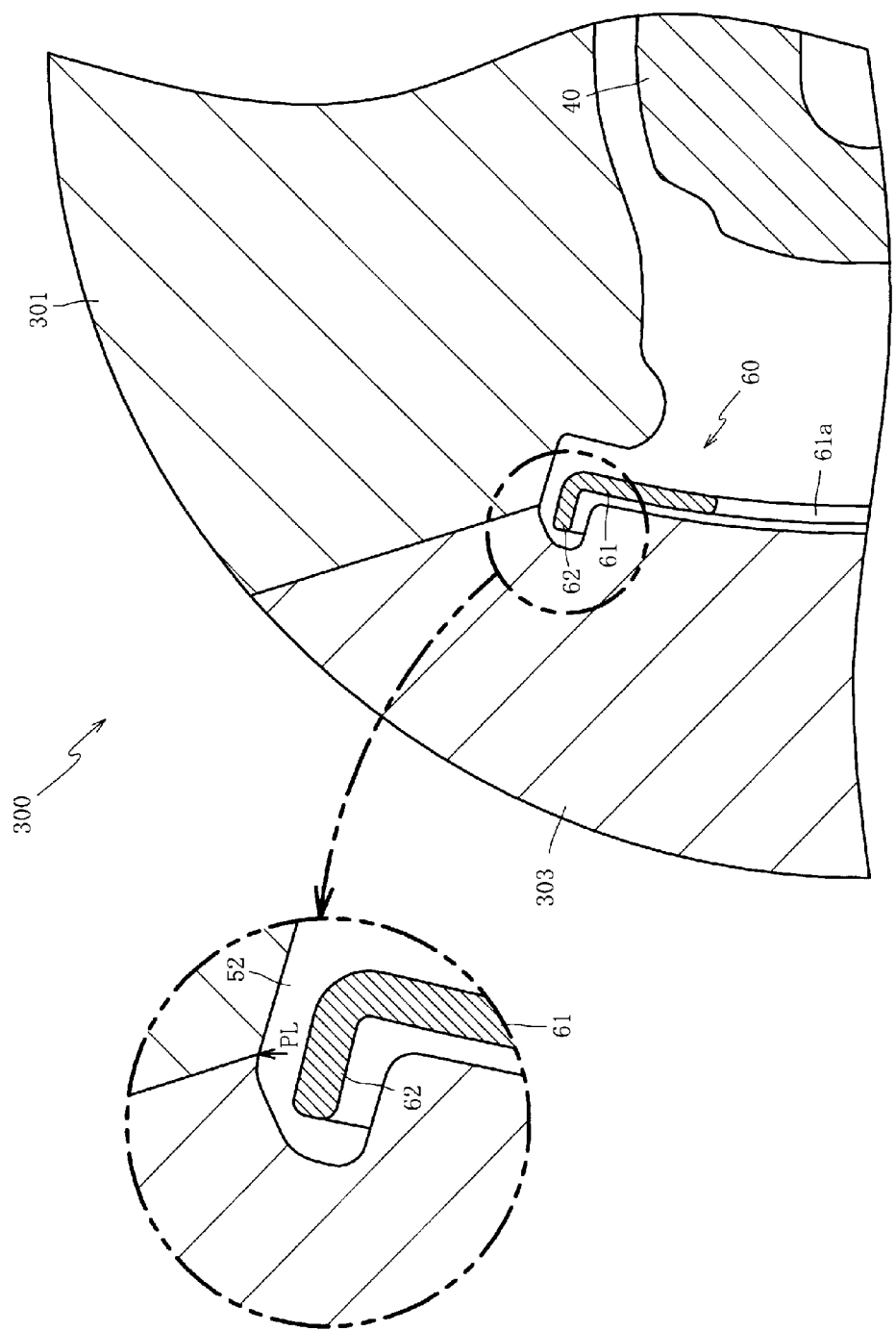
FIG. 10 is a sectional view illustrating the closed rubber vulcanization mold in which the internal cylinder member and the outer member are placed.

Next, an explanation will be given on a method for manufacturing the vibration isolation apparatus 1 with reference to FIGS. 9 to 14. FIGS. 9 and 10 are sectional views illustrating the rubber vulcanization mold 300 in which the internal cylinder member 40 and outer members 60 are disposed, the rubber vulcanization mold 300 being closed but a rubber-like elastic material being not yet injected into a cavity of the rubber vulcanization mold 300. FIGS. 11 to 14 are section views illustrating the resin mold 400 in which the first molding product 100 is disposed, the resin mold 400 being closed but a resin material being not yet injected into a cavity (C) of the resin mold 400.

Figure 11:
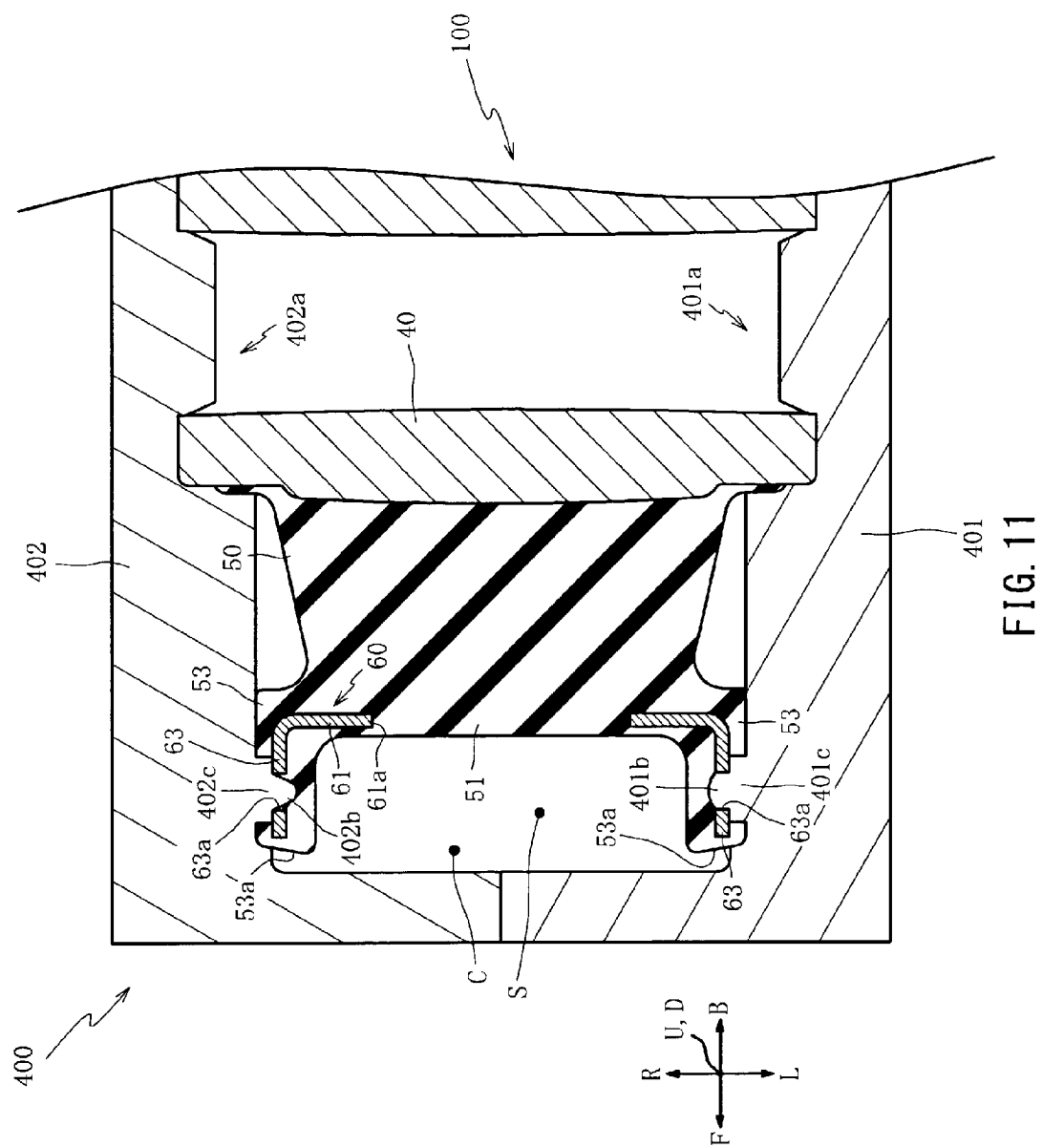
FIG. 11 is a sectional view illustrating a closed resin mold in which the first molding product is placed.
Figure 12:
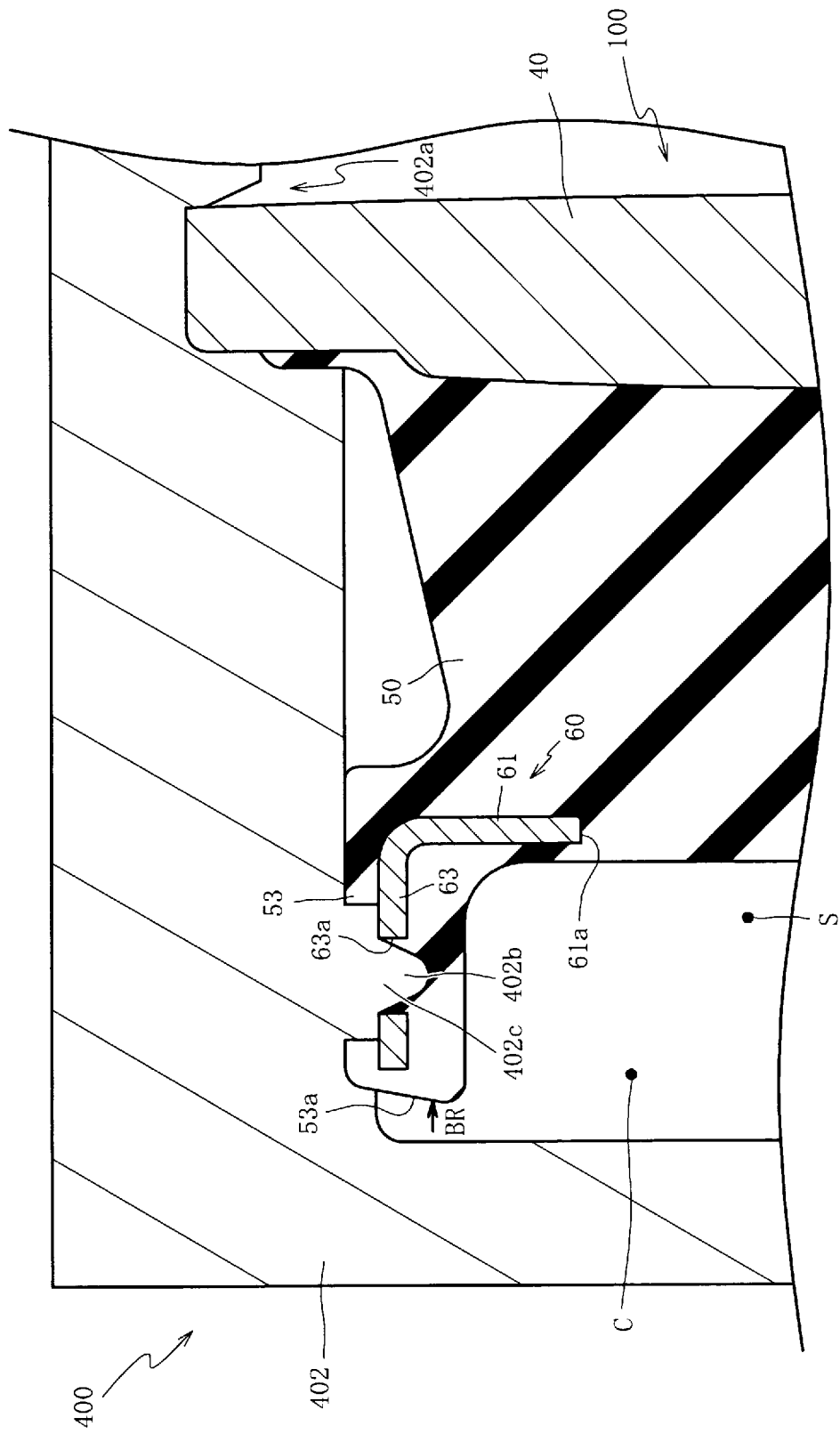
FIG. 12 is a sectional view illustrating the closed resin mold in which the first molding product is placed.

The sectional views of FIGS. 9 and 11 correspond to the section shown in FIG. 7A. The sectional views of FIGS. 10 and 14 correspond to the section shown in FIG. 7B. FIG. 12 corresponds to a partial enlarge view of FIG. 11, and FIG. 13 corresponds to a sectional view taken along line XIII-XIII of FIG. 6A. Further, FIGS. 9 and 10 illustrate partially enlarged views of the rubber vulcanization mold 300.

As shown in FIGS. 9 and 10, the rubber vulcanization mold 300 is a mold for forming the first molding product 100 by vulcanization. The rubber vulcanization mold 300 includes: a lower mold 301 and an upper mold 302 that can be closed in up and down directions (in FIG. 9, up and down directions, or in FIG. 9, directions perpendicular to the plane of the paper and parallel with the axis direction of the internal cylinder member 40); and middle molds 303 disposed between the lower and upper molds 301 and 302. In a rubber vulcanization process, the rubber vulcanization mold 300 is closed, and a rubber-like elastic material is injected and filled in the cavity formed in the closed rubber vulcanization mold 300 and is vulcanized to form the first molding product 100 (refer to FIG. 5).

The lower mold 301 is a mold for forming the front side (the front side of the plane of the paper in FIG. 6A) of the first molding product 100. The lower mold 301 includes: an internal cylinder locking part 301a to lock the internal cylinder member 40; and the rubber lower mold pins 301b and rubber lower mold seat parts 301c to lock the outer members 60.

The internal cylinder locking part 301a is used to lock the lower end of the internal cylinder member 40. For this, the internal cylinder locking part 301a includes: a concave groove part in which the lower end of the internal cylinder member 40 can be inserted; and an insertion pin insertable in a lower end opening of the internal cylinder member 40.

The rubber lower mold pins 301b have a columnar shape for being inserted in the holes 63a of the outer members 60 and are disposed at two positions on each side, totally, at four positions. The position of the outer members 60 can be fixed by inserting the rubber lower mold pins 301b in the holes 63a.

The rubber lower mold seat parts 301c are used to support the outer surfaces of the second wall parts 63 of the outer members 60. The rubber lower mold seat parts 301c have a columnar shape with a diameter greater than that of the rubber lower mold pins 301b and are concentric with the rubber lower mold pins 301b. That is, the rubber lower mold seat parts 301c have flat stepped surfaces around the rubber lower mold pins 301b. The stepped surfaces are circular ring-shaped seat surfaces for making contact with the outer surfaces of the second wall parts 63 and supporting the second wall parts 63. Further, the seat surfaces have an outer diameter smaller than that of the semicircular extensions of the second wall parts 63 so that the seat surfaces can be located within the outer surfaces of the second wall parts 63.

The upper mold 302 is a mold for forming the backside (the backside of the plane of the paper in FIG. 6A) of the first molding product 100. The upper mold 302 can be closed and opened while being vertically moved relatively to the lower mold 301 (up and down directions in FIG. 9). The upper mold 302 includes: an inner cylinder locking part 302a to lock the internal cylinder member 40; and the rubber upper mold pins 302b and rubber lower mold seat parts 302c to lock the outer members 60.

The inner cylinder locking part 302a, the rubber upper mold pins 302b, and the rubber lower mold seat parts 302c have the same structures as the internal cylinder locking part 301a, the rubber lower mold pins 301b, and the rubber lower mold seat parts 301c of the lower mold 301. Thus, descriptions thereof will not be repeated. However, the maximum diameter of the rubber upper mold pins 302b is somewhat smaller than the diameter of the rubber lower mold pins 301b of the lower mold 301, and the rubber upper mold pins 302b have a conical pin shape the diameter of which tapers toward the tip thereof. Therefore, the outer members 60 can be easily placed in spite of dimensional tolerance of the outer members 60, and the outer members 60 can be firmly held in proper positions in the cavity.

The middle molds 303 are molds for forming both sides (left and right sides in FIG. 6A) of the first molding product 100. The middle molds 303 are constituted by a pair of left and right separable molds and are disposed at predetermined positions between the lower and upper molds 301 and 302.

As shown in FIGS. 11 to 14, the resin mold 400 is a mold for inserting the first molding product 100 in the bracket member 30. The resin mold 400 includes a lower mold 401 and an upper mold 402 that can be closed in up and down directions (in FIG. 11, up and down directions, or in FIG. 14, directions perpendicular to the plane of the paper and parallel with the axis direction of the internal cylinder member 40). The vibration isolation apparatus 1 is formed by filling (injecting) a resin material in the cavity (C) of the closed resin mold 400 through an injection gate (refer to reference numeral 30a in FIGS. 1 and 2A) and hardening the resin material.

The lower mold 401 is a mold for forming the outer shape of the bracket member 30 together with the upper mold 402. The lower mold 401 includes: an internal cylinder locking part 401a to lock the internal cylinder member 40; and resin lower mold pins 401b and resin lower mold seat parts 401c to lock the outer members 60. The internal cylinder locking part 401a, the resin lower mold pins 401b, and the resin lower mold seat parts 401c have the same structures as the internal cylinder locking part 301a, the rubber lower mold pins 301b, and the rubber lower mold seat parts 301c of the lower mold 301 of the rubber vulcanization mold 300. Thus, descriptions thereof will not be repeated.

The upper mold 402 can be closed and opened while being vertically moved relatively to the lower mold 401 (up and down directions in FIG. 11). The upper mold 402 includes an inner cylinder locking part 402a to lock the internal cylinder member 40, and resin upper mold pins 402b and resin lower mold seat parts 402c to lock the outer members 60. The internal cylinder locking part 402a, the resin upper mold pins 402b, and the resin upper mold seat parts 402c have the same structures as the internal cylinder locking part 302a, the rubber upper mold pins 302b, and the rubber upper mold seat parts 302c of the upper mold 302 of the rubber vulcanization mold 300. Thus, descriptions thereof will not be repeated.

Further, lightening hole forming pins 401d and press-fitting hole forming pins (not shown) are formed on the lower mold 401. Therefore, in a resin vulcanization process, plural lightening holes and two press-fitting holes can be formed through predetermined positions of the bracket member 30 (referring to FIG. 1, bushings constituted by the metal fittings 11 and 12 and the elastic parts 21 and 22 disposed around the metal fittings 11 and 12 by vulcanization adhesion are press-fitted in the press-fitting holes).

The vibration isolation apparatus 1 is manufactured as follows. First, a rubber vulcanization process is performed to form the first molding product 100, and then a resin molding process is performed to insert the first molding product 100 in the bracket member 30.

That is, in the rubber vulcanization process, the internal cylinder member 40 and the outer members 60 are placed in the lower mold 301 of the rubber vulcanization mold 300, and after the middle molds 303 are placed at predetermined positions of the lower mold 301, the upper mold 302 is moved down to close the rubber vulcanization mold 300. Then, as shown in FIGS. 9 and 10, a cavity which is a space for vulcanizing a rubber-like elastic material is formed, and a rubber-like elastic material is injected into the cavity through an injection hole (not shown) to fill the cavity with the rubber-like elastic material. Thereafter, the rubber vulcanization mold 300 is left under a pressurized and heated state for a predetermined time so as to vulcanize the rubber-like elastic material (the vibration isolation legs 50 and the covering rubber parts 51 to 53). In this way, the first molding product 100 is formed.

In this case, holes 63a are formed at two positions of each of the pair of second wall parts 63 of the outer members 60. The holes 63a are not centered between the pair of first wall parts 62 but closer to one of the first wall parts 62 (refer to FIG. 4A). Therefore, when the outer members 60 are placed in the lower mold 301 of the rubber vulcanization mold 300, it is required to properly insert the rubber lower mold pins 301b in the holes 63a of the second wall parts 63.

That is, if the rubber lower mold pins 301b are not correctly inserted in the corresponding holes 63a after correctly orienting the outer members 60, the second wall parts 63 of the outer members 60 may not be accommodated in a cavity (concave portion) of the lower mold 301 (because the thickness of first wall covering rubber parts 52 is sufficiently smaller than the distance between the pair of second wall parts 63). Thus, the penetration holes 61a are formed at biased positions of the outer members 60 so that although the outer members 60 have directionality, working errors (disposition errors) can be prevented when the outer members 60 are placed in the rubber vulcanization mold 300.

Further, since the holes 63a are formed at two positions of each of the pair of second wall parts 63, after the outer members 60 are placed in the lower mold 301 in the rubber vulcanization process, rotation of the outer members 60 can be surely prevented. Therefore, when the upper mold 302 is moved to the lower mold 301 to close the rubber vulcanization mold 300, the rubber upper mold pins 302b can be surely inserted into the holes 63a, respectively.

In addition, since the outer members 60 can be firmly held in the cavity of the rubber vulcanization mold 300 by inserting the rubber lower mold pins 301b and the rubber upper mold pins 302b into the holes 63a of the pair of second wall parts 63, deformation of the outer members 60 can be suppressed when a vulcanization pressure is applied through the rubber-like elastic material.

Furthermore, as described above, although structures such as the holes 63a and the rubber lower mold pins 301b are used to suppress disposition errors and deformation of the outer members 60, since such structures as the holes 63a and the rubber lower mold pins 301b have a simple circular sectional shape, the structures can be easily formed, and thus costs necessary for manufacturing the vibration isolation apparatus 1 and the rubber vulcanization mold 300 can be reduced.

Since the covering rubber parts 51 to 53 that cover the outer members 60 are formed of the rubber-like elastic material extending on the vibration isolation legs 50, the vibration isolation legs 50 and the covering rubber parts 51 to 53 can be simultaneously vulcanized, and thus the manufacturing costs can be reduced as much as that. Further, since the covering rubber parts 51 to 53 are formed as described above, the outer members 60 can be entirely covered with the rubber-like elastic material, and thus the corrosion resistance of the outer members 60 can be improved.

However, the outer members 60 placed in the cavity of the rubber vulcanization mold 300 may be easily deformed by a vulcanization pressure applied through the rubber-like elastic material because gaps corresponding to thicknesses of the covering rubber parts 51 to 53 covering the outer surfaces of the outer members 60 are formed between the entire outer surfaces of the outer members 60 and the rubber vulcanization mold 300. Particularly, the base plate parts 61 may be remarkably deformed as compared with the second wall parts 63 supported by the rubber lower mold pins 301b. Therefore, in the vibration isolation apparatus 1 of the embodiment, the penetration holes 61a are formed in the base plate parts 61 to release a vulcanization pressure applied through the rubber-like elastic material. Thus, deformation of the outer members 60 can be suppressed.

Further, in the rubber vulcanization mold 300, parting lines PL where the lower mold 301 makes contact with the middle molds 303 and the upper mold 302 makes contact with the middle molds 303 are set to the side surfaces 53a of the second wall covering rubber parts 53 and side surfaces of the first wall covering rubber parts 52. According to the above-described positions of the parting lines PL, when the first molding product 100 is placed in the resin mold 400 and the resin mold 400 is closed, rubber burrs formed along the parting lines PL are located in the cavity (C) of the closed resin mold 400 so that the rubber burrs can be buried in a resin material (bracket member 30) after resin molding. This will be described later in detail.

Next, in the resin molding process, the first molding product 100 is placed in the lower mold 401 of the resin mold 400, and the upper mold 402 is lower to close the resin mold 400. Then, as shown in FIGS. 11 to 14, the cavity (C) which is a space for filling and hardening a resin material is formed, and a resin material is filled (injected) into the cavity (C) through the injection gate and is left for a predetermined time to hardening. In this way, the first molding product 100 is inserted in the bracket member 30. Thereafter, the bushings are press-fitted in the press-fitting holes of the bracket member 30. In this way, the vibration isolation apparatus 1 is manufactured.

In this case, since the first molding product 100 is placed in the lower mold 401 of the resin mold 400 by inserting the resin lower mold pins 401b in the holes 63a of the second wall parts 63, like in the above-described rubber vulcanization process, if the resin lower mold pins 401b are not inserted in the corresponding holes 63a after the first molding product 100 (that is, the outer members 60) is correctly oriented, the first molding product 100 may not be accommodated in a cavity (concave portion) the lower mold 401. Thus, the penetration holes 61a are formed at biased positions of the outer members 60 so that although the first molding product 100 has directionality, working errors (disposition errors) can be prevented when the first molding product 100 is placed in the resin mold 400.

Further, like in the above-described rubber vulcanization process, after the first molding product 100 is placed in the lower mold 401, since the resin lower mold pins 401b are inserted in the holes 63a formed at two positions of each of the second wall parts 63, rotation of the first molding product 100 can be surely suppressed. Therefore, when the upper mold 402 is moved to the lower mold 401 to close the resin mold 400, the resin upper mold pins 402b can be surely inserted in the holes 63a, respectively.

In addition, since the outer members 60 can be firmly held in the cavity (C) of the resin mold 400 by inserting the resin lower mold pins 401b and the resin upper mold pins 402b into the holes 63a of the pair of second wall parts 63, deformation of the outer members 60 can be suppressed when an injection pressure is applied through the resin material.

Furthermore, like in the above-described rubber vulcanization process, since the resin lower mold pins 401b and the resin upper mold pins 402b have a simple circular sectional shape, costs necessary for fabricating the resin mold 400 can be reduced.

In the rubber vulcanization process, the second wall parts 63 of the outer members 60 are supported by the rubber lower mold seat parts 301c and the rubber lower mold seat parts 302c. Since seat surfaces of the rubber lower mold seat parts 301c and the rubber lower mold seat parts 302c are concentric with the holes 63a and have a circular ring shape with a diameter smaller than that of the extensions of the second wall parts 63, the seat surfaces do not jut out from the second wall parts 63 but are located within surfaces of the second wall parts 63. Therefore, the second wall covering rubber parts 53 that cover the second wall parts 63 are partially concave at positions corresponding to the holes 63a but four corners of each of the second wall covering rubber parts 53 are not concave.

That is, in a manufacturing method of the related art, since the four corners of each of the second wall parts 63 are supported by a rubber vulcanization mold, concave portions corresponding to support parts of the rubber vulcanization mold are formed in four corners of each of the second wall covering rubber parts 53. Therefore, it is difficult to ensure sealing of a resin material in a resin molding process, and thus the structure and shape of the resin mold are complicate to increase the manufacturing cost of the resin mold. However, according to the manufacturing method of the embodiment, sealing can be easily ensured because concave portions are not formed in each of the second wall covering rubber parts 53, and thus the structure and shape of the resin mold 400 can be simple to reduce the manufacturing cost of the resin mold 400.

Further, in a manufacturing method of the related art where the four corners of each of the second wall parts 63 are supported by a rubber vulcanization mold, if joint portions between the second wall parts 63 and the base plate parts 61 are rounded into R shapes through a bending process, parts of a rubber vulcanization mold that support the R shaped joint portions are required to have large dimensional tolerances due to large dimensional tolerances of the R shaped joint portions, and thus the outer members 60 may not be precisely placed in the rubber vulcanization mold. However, according to the manufacturing method of the embodiment, since structures such as the rubber lower mold pins 301b are inserted in the holes 63a of the second wall parts 63, dimensional tolerances can be reduced, and thus positional precision related to the rubber vulcanization mold 300 can be improved. Therefore, relative positional precision among the outer members 60, the internal cylinder member 40, and the vibration isolation legs 50 can be improved, and thus static and dynamic characteristics of the vibration isolation apparatus 1 can be stabilized.

Spaces (S) are formed in regions of the first molding product 100 surrounded by the first wall parts 62 and the second wall parts 63 of the outer members 60 (that is, regions surrounded by the first wall covering rubber parts 52 and the second wall covering rubber parts 53). When a resin material is injected into the cavity (S) of the resin mold 400 in the resin molding process, the resin material is filled in the spaces (S).

Thus, the first molding product 100 is inserted in the bracket member 30 in a state where portions of the bracket member 30 are fitted in the spaces (S).

In this case, since the penetration holes 61a are formed in the base plate parts 61 of the outer members 60, in the resin molding process, a pressure of the resin material filled (injected) into the cavity (C) of the resin mold 400 can be applied to the vibration isolation legs 50 through the penetration holes 61a. Therefore, the vibration isolation legs 50 can be pre-compressed for improving the durability of the vibration isolation legs 50.

Further, the amount of pre-compression of the vibration isolation legs 50 can be varied by changing the filling pressure of the resin material. That is, when the vibration isolation apparatus 1 is manufactured, the spring characteristics of the vibration isolation legs 50 can be adjusted. That is, if the characteristics of the vibration isolation legs 50 are adjusted by the characteristics of the rubber-like elastic material (for example, rubber hardness), since the rubber hardness is largely varied from lot to lot, it is difficult to finely adjust the characteristics of the vibration isolation legs 50. However, since the filling (injection) pressure of a resin material can be adjusted easily and precisely by varying settings of an injection molding machine, the spring characteristics of the vibration isolation legs 50 can be surely adjusted by varying the amount of pre-compression of the vibration isolation legs 50.

In addition, for example, since the resin material filled in the spaces (S) can be pushed toward the vibration isolation legs 50 through the penetration holes 61a by increasing the filling (injection) pressure of the resin material, the resin material can be inserted in the penetration holes 61a and fitted in the vibration isolation legs 50 (For reference, FIGS. 15 to 16 show a molding state where the filling pressure of the resin material is low). Owing to this fitted-in state of the resin material, the vibration isolation apparatus 1 can be manufactured while surely preventing separation of the outer members 60 from the bracket member 30.

Next, an explanation will be given of a structure for covering rubber burrs of the first molding product 100 with the resin material (burying of the rubber burrs in the bracket member 30) with reference to FIGS. 9 to 14.

Figure 13:
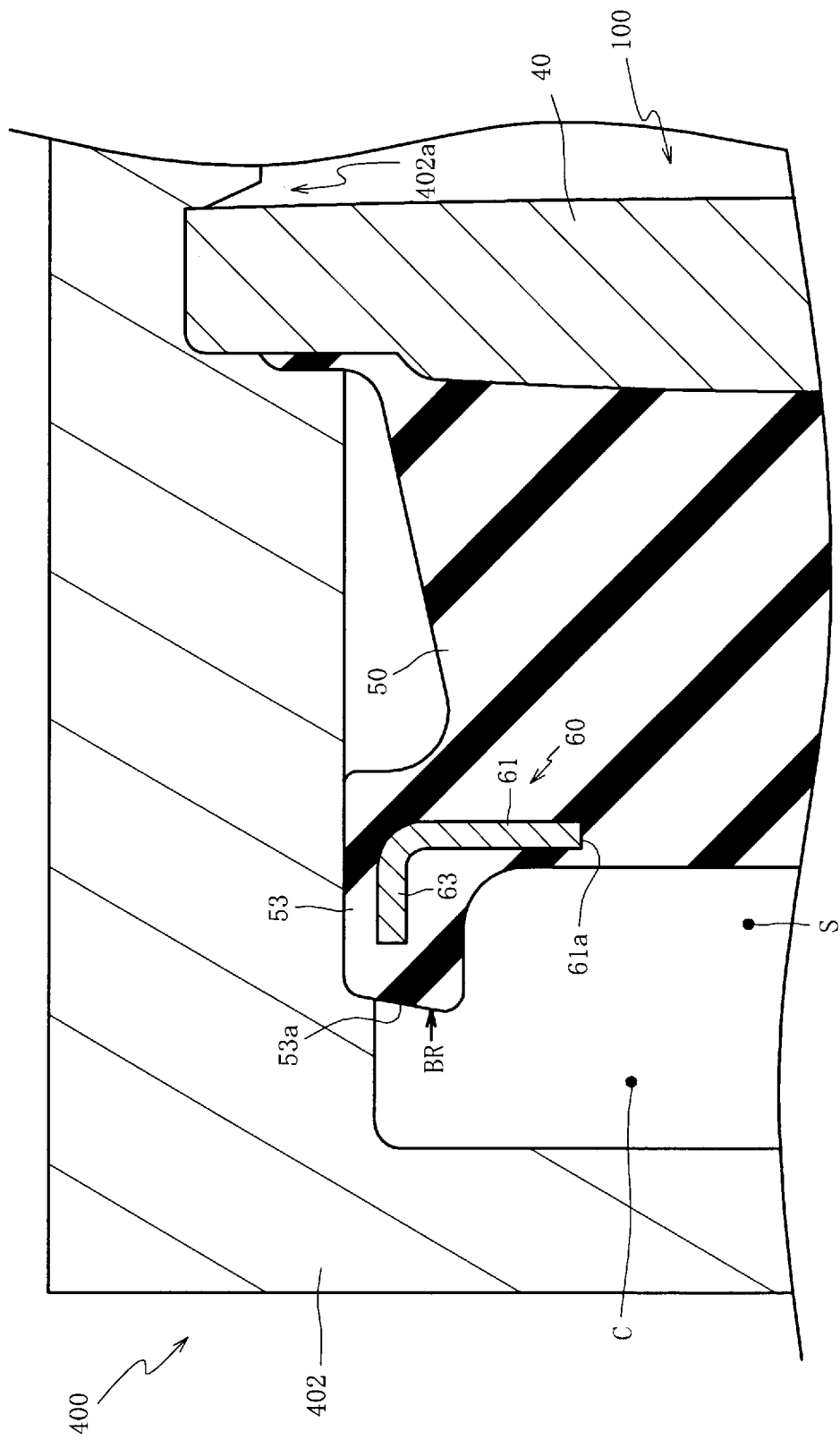
FIG. 13 is a sectional view illustrating the closed resin mold in which the first molding product is placed.
Figure 14:
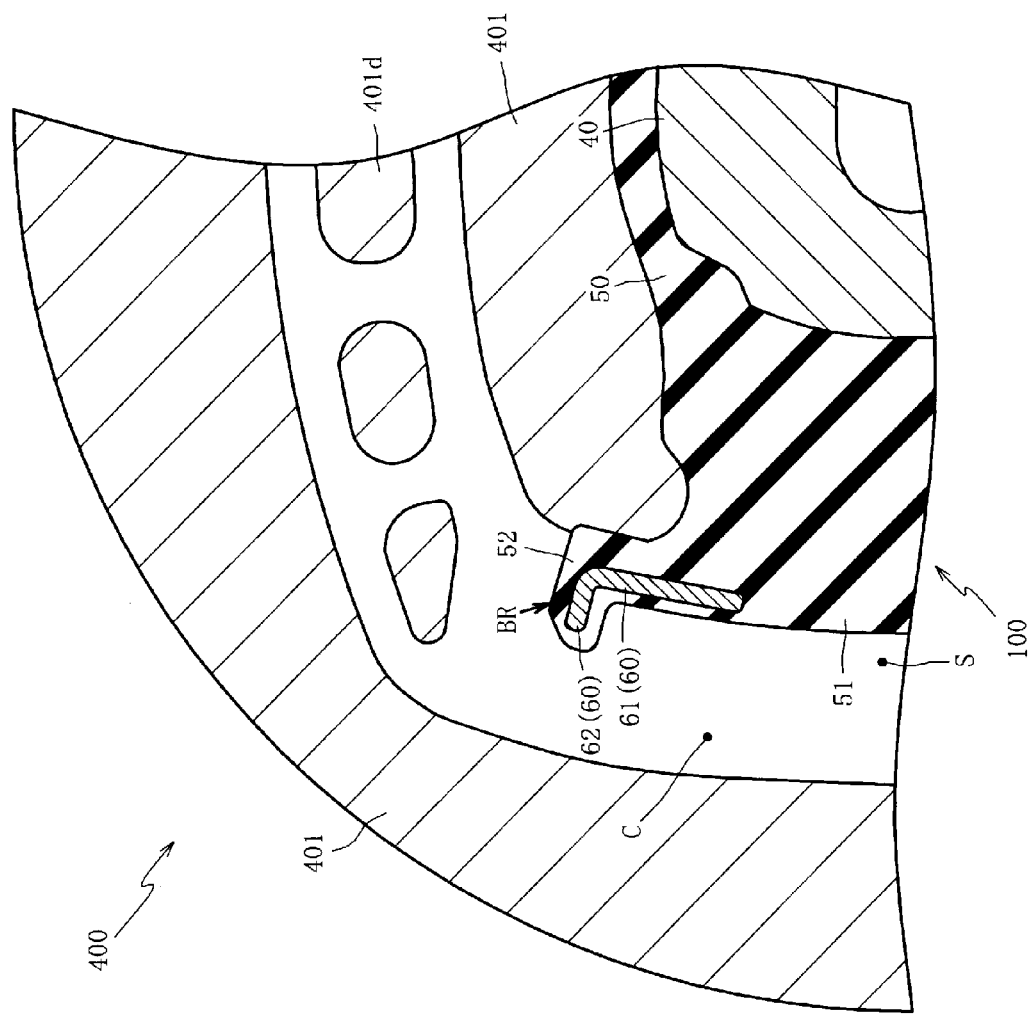
FIG. 14 is a sectional view illustrating the closed resin mold in which the first molding product is placed.

As shown in FIGS. 9 and 10, in the rubber vulcanization mold 300, the parting lines PL where the lower mold 301 makes contact with the middle molds 303 and the upper mold 302 makes contact with the middle molds 303 are set to the side surfaces 53a of the second wall covering rubber parts 53 and the side surfaces of the first wall covering rubber parts 52 (refer to FIGS. 12 to 14). Specifically, as shown in FIG. 9, the parting lines PL set to the side surfaces of the second wall covering rubber parts 53 are closer to the spaces (S) than the bottom surfaces of the second wall parts 63 (the mutually facing surfaces of the pair of second wall parts 63). Further, as shown in FIG. 10, the parting lines PL set to the side surfaces of the first wall covering rubber parts 52 are more opposite to the internal cylinder member 40 than the base plate parts 61.

As shown in FIGS. 12 to 14, on the first molding product 100 formed by vulcanization using the rubber vulcanization mold 300 (on the side surfaces 53a of the second wall covering rubber parts 53 and the side surfaces of the first wall covering rubber parts 52), rubber burrs BR are formed along the parting lines PL. Here, the rubber burrs BR are located on the outer surfaces of portions of the first molding product 100 that are to be inserted in the rubber vulcanization mold 300 (that is, the rubber burrs BR are located on portions of the second wall covering rubber parts 53 and the first wall covering rubber parts 52 that face the cavity (C) of the resin mold 400).

Therefore, although the rubber burrs BR are formed on the first molding product 100, when the first molding product 100 is placed in the resin mold 400 for insert molding, it is unnecessary to insert portions of the first molding product 100 where the rubber burrs BR are formed into predetermined portions of the resin mold 400 (positions of the resin mold 400 that make contact with the second wall covering rubber parts 53 or the first wall covering rubber parts 52 for sealing). That is, the rubber burrs BR are placed in the cavity (C) of the resin mold 400.

Therefore, when the first molding product 100 is placed in the resin mold 400 in the resin molding process, the second wall covering rubber parts 53 or the first wall covering rubber parts 52 may not be damaged because it is unnecessary to forcibly insert portions where the rubber burrs BR are formed, and the second wall covering rubber parts 53 or the second wall covering rubber parts 53 may be easily placed on predetermined portions of the resin mold 400 (on portions of the resin mold 400 that make contact with the second wall covering rubber parts 53 or the first wall covering rubber parts 52 for sealing). Thus, the first molding product 100 can be placed in the resin mold 400 in shorter time. As a result, workability can be improved when placing the first molding product 100 in the resin mold 400.

Further, as described above, since it is unnecessary to place the rubber burrs BR on predetermined portions of the resin mold 400 (positions of the resin mold 400 that make contact with the second wall covering rubber parts 53 for sealing), sealing at the predetermined portions of the resin mold 400 can be improved, and thus generation or resin burrs can be suppressed. Therefore, elastic stopper functions of the second wall covering rubber parts 53 may not be decreased due to resin burrs formed in the vicinity of the second wall covering rubber parts 53.

In addition, the aesthetic appearance of a product can be improved because rubber burrs BR do not appear on the outer side of the first molding product 100, and cracks of the second wall covering rubber parts 53 starting from acute-angled rubber burrs BR can be prevented.

Furthermore, rubber burrs BR formed on the side surfaces 53a of the second wall covering rubber parts 53 are closer to the spaces (S) than the bottom surfaces of the second wall parts 63 (the mutually facing surfaces of the pair of second wall parts 63) (refer to FIGS. 12 and 13). That is, since the rubber burrs BR are located away from the second wall parts 63, deformation of the second wall covering rubber parts 53 (the side surfaces 53a) can be ensured. Therefore, when the rubber burrs BR are buried in the resin material, it is possible to induce deformation around the rubber burrs BR according to a flow of the resin material for suppressing bubbling.

Here, as shown in FIGS. 12 and 13, the sectional areas of the second wall covering rubber parts 53 reduce in directions from the spaces (S) to stopper surfaces (upward direction in FIGS. 12 and 13) so that the side surfaces 53a (where the rubber burrs BR are formed) are sloped with a tapered shape. Therefore, as shown in FIG. 9, the inner surfaces of the upper mold 302 are sloped with a tapered shape in accordance with the sloped surfaces 53a of the second wall covering rubber parts 53. Thus, although the positions of the parting lines PL are retracted in an opposite direction (lower side in FIG. 9) to the separation direction of the upper mold 302 so as to cover the rubber burrs BR with the resin material, separation resistance of the upper mold 302 can be reduced, and thus the upper mold 302 can be easily separated. This is the same in the lower mold 301.

Further, since the sectional areas of the second wall covering rubber parts 53 reduce in directions from the spaces (S) to the stopper surfaces so that the side surfaces 53a are sloped with a tapered shape, the volumes of the second wall covering rubber parts 53 can be reduced as much as that. As a result, stopper side portions of the second wall covering rubber parts 53 that function as stopper members can be affected by contraction after vulcanization, and thus the durability thereof can be improved.

In addition, as shown in FIGS. 12 and 13, the second wall parts 63 of the outer members 60 are buried in the second wall covering rubber parts 53 in parallel with the stopper surfaces and space (S) side surfaces of the second wall covering rubber parts 53, and the distances from the second wall parts 63 to the stopper surfaces (upper side and protruded tip surfaces in FIGS. 12 and 13) of the second wall covering rubber parts 53 are smaller than the distances from the second wall parts 63 to the space (S) side surfaces of the second wall covering rubber parts 53.

Therefore, in the second wall covering rubber parts 53, the stopper side portions (that is, portions between the stopper surfaces and the second wall parts 63) can be smaller in rubber volume than space (S) side portions (that is, portions between the second wall parts 63 and the spaces (S)). Thus, after a vulcanization process, the space (S) side portions having larger volumes are much contracted, and the stopper side portions are less contracted. As a result, the stopper side portions of the second wall covering rubber parts 53 that function as stopper members can have improved durability.

Further, as shown in FIGS. 12 and 13, although the side surfaces 53a of the second wall covering rubber parts 53 are close to the spaces (S) than the rubber burrs BR, since the side surfaces 53a are sloped with a tapered shaped as described above, the space (S) side portions of the second wall covering rubber parts 53 have large rubber volumes. Therefore, owing to this, in the second wall covering rubber parts 53, the rubber volumes of the stopper side portions are smaller than the rubber volumes of the space (S) side portions. Therefore, after a vulcanization process, the space (S) side portions having larger rubber volumes can be much contracted, and the stopper side portions can be less contracted. As a result, the stopper side portions of the second wall covering rubber parts 53 that function as stopper members can have further improved durability.

In addition, since the side surfaces 53a of the second wall covering rubber parts 53 are sloped with a tapered shape as described above, contraction of the stopper side portions of the second wall covering rubber parts 53 can be reduced as compared with, for example, contraction of the space (S) side portions of the second wall covering rubber parts 53 which have a relatively large thickness (lower side dimensions in FIGS. 12 and 13). Furthermore, in this case, the width of the spaces (S) (vertical direction in FIGS. 12 and 13) can be ensured, and thus the other ends of the vibration isolation legs 50 may not be easily separated from the bracket member 30.

The structure of the above-described vibration isolation apparatus 1 will now be described in more detail with reference to FIGS. 15 and 16. FIGS. 15 and 16 are partial sectional views of the vibration isolation apparatus 1. FIGS. 15 and 16 correspond to FIGS. 7A and 7B, respectively. In FIG. 15, when the vibration isolation apparatus 1 is attached to a vehicle, an opponent part 500 facing the second wall covering rubber parts 53 is shown. In FIG. 16, an enlarged view of a portion of the vibration isolation apparatus 1 is shown, in which section lines of the bracket member 30 and covering rubber parts 51 and 52 are omitted for conciseness.

As shown in FIGS. 15 and 16, the other end of the vibration isolation leg 50 (left side in FIGS. 15 and 16) is bonded to the front side of the base plate part 61 by vulcanization adhesion. From the outer edges of the base plate part 61, the pair of first wall parts 62 extend toward the bracket member 30 (that is, away from the vibration isolation leg 50) while being widened, and along with this, the pair of second wall parts 63 extend in parallel with each other. The first wall parts 62 and the second wall parts 63 are connected along the periphery of the base plate part 61 (that is, along the outer edges of the base plate part 61). In this state, the other end of the vibration isolation leg 50, the base plate part 61, the first wall parts 62, and the second wall parts 63 are buried in the bracket member 30.

Therefore, movement of the outer member 60 relative to the bracket member 30 in the left and right directions of the vehicle (the directions of arrows L and R: up and down directions in FIG. 15) can be restricted by engagement of the pair of second wall parts 63 with a portion of the bracket member 30 inserted between the second wall parts 63.

Further, movement of the outer member 60 relative to the bracket member 30 in the up and down directions of the vehicle (the directions of arrows U and D: up and down directions in FIG. 16) can be restricted by: engagement between the pair of first wall parts 62 and a portion of the bracket member 30 inserted between the first wall parts 62; and engagement between the pair of first wall parts 62 and narrow portions of the bracket member 30 between which both sides of the first wall parts 62 are held.

In addition, movement of the outer member 60 in directions away from the bracket member 30 (left and right directions in FIG. 16), that is, in the front and back directions of the vehicle (the directions of arrows F and B: left and right directions in FIG. 16) can be restricted by engagement of the pair of first wall parts 62 and protrusions of the bracket member 30 that extend along outer sides of the first wall parts 62 (refer to a portion L in FIG. 16).

Since the engagement between the outer member 60 and the bracket member 30 in the front and back directions of the vehicle is accomplished by embedding the pair of first wall parts 62 of the outer member 60 in the bracket member 30, it is unnecessary to make the bracket member 30 protrude toward the vibration isolation leg 50 for engaging the outer member 60, and unlike the related art, formation of an undercut shape can be suppressed. Therefore, the resin mold 400 for forming the bracket member 30 can have a simple structure.

In the vibration isolation apparatus 1, since movement of the outer member 60 relative to the bracket member 30 can be restricted in any direction, although the internal cylinder member 40 is moved in any direction, the engagement between the outer member 60 and the bracket member 30 can be maintained to prevent the outer member 60 from separating from the bracket member 30.

The outer member 60 can be easily manufactured while making it possible to restrict movement of the outer member 60 relative to the bracket member 30 in any direction. That is, since the outer member 60 has a shape (so called container shape) in which the plate-shaped first and second wall parts 62 and 63 extend from the outer edges of the plate-shaped base plate part 61 in a predetermined direction (refer to FIGS. 3 and 4), the outer member 60 can be easily manufactured from a flat plate through a drawing process using a punch, a die, and a press machine. Therefore, the manufacturing cost of the outer member 60 can be reduced, and thus the total manufacturing costs of the vibration isolation apparatus 1 can be reduced as much as that.

In this case, since ends of the first wall parts 62 and the second wall parts 63 are connected (that is, the first wall parts 62 and the second wall parts 63 are connected in the peripheral direction of the outer member 60), strength of the first and second wall parts 62 and 63 can be increased in bending directions (swinging directions with reference to the base plate part 61). Therefore, the thickness of the outer member 60 can be reduced as much as that, and thus material cost reduction and weigh reduction are possible.

Further, as described above, since the second wall parts 63 are buried in the second wall covering rubber parts 53, if the second wall covering rubber parts 53 are used as stopper members that make contact with the opponent part 500 and restrict movement of the opponent part 500, the second wall parts 63 (that is, the outer member 60) receive an impactive force when the opponent part 500 makes contact with the second wall covering rubber parts 53, and thus the bracket member 30 may receive less load. Therefore, although the bracket member 30 is formed of a resin material, the durability of the bracket member 30 can be improved.

In addition, as described above, the ends of the second wall parts 63 are connected to the ends of the first wall parts 62, and thus the bending strength of the second wall parts 63 is improved. Therefore, the second wall parts 63 can rigidly receive an impactive force when the opponent part 500 is brought into contact with the second wall covering rubber parts 53, and thus the durability of the bracket member 30 as well as the durability of the outer member 60 can be improved.

Figure 17B:
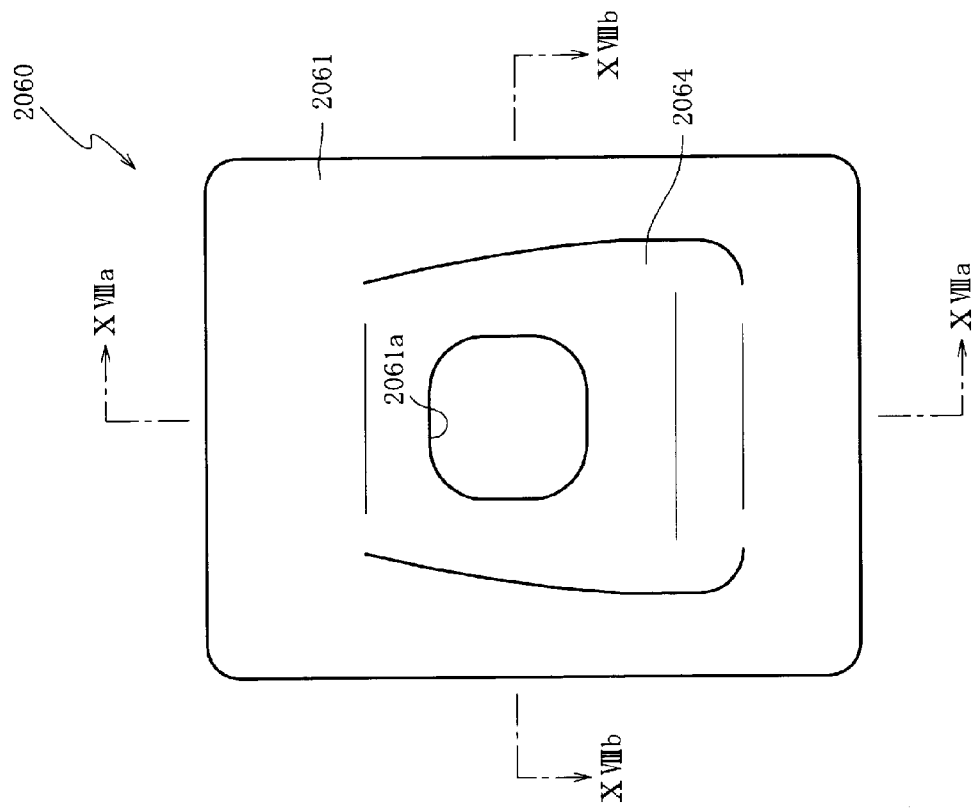
FIG. 17B is a front view illustrating the outer member.
Figure 17A:
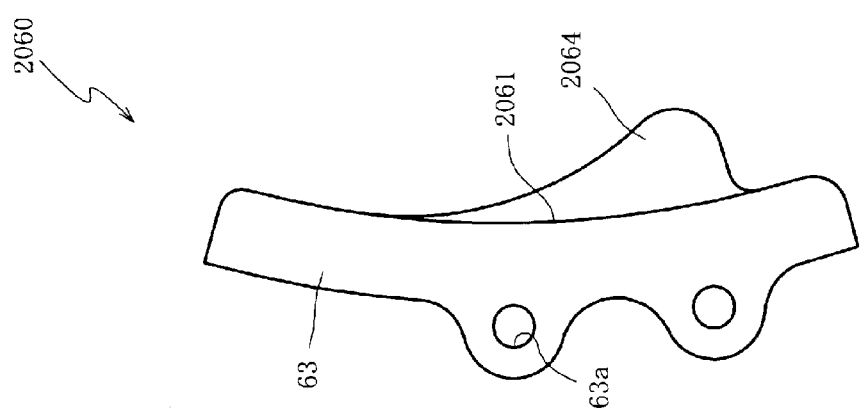
FIG. 17A is a side view illustrating an outer member according to a second embodiment.
Figure 18B:
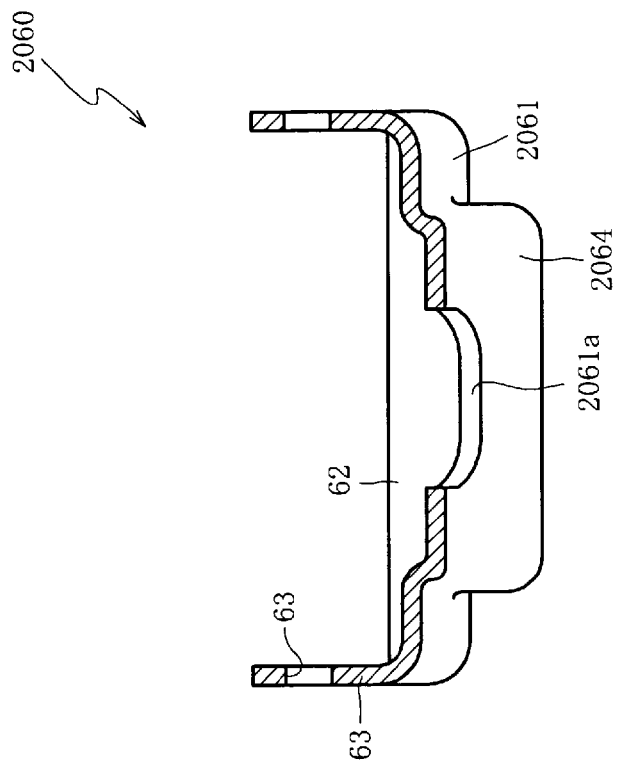
FIG. 18B is a sectional view of the outer member taken along line XVIIIb-XVIIIb of FIG. 17B.
Figure 18A:
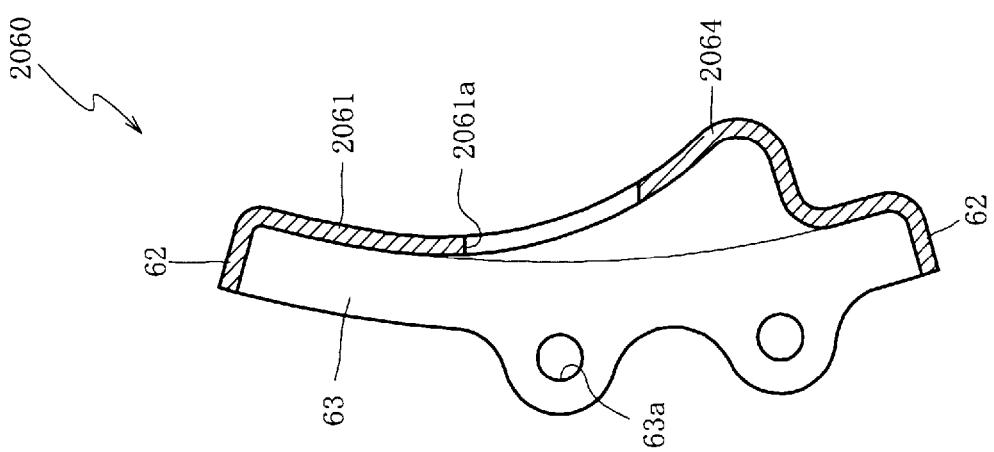
FIG. 18A is a sectional view of the outer member taken along line XVIIIa-XVIIIa of FIG. 17B.

Next, a second embodiment will be described with reference to FIGS. 17 to 19. FIG. 17A is a side view illustrating an outer member 2060 according to the second embodiment, and FIG. 17B is a front view illustrating the outer member 2060. FIG. 18A is a sectional view of the outer member 2060 taken along line XVIIIa-XVIIIa of FIG. 17B, and FIG. 18B is a sectional view of the outer member 2060 taken along line XVIIIb-XVIIIb of FIG. 17B.

In the first embodiment, the base plate part 61 of the outer member 60 is bent backward in a convex shape with an arc-shaped section. In the second embodiment, a base plate part 2061 of the outer member 2060 is bent backward in a convex shape with an arc-shaped section, and a protrusion part 2064 extends forward from the bent side of the base plate part 2061. The same elements as those of the first embodiment will be denoted by the same reference numerals, and description thereof will not be repeated.

As shown in FIGS. 17 and 18, the outer member 2060 includes the base plate part 2061 having a rectangular shape when viewed from the front. Like in the first embodiment, first wall parts 62 and second wall parts 63 extend from the outer edges of the base plate part 2061 in a backward direction (left side in FIGS. 17A and 18A).

The base plate part 2061 is curved in an arc shape having a center L1 (refer to FIG. 4A) so that the base plate part 2061 is convex in the backward direction, and the protrusion part 2064 is formed on an approximately center lower region (lower region in FIG. 17B) of the base plate part 2061. Further, a penetration hole 2061a having an approximately rectangular shape when viewed from the front is formed in a center region of the base plate part 2061 (that is, in a region including the protrusion part 2064).

The protrusion part 2064 protrudes from the front side (left side in FIGS. 17A and 18A) of the base plate part 2061 toward an internal cylinder member 40 (refer to FIG. 19), and the height of the protrusion part 2064 increases gradually from about the center of the base plate part 2061 (that is, about the center between the pair of the first wall parts 62) toward one of the first wall parts 62 (lower side in FIGS. 17A and 18A).

Further, the highest portion of the protrusion part 2064 has a predetermined width in a direction crossing the pair of second wall parts 63. In addition, preferably, the predetermined width of the highest portion may be 50% or more of the width of the base plate part 2061. In this case, a spring constant can be sufficiently large in the up and down directions of a vehicle.

The outer member 2060 is formed from a flat plate through a drawing process using a press machine. Therefore, the base plate part 2061, the wall parts 62 and 63, and the protrusion part 2064 of the outer member 2060 can be formed in one piece. The protrusion part 2064 protrudes from the front side (right side in FIG. 18A), and a concave portion corresponding to the protrusion part 2064 is formed on the backside (left side in FIG. 18A) of the base plate part 2061.

Next, a vibration isolation apparatus 2001 including the above-described outer member 2060 will be described with reference to FIG. 19. FIG. 19 is a partially enlarged sectional view of the vibration isolation apparatus 2001. FIG. 19 corresponds to FIG. 16.

Figure 19:
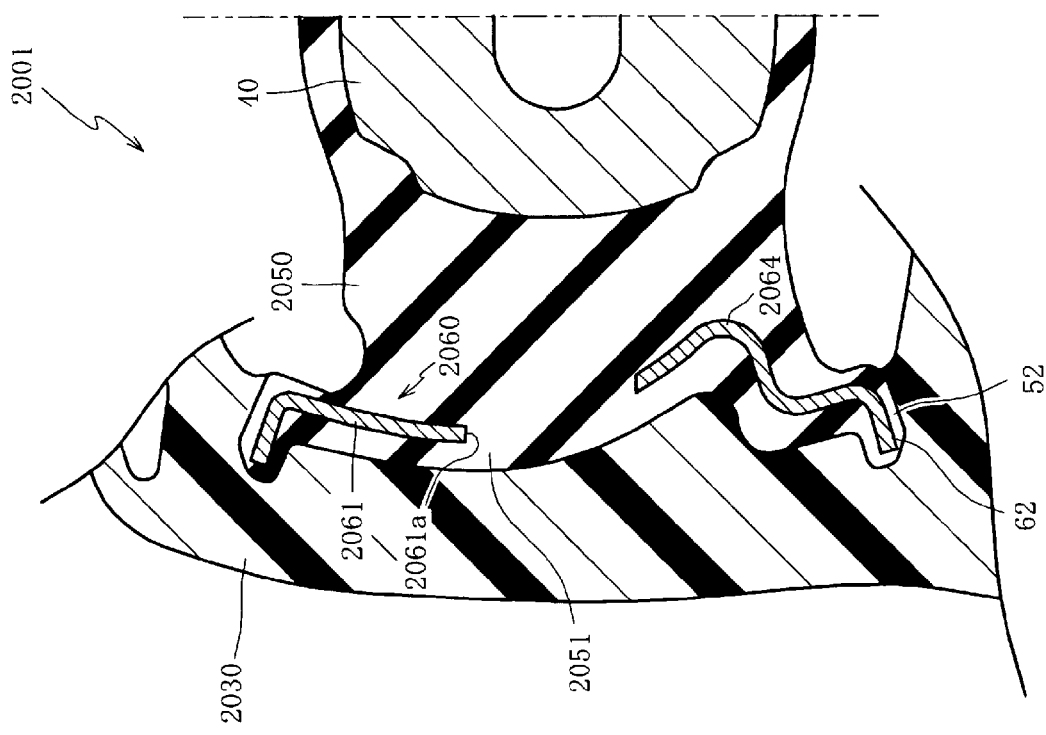
FIG. 19 is a partially enlarged sectional view illustrating a vibration isolation apparatus.

As shown in FIG. 19, in the vibration isolation apparatus 2001, the other end of a vibration isolation leg 2050 (left in FIG. 19) is bonded to the front side of the base plate part 2061 by vulcanization adhesion, and the protrusion part 2064 is embedded in the vibration isolation leg 2050. A base plate covering rubber part 2051 extends from the vibration isolation leg 2050 and covers the outer surfaces of the base plate part 2061 and the protrusion part 2064 to a predetermined thickness. A concave portion corresponding to the protrusion part 2064 is formed in a space (S) (not shown, refer to FIG. 7B) among mutually facing surfaces of the wall parts 62 and 63 of the outer member 2060 (that is, the concave portion is formed in a region surrounded by the base plate part 2061, the protrusion part 2064, the first wall parts 62, and the second wall parts 63). A portion of a bracket member 2030 is fitted in the concave portion.

In the vibration isolation apparatus 2001, the protrusion part 2064 is formed on the base plate part 2061 of the outer member 2060. The protrusion part 2064 protrudes toward the bracket member 30. The height of the protrusion part 2064 increases gradually from about the center of the base plate part 2061 toward one of the first wall parts 62, and the highest portion of the protrusion part 2064 has a predetermined width in a direction crossing the pair of first wall parts 62 (that is, in the axis direction of the internal cylinder member 40). Therefore, the spring constant of the vibration isolation apparatus 2001 can be increased only in the up and down directions of the vehicle (the directions of arrows U and D) while preventing the spring constant from increasing in the front and back directions of the vehicle (the directions of arrows F and B) and the left and right directions of the vehicle (the directions of arrows L and R).

That is, when the internal cylinder member 40 is moved in the up and down directions of the vehicle (the directions of the arrows U and D), a relatively short portion connecting the highest portion of the protrusion part 2064 and the outer surface of the internal cylinder member 40 is mainly expanded and contracted, and thus the spring constant is increased.

If the internal cylinder member 40 is moved in the left and right directions of the vehicle (the directions of the arrows L and R), a relatively long portion having a large rubber volume defined from a region (upper region in FIG. 19) of the base plate part 2061 where the protrusion part 2064 is not formed and a lower region of the protrusion part 2064 to the outer surface of the internal cylinder member 40 is mainly deformed by shearing. Therefore, the spring constant is not increased. If the internal cylinder member 40 is moved in the front and back directions of the vehicle (the directions of the arrows F and B), a relatively long portion having a large rubber volume defined from a region of the base plate part 2061 where the protrusion part 2064 is not formed and a lower region of the protrusion part 2064 to the outer surface of the internal cylinder member 40 is mainly expanded and contracted. Therefore, the spring constant is not increased.

In a region of the protrusion part 2064 where the height of the protrusion part 2064 increases gradually from about the center of the base plate part 2061 to the highest portion of the protrusion part 2064, the protrusion part 2064 is convex backward from the base plate part 2061 and is smoothly curved from the base plate part 2061 in an arc shape (refer to FIG. 18A).

Therefore, a portion connecting the highest portion of the protrusion part 2064 and the outer surface of the internal cylinder member 40 can have a short length, and a portion defined from a region (upper region in FIG. 19) of the base plate part 2061 where the protrusion part 2064 is not formed and a lower region of the protrusion part 2064 to the outer surface of the internal cylinder member 40 can have a long length and large rubber volume. This structure is effective to increase the spring constant in the up and down directions of the vehicle (the directions of the arrows U and D) while preventing the spring constant from increasing in the front and back directions of the vehicle (the directions of the arrows F and B) and the left and right directions of the vehicle (the directions of arrows L and R).

The string constant may be increased in the up and down directions of the vehicle by forming a protrusion part on the internal cylinder member 40. However, since the internal cylinder member 40 is required to be strong for being fixedly coupled to a vibration source, the internal cylinder member 40 is formed into a cylindrical shape having a relatively large thickness by using a steel material or an aluminum alloy. Thus, if a protrusion part is formed on the internal cylinder member 40, process and material costs may be increased.

Therefore, in the vibration isolation apparatus 2001, the protrusion part 2064 is formed on the outer member 2060 formed of a flat plate. The protrusion part 2064 can be easily formed through a drawing process using a press machine. Therefore, process and material costs can be reduced.

Further, in the case where a protrusion part is formed on the internal cylinder member 40, the protrusion part may be solid to increase the weight. However, in the vibration isolation apparatus 2001, since the base plate part 2061 is formed of a flat plate through a drawing process, the protrusion part 2064 can be formed on the base plate part 2061 without increasing the weight of the vibration isolation apparatus 2001.

In addition, owing to the protrusion part 2064, a concave portion corresponding to the protrusion part 2064 is formed in the backside (left in FIG. 19) of the base plate part 2061. Thus, a portion of the bracket member 2030 can be fitted in the concave portion. Thus, the vibration isolation leg 2050 and the bracket member 2030 can be engaged more firmly, and thus separation of the other end of the vibration isolation leg 2050 from the bracket member 2030 can be suppressed.

Figure 20B:
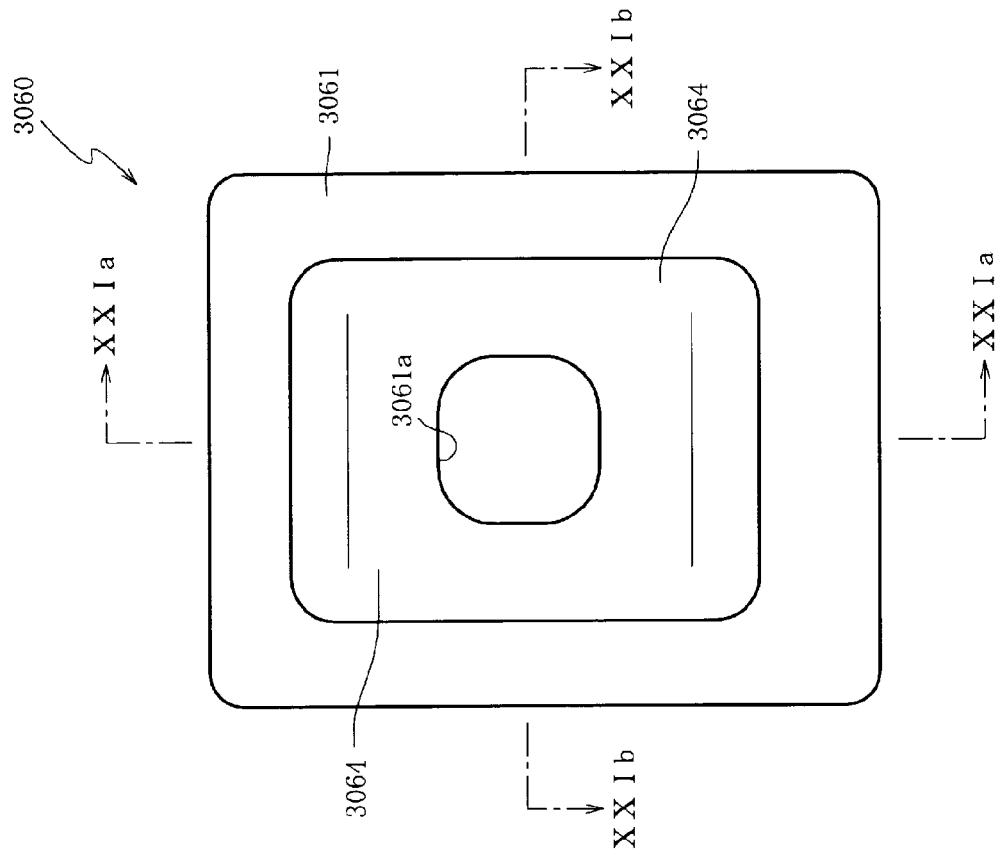
FIG. 20B is a front view illustrating the outer member.
Figure 20A:
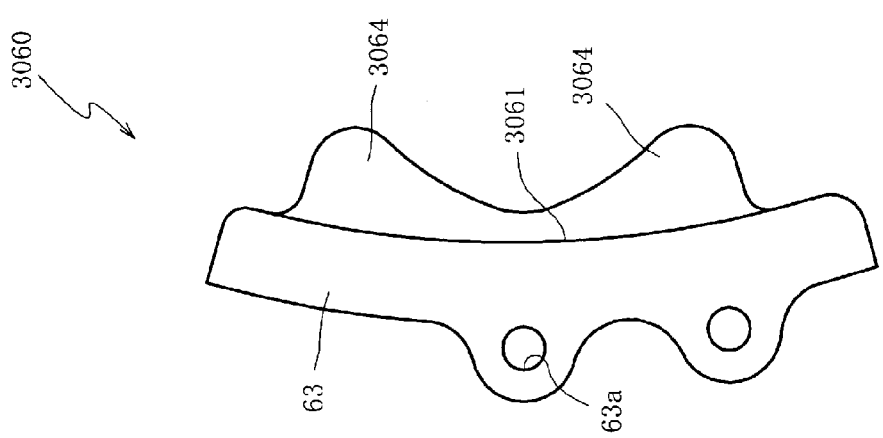
FIG. 20A is a side view illustrating an outer member according to a third embodiment.

Next, a third embodiment will be described with reference to FIGS. 20 to 22. FIG. 20A is a side view illustrating an outer member 3060 according to the third embodiment, and FIG. 20B is a front view illustrating the outer member 3060. FIG. 21A is a sectional view of the outer member 3060 taken along line XXIa-XXIa of FIG. 20B, and FIG. 21B is a sectional view of the outer member 3060 taken along line XXIb-XXIb of FIG. 20B.

In the first embodiment, the base plate part 61 of the outer member 60 is bent backward in a convex shape with an arc-shaped section. In the third embodiment, a base plate part 3061 of the outer member 3060 is bent backward in a convex shape with an arc-shaped section, and two protrusion parts 3064 extend forward from the bent side of the base plate part 3061. The same elements as those of the previous embodiments will be denoted by the same reference numerals, and description thereof will not be repeated.

As shown in FIGS. 20 and 21, the outer member 3060 includes the base plate part 3061 having a rectangular shape when viewed from the front. Like in the first embodiment, first wall parts 62 and second wall parts 63 extend from the outer edges of the base plate part 3061 in a backward direction (left in FIGS. 20A and 21A).

The base plate part 3061 is curved in an arc shape having a center L1 (refer to FIG. 4A) so that the base plate part 3061 is convex in the backward direction, and the pair of protrusion parts 3064 are formed on the front side of the base plate part 3061 (front side of the plane of the paper in FIG. 20B). The pair of protrusion parts 3064 are disposed at both sides (upper and lower sides in FIG. 20A) of about the center of the base plate part 3061 to face each other. Further, a penetration hole 3061a having an approximately rectangular shape when viewed from the front is formed in a center region of the base plate part 3061 (that is, in a region including the pair of protrusion parts 3064).

In the above configuration, each of the protrusion parts 3064 has the same structure as the protrusion part 2064 of the second embodiment. In other words, as compared with the outer member 2060 of the second embodiment, the outer member 3060 of the third embodiment includes an additional protrusion part 3064 which is disposed oppositely in direction (direction in which the height of the protrusion part 2064 varies) to face the other protrusion part 3064. Thus, a detailed description of the protrusion parts 3064 will be omitted.

Next, a vibration isolation apparatus 3001 including the above-described outer member 3060 will be described with reference to FIG. 22. FIG. 22 is a partially enlarged sectional view of the vibration isolation apparatus 3001. FIG. 22 corresponds to FIG. 16.

Figure 22:
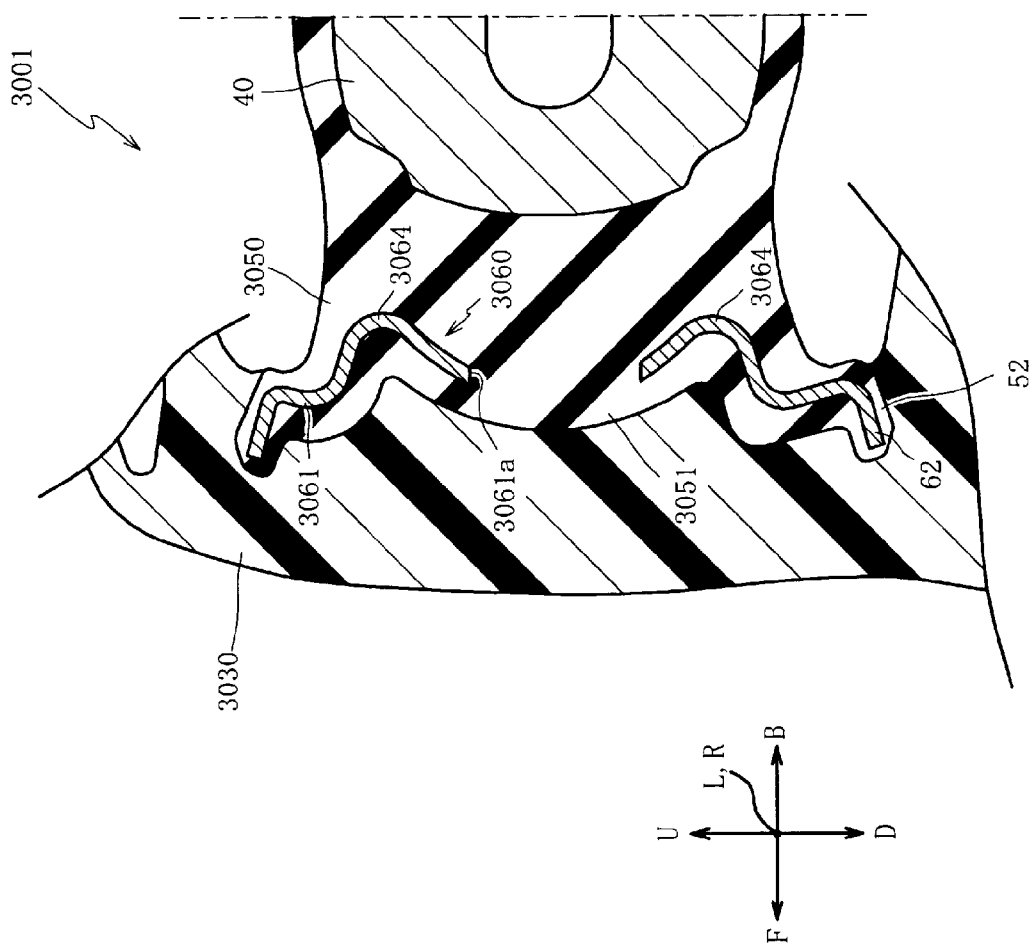
FIG. 22 is a partially enlarged sectional view illustrating a vibration isolation apparatus.

As shown in FIG. 22, in the vibration isolation apparatus 3001, the other end of a vibration isolation leg 3050 (left in FIG. 22) is bonded to the front side of the base plate part 3061 by vulcanization adhesion, and the protrusion parts 3064 are embedded in the vibration isolation leg 3050. A base plate covering rubber part 3051 extends from the vibration isolation leg 3050 and covers the outer surfaces of the base plate part 3061 and the pair of protrusion parts 3064 to a predetermined thickness. Concave portions corresponding to the pair of protrusion parts 3064 are formed in a space (S) (not shown, refer to FIG. 7B) among mutually facing surfaces of the wall parts 62 and 63 of the outer member 3060 (that is, the concave portions are formed in a region surrounded by the base plate part 3061, the pair of protrusion parts 3064, the first wall parts 62, and the second wall parts 63). Portions of a bracket member 3030 are fitted in the concave portions.

In the vibration isolation apparatus 3001, the protrusion parts 3064 are formed on the base plate part 3061 of the outer member 3060. The height of one of the pair of protrusion parts 3064 increases gradually from about the center of the base plate part 3061 toward one of the first wall parts 62 (toward the lower side in FIG. 22), and the height of the other of the pair of protrusion parts 3064 increases gradually from about the center of the base plate part 3061 toward the other of the first wall parts 62 (toward the upper side in FIG. 22). In this state, the pair of protrusion parts 3064 face each other. Therefore, while preventing the spring constant of the vibration isolation apparatus 3001 from increasing in the front and back directions of a vehicle (the directions of arrows F and B) and the left and right directions of the vehicle (the directions of arrows L and R), the spring constant can be increased only in the up and down directions of the vehicle (the directions of the arrows U and D) for the cases where an internal cylinder member 40 is moved in the up direction of the vehicle (the direction of the arrow U) and the internal cylinder member 40 is moved in the down direction of the vehicle (the direction of the arrow D).

Further, owing to the protrusion parts 3064, two concave portions corresponding to the protrusion parts 3064 are formed at distant positions of the backside (left in FIG. 22) of the base plate part 3060. Thus, portions of the bracket member 3030 can be fitted in the two concave portions. Thus, the vibration isolation leg 3050 and the bracket member 3030 can be engaged more firmly, and thus separation of the other end of the vibration isolation leg 3050 from the bracket member 3030 can be suppressed.

Figure 23B:
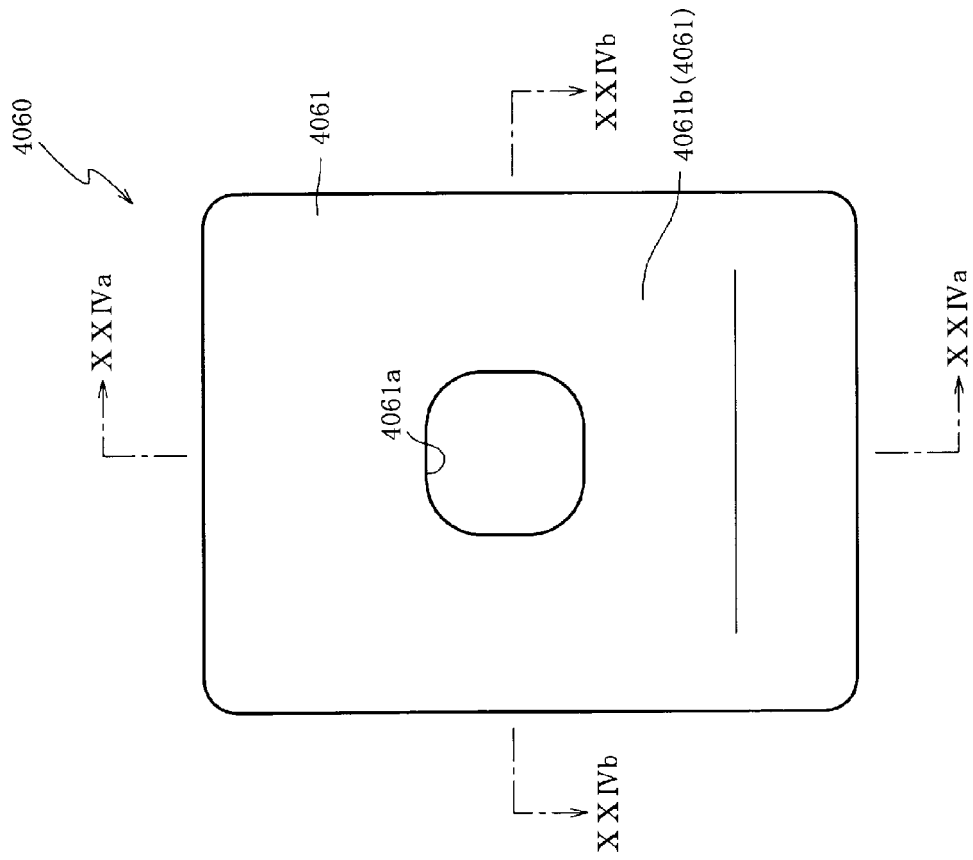
FIG. 23B is a front view illustrating the outer member.
Figure 23A:
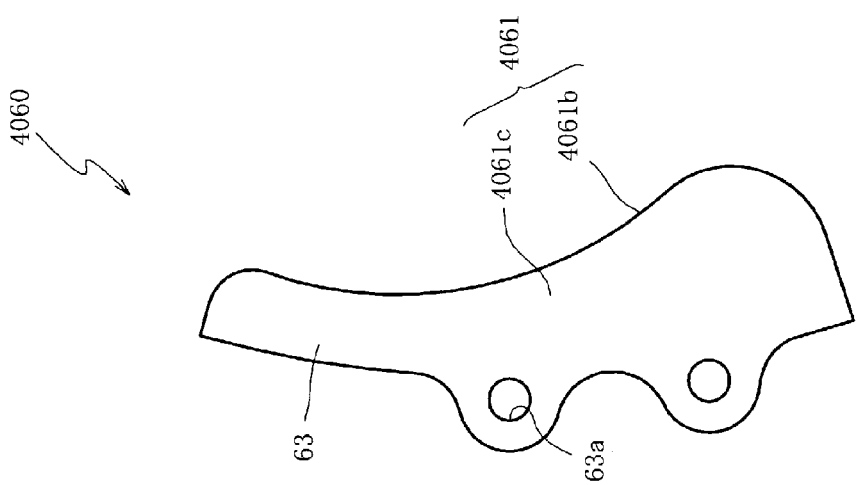
FIG. 23A is a side view illustrating an outer member according to a fourth embodiment.
Figure 24B:
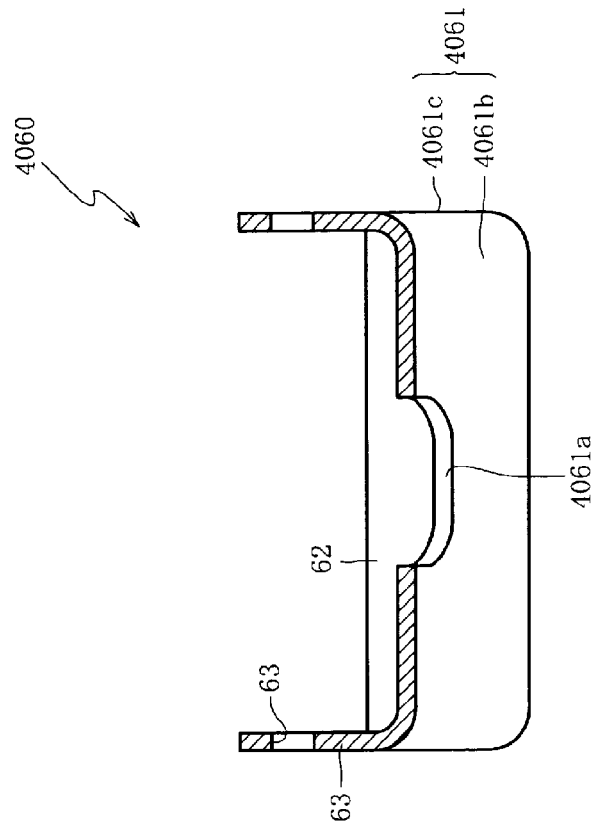
FIG. 24B is a sectional view of the outer member taken along line XXIVb-XXIVb of FIG. 23B.
Figure 24A:
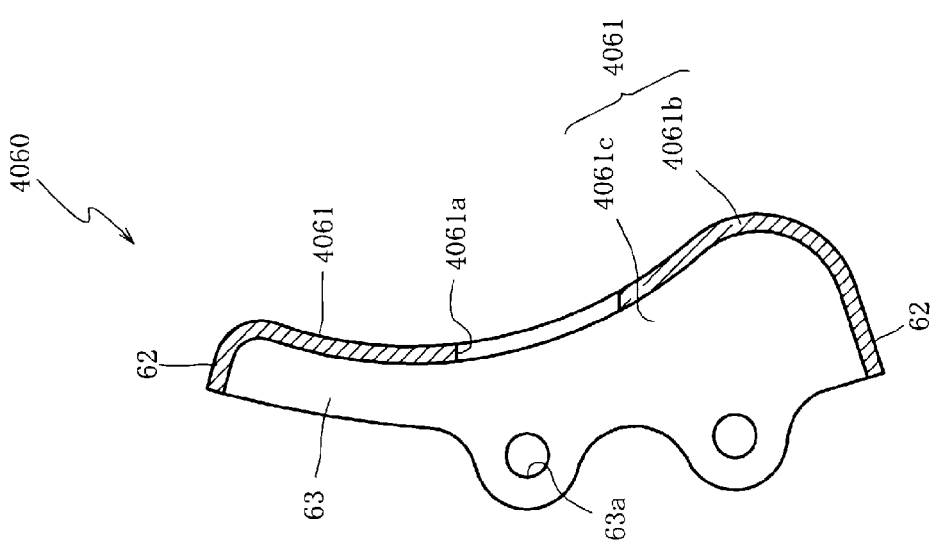
FIG. 24A is a sectional view of the outer member taken along line XXIVa-XXIVa of FIG. 23B.

Next, a fourth embodiment will be described with reference to FIGS. 23 to 25. FIG. 23A is a side view illustrating an outer member 4060 according to the fourth embodiment, and FIG. 23B is a front view illustrating the outer member 4060. FIG. 24A is a sectional view of the outer member 4060 taken along line XXIVa-XXIVa of FIG. 23B, and FIG. 24B is a sectional view of the outer member 4060 taken along line XXIVb-XXIVb of FIG. 23B.

In the second and third embodiments, the protrusion parts 2064 and 3064 are formed on portions of the front sides of the base plate parts 2061 and 3061 of the outer members 2060 and 3060. However, in the outer member 4060 of the fourth embodiment, a protrusion part is formed over the entire region of a base plate part 4061. The same elements as those of the previous embodiments will be denoted by the same reference numerals, and description thereof will not be repeated.

As shown in FIGS. 23 and 24, the outer member 4060 includes the base plate part 4061 having a rectangular shape when viewed from the front. Like in the first embodiment, first wall parts 62 and second wall parts 63 extend from the outer edges of the base plate part 4061 in a backward direction (left in FIGS. 23A and 24A).

The base plate part 4061 includes a protrusion front part 4061b and a pair of protrusion side parts 4061c. The protrusion front part 4061b connects the pair of first wall parts 62. Along with this, the protrusion front part 4061b is curved in an arc-shaped sectional shape in a manner such that the height of the protrusion front part 4061b increases gradually from about the center of the base plate part 4061 to one of the first wall parts 62 (lower side in FIGS. 23A and 24A). Further, the protrusion front part 4061b protrudes toward an internal cylinder member 40 (refer to FIG. 25). The protrusion side parts 4061c are disposed on both sides of the protrusion front part 4061b (front and back sides of the paper in FIG. 24A) to connect the protrusion front part 4061b to the second wall parts 63. In addition, the protrusion side parts 4061c have a flat plate shape and extend from the second wall parts 63 to form the same planes together with the second wall parts 63, respectively. In the fourth embodiment, a protrusion part is constituted by the protrusion front part 4061b and the protrusion side parts 4061c.

Therefore, in the fourth embodiment, the entire region of the outer member 4060 is smoothly curved, and thus the outer member 4060 can be less folded or bent. As a result, even when the protrusion part is formed on the outer member 4060, a narrow portion (angled portion) may not be formed, and thus when the outer member 4060 and a vibration isolation leg 4050 are bonded together, a bonding error can be prevented. Further, when the outer member 4060 is formed through a drawing process using a press machine, load may not be concentrated on a portion of the outer member 4060, and thus defects such as a crack can be prevented.

Next, a vibration isolation apparatus 4001 including the above-described outer member 4060 will be described with reference to FIG. 25. FIG. 25 is a partially enlarged sectional view of the vibration isolation apparatus 4001. FIG. 25 corresponds to FIG. 16.

Figure 25:
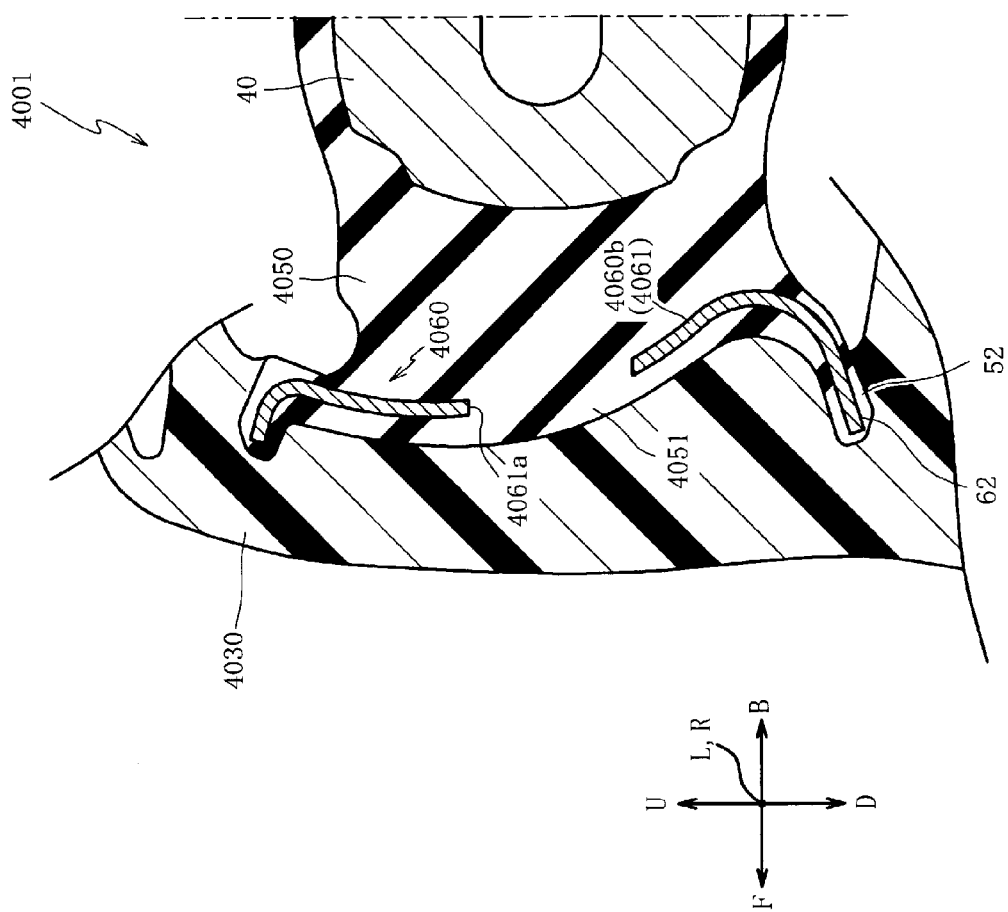
FIG. 25 is a partially enlarged sectional view illustrating a vibration isolation apparatus.

As shown in FIG. 25, in the vibration isolation apparatus 4001, the other end of the vibration isolation leg 4050 (left in FIG. 25) is bonded to the front side of the base plate part 4061 by vulcanization adhesion. A base plate covering rubber part 4051 extends from the vibration isolation leg 4050 and covers the outer surface of the base plate part 4051 to a predetermined thickness. A concave portion corresponding to the base plate part 4061 is formed in a space (S) (not shown, refer to FIG. 7B) among mutually facing surfaces of the wall parts 62 and 63 of the outer member 4060 (that is, the concave portion is formed in a region surrounded by the base plate part 4061, the first wall parts 62, and the second wall parts 63). A portion of a bracket member 4030 is fitted in the concave portion.

In the vibration isolation apparatus 4001, the base plate part 4061 protrudes toward the internal cylinder member 40, and the height of the base plate part 4061 increases gradually from about the center of the base plate part 4061 toward one of the first wall parts 62. Therefore, the spring constant of the vibration isolation apparatus 4001 can be increased only in the up and down directions of the vehicle (the directions of arrows U and D) while preventing the spring constant from increasing in the front and back directions of the vehicle (the directions of arrows F and B) and the left and right directions of the vehicle (the directions of arrows L and R).

Further, a region of the base plate part 4061 defined from the vicinity of the highest portion to the other of the first wall parts 62 (the upper first wall part 62 in FIGS. 23A and 24A) is curved in an arc shape so that the region is convex toward the backside of the base plate part 4061 (refer to FIG. 24A). Therefore, a portion connecting the highest portion of the protrusion 4061 and the outer surface of the internal cylinder member 40 can have a short length, and a portion connecting the region of the base plate part 4061 and the outer surface of the internal cylinder member 40 can have a long length and large rubber volume. This structure is effective to increase the spring constant in the up and down directions of the vehicle (the directions of the arrows U and D) while preventing the spring constant from increasing in the front and back directions of the vehicle (the directions of the arrows F and B) and the left and right directions of the vehicle (the directions of arrows L and R).

Figure 27B:
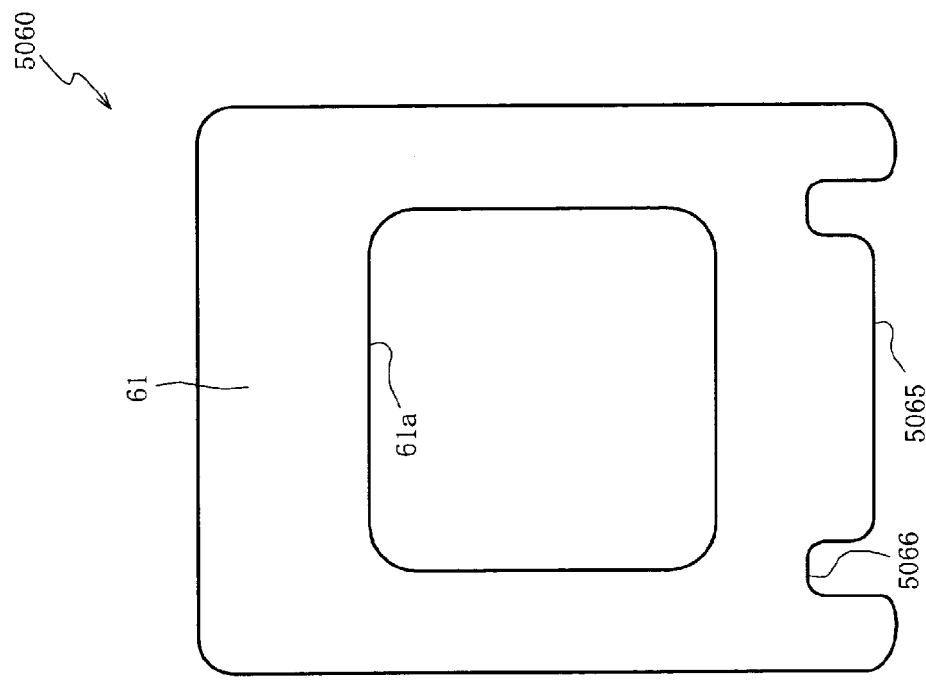
FIG. 27B is a front view illustrating the outer member.
Figure 27A:
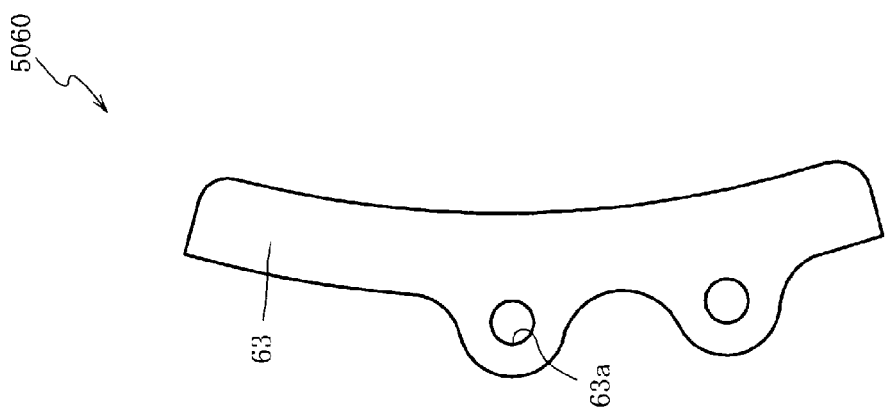
FIG. 27A is a side view illustrating the outer member.

Next, a fifth embodiment will be described with reference to FIGS. 26 to 30. FIG. 26A is a perspective view illustrating an outer member 5060 according to the fifth embodiment, and FIG. 26B is a side view of the outer member 5060 taken in the direction of an arrow XXVIb. FIG. 27A is a side view illustrating the outer member 5060, and FIG. 27B is a front view illustrating the outer member 5060.

In the outer member 60 of the first embodiment, the first wall parts 62 and the second wall parts 63 extending from the base plate part 61 are connected along the periphery of the base plate part 61. However, in the outer member 5060 of the fifth embodiment, a fitting notch 5065 is formed in a portion of the first wall parts 62, and thus the first wall parts 62 and the second wall parts 63 are partially discontinuous along the periphery of the outer member 5060. The same elements as those of the previous embodiments will be denoted by the same reference numerals, and description thereof will not be repeated.

The outer member 5060 of the fifth embodiment has the same structure as that of the outer member 60 of the first embodiment except for the fitting notch 5065 and fitting recess portions 5066. Thus, the same elements are denoted by the same reference numerals, and descriptions thereof are not repeated.

As shown in FIGS. 26 and 27, the fitting notch 5065 is formed in one of the pair of first wall parts 62. The fitting notch 5065 is formed as a depression portion by cutting a center region of one of the first wall parts 62 in a width direction (left-to-right direction in FIG. 26B) while leaving both end portions connected to the second wall parts 63.

Further, the first wall part 62 in which the fitting notch 5065 is formed is located at a position (lower side in FIG. 27A) to which holes 63a are close, and is close to an injection gate mark 30a (refer to FIG. 2A).

The pair of fitting recess portions 5066 are formed in the base plate part 61. The pair of fitting recess portions 5066 are disposed at both sides (left and right sides in FIG. 26B) in the width direction of the fitting notch 5065. The fitting recess portions 5066 are formed by making recesses in the base plate part 61 toward a penetration hole 61a. Therefore, the outer member 5060 may easily be formed through a drawing process using a press machine although the fitting notch 5065 has to be formed in the outer member 5060. That is, the first wall part 62 remaining at both sides of the fitting notch 5065 can be easily formed.

Figure 28:
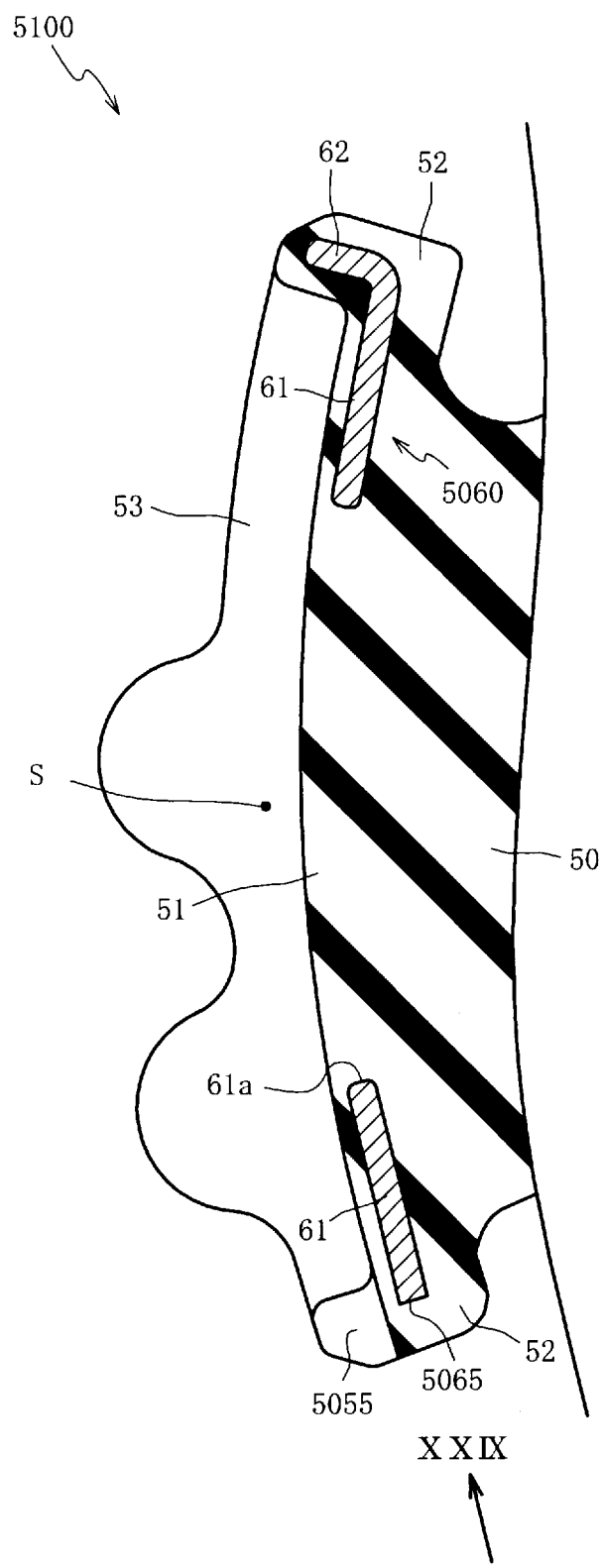
FIG. 28 is a partially enlarged sectional view illustrating a first molding product.

Next, a first molding product 5100 of the fifth embodiment will be described with reference to FIGS. 28 and 29. FIG. 28 is a partially enlarged sectional view of the first molding product 5100. FIG. 28 corresponds to FIG. 7B. Further, FIG. 29 is a side view of the first molding product 5100 taken in the direction of an arrow XXIX of FIG. 28.

The first molding product 5100 of the fifth embodiment has the same structure as the first molding product 100 of the first embodiment except for a rubber notch 5055. Thus, the same elements are denoted by the same reference numerals, and descriptions thereof are not repeated.

Figure 29:
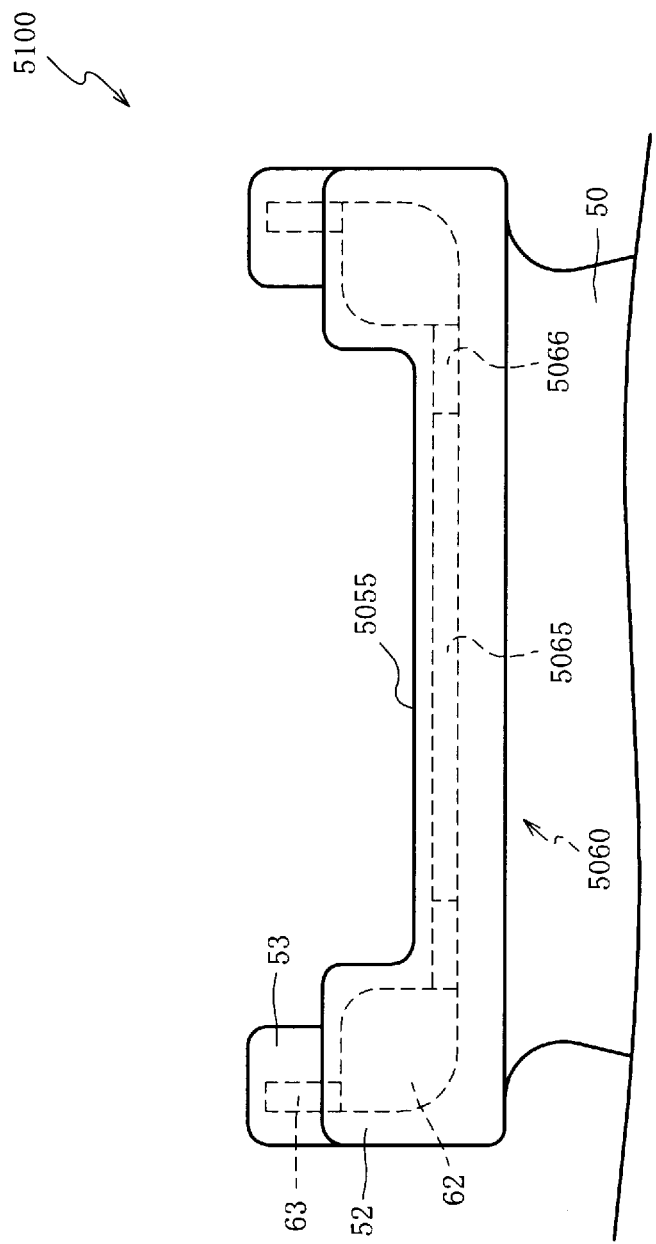
FIG. 29 is a side view of the first molding product taken in the direction of an arrow XXIX of FIG. 28.

As shown in FIGS. 28 and 29, the rubber notch 5055 is formed in one of first wall covering rubber parts 52. That is, since the first wall covering rubber parts 52 cover the outer surfaces of the first wall parts 62 to a constant thickness, the rubber notch 5055 slightly smaller than the fitting notch 5065 (by the covering thickness of rubber) is formed as a depression portion at a position corresponding to the position of the fitting notch 5065 formed in the first wall part 62.

Further, as shown in FIG. 28, the bottom surface of the rubber notch 5055 (lower surface in FIGS. 28 and 29) extends on the same plane as the top surface of a base plate covering rubber portion 51. Therefore, a resin material can easily flow (described later). In addition, since the rubber notch 5055 is formed at a position corresponding to the position of the fitting notch 5065, the first wall covering rubber part 52 in which the rubber notch 5055 is formed is close to an injection gate mark 30a (refer to FIG. 2A).

Figure 30B:
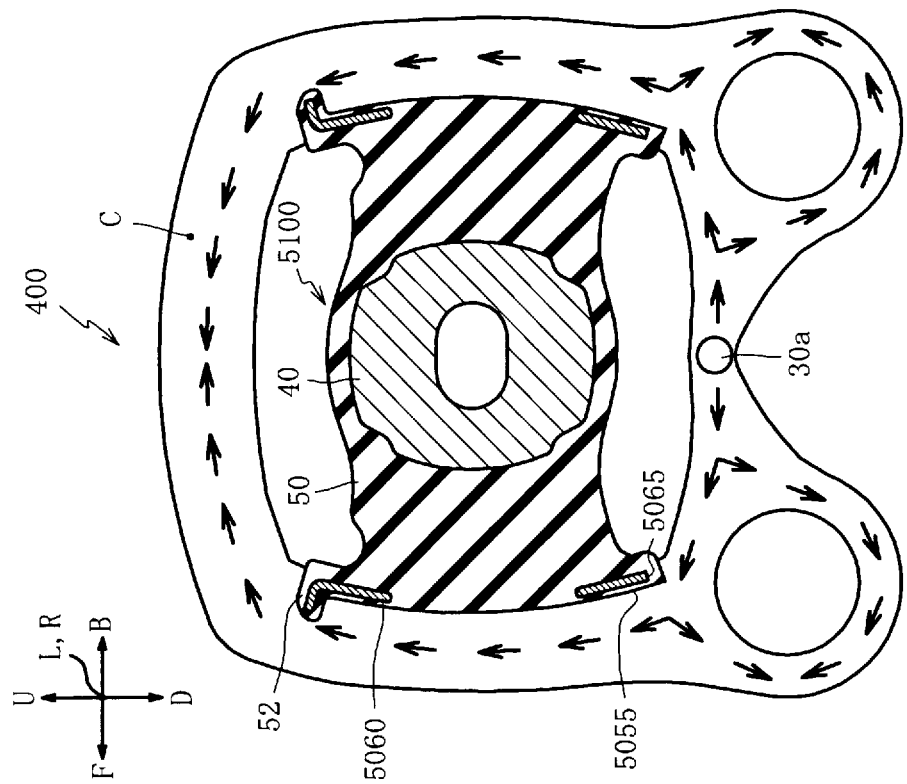
FIGS. 30A and 30B are schematic views in which flows of resin mold in a resin molding process are indicated by arrows.
Figure 30A:
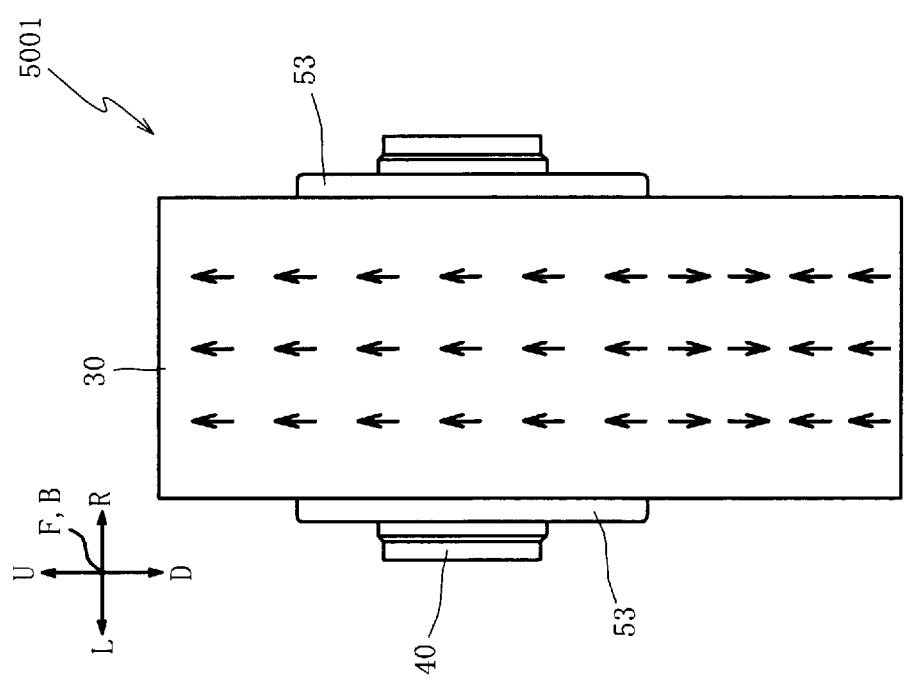

Next, with reference to FIG. 30, an explanation will be given on a resin molding process for inserting the first molding product 5100 in a bracket member 30. FIGS. 30A and 30B are schematic views in which flows of resin material in a resin molding process are indicated by arrows. FIG. 30A is a schematic side view illustrating a vibration isolation apparatus 5001, and FIG. 30B is a schematic view illustrating a state where the first molding product 5100 is placed in a resin mold 400.

As shown in FIGS. 30A and 30B, in a resin molding process, first, the first molding product 5100 is placed in the resin mold 400, and the resin mold 400 is closed. Then, a cavity (C) is formed in the resin mold 400 as a space for filing and hardening a resin material, and a resin material is filled (injected) in the cavity (C) through an injection gate (refer to an injection gate mark 30a in FIG. 30A). The injected resin material flows left and right from the injection gate so that the resin material is filled around press-fitting holes in which bushings will be press-fitted. Further, the resin material flows upward along both sides of the first molding product 5100 to fill regions corresponding to lateral walls of a bracket member 30. Lastly, the flows of the resin material meet each other at the topside of the resin mold 400 to fill a region corresponding to the topside of the bracket member 30.

In the first molding product 5100, the rubber notch 5055 is formed in one of the pair of first wall covering rubber parts 52 close to the injection gate. Therefore, when the resin material injected into the cavity (C) of the resin mold 400 through the injection gate is in a state of flowing upward along both sides of the first molding product 5100, the pressure of the flowing resin material can be relieved by the rubber notch 5055, and thus the first wall covering rubber parts 52 may be less pushed by the resin material. This reduces positional deviation of a vibration isolation leg 50 and sealing errors caused by deformation of the first wall covering rubber parts 52, and thus generation of resin burrs can be suppressed in the vicinity of second wall covering rubber parts 53. As a result, the elastic stopper function of the second wall covering rubber parts 53 can be ensured.

Owing to the rubber notch 5055, flows of the resin material are not disturbed but the fluidity of the resin material can be improved. Thus, the injection pressure of the resin material can be reduced.

Further, in the vibration isolation apparatus 5001, since the fitting notch 5065 is formed in the outer member 5060 in a state where both end portions of the first wall part 62 remain (refer to FIGS. 26A and 26B), an engagement area (refer to the area of a region including a length L in FIG. 16) corresponding to the remaining portions of the first wall part 62 can be ensured between the bracket member 30 and the outer member 5060, and thus separation of the other end of the vibration isolation leg 50 from the bracket member 30 can be prevented.

Particularly, in the embodiment, since both end portions of the first wall part 62 remaining on both sides of the fitting notch 5065 are connected to the second wall parts 63, fitting strength can be ensured. Therefore, the vibration isolation leg 50 can be engaged with the bracket member 30 more rigidly, and thus separation of the other end of the vibration isolation leg 50 from the bracket member 30 can be surely prevented.

Further, since the fitting notch 5065 is formed in a state where both end portions of the first wall part 62 remain, the rubber notch 5055 can be formed as a depression portion, and thus the yield of a manufacturing process of the vibration isolation apparatus 5001 can be improved. That is, if plural rubber notches are formed in each of the first wall covering rubber parts 52, when a resin material flows upward along both sides of the first molding product 5100, the flow of the resin material may split into plural branches to cause fusion zones of the resin material and weld lines. However, according to the embodiment, since the rubber notch 5055 is formed as one depression portion, fusion zones of a resin material may not be formed, and thus the yield may be improved.

Figure 31:
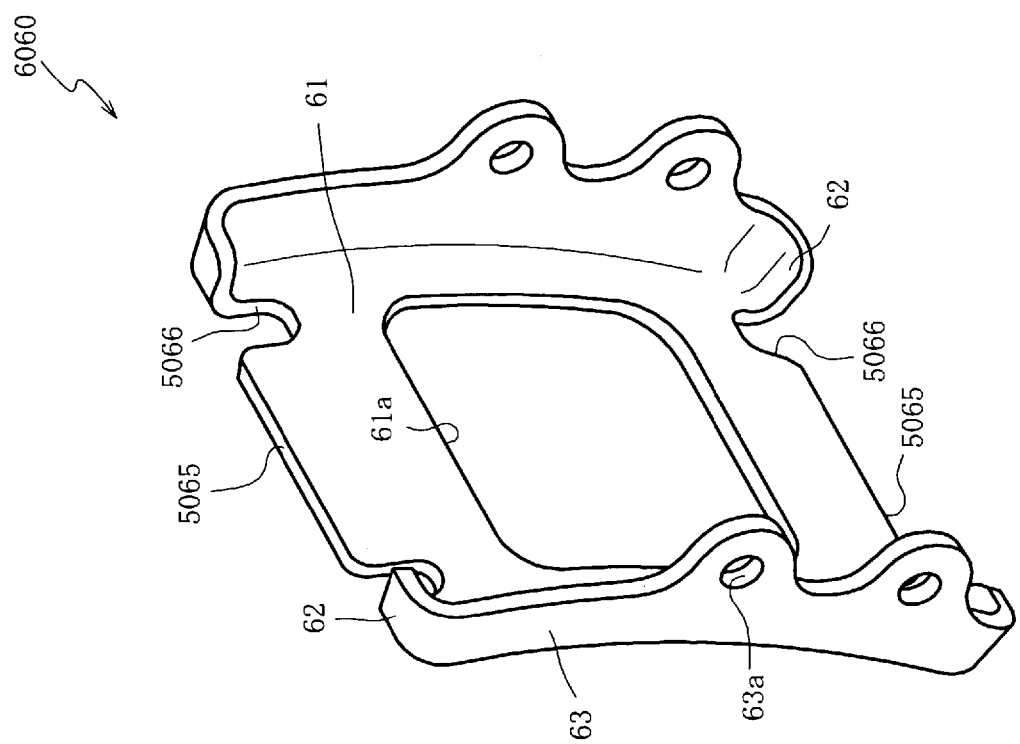
FIG. 31 is a perspective view illustrating an outer member according to a sixth embodiment.

Next, a sixth embodiment will be described with reference to FIG. 31. FIG. 31 is a perspective view illustrating an outer member 6060 according to the sixth embodiment.

In the fifth embodiment, the fitting notch 5065 is formed in one of the pair of first wall parts 62 of the outer member 5060. In the sixth embodiment, fitting notches 5065 are formed in a pair of first wall parts 62 of an outer member 6060. The same elements as those of the previous embodiments will be denoted by the same reference numerals, and description thereof will not be repeated.

The outer member 6060 of the sixth embodiment has the same structure as that of the outer member 5060 of the fifth embodiment except for the number of the fitting notches 5065 and the number of fitting recess portions 5066. In other words, as compared with the outer member 5060 of the fifth embodiment, the outer member 6060 of the sixth embodiment includes an additional fitting notch 5065 and an additional fitting recess portion 5066 which are disposed at opposite positions facing the other fitting notch 5065 and the fitting recess portion 5066. Thus, the same elements are denoted by the same reference numerals, and description thereof are not repeated.

Since the first wall parts 62 of the outer member 6060 are covered with first wall covering rubber parts 52 having a constant thickness, rubber notches 5055 (refer to FIGS. 28 and 29) are formed respectively in the first wall covering rubber parts 52 of a first molding product (not shown) of the six embodiment (that is, the rubber notch 5055 is formed in the first wall covering rubber part 52 distant from an injection gate as well as in the first wall covering rubber part 52 close to the injection gate).

Therefore, the rubber notches 5055 can function as an inlet and outlet of a resin material for a space (S) (refer to FIG. 28) surrounded by the pair of first covering rubber parts 52 and a pair of second wall covering rubber parts 53. Therefore, when the first molding product is inserted in an bracket member 30, a resin material injected into a cavity (C) of a resin mold 400 through an injection gate can smoothly flow upward along both sides of the first molding product (refer to FIG. 30B), and thus the first wall covering rubber parts 52 may be less pushed by the resin material.

This reduces positional deviation of a vibration isolation leg 50 and sealing errors caused by deformation of the first wall covering rubber parts 52, and thus generation of resin burrs can be suppressed in the vicinity of the second wall covering rubber parts 53. As a result, the elastic stopper function of the second wall covering rubber parts 53 can be ensured. Further, owing to the two rubber notches 5055, the fluidity of the resin material is not reduced but can be further improved. Thus, the injection pressure of the resin material can be reduced. As a result, the injection pressure of the resin material can be reduced.

Figure 32B:
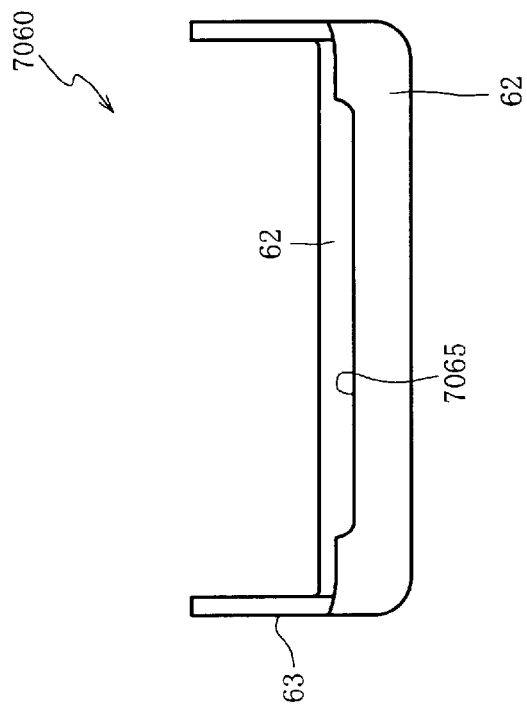
FIG. 32B is a side view of the outer member taken in the direction of an arrow XXXIIb of FIG. 32A.
Figure 32A:
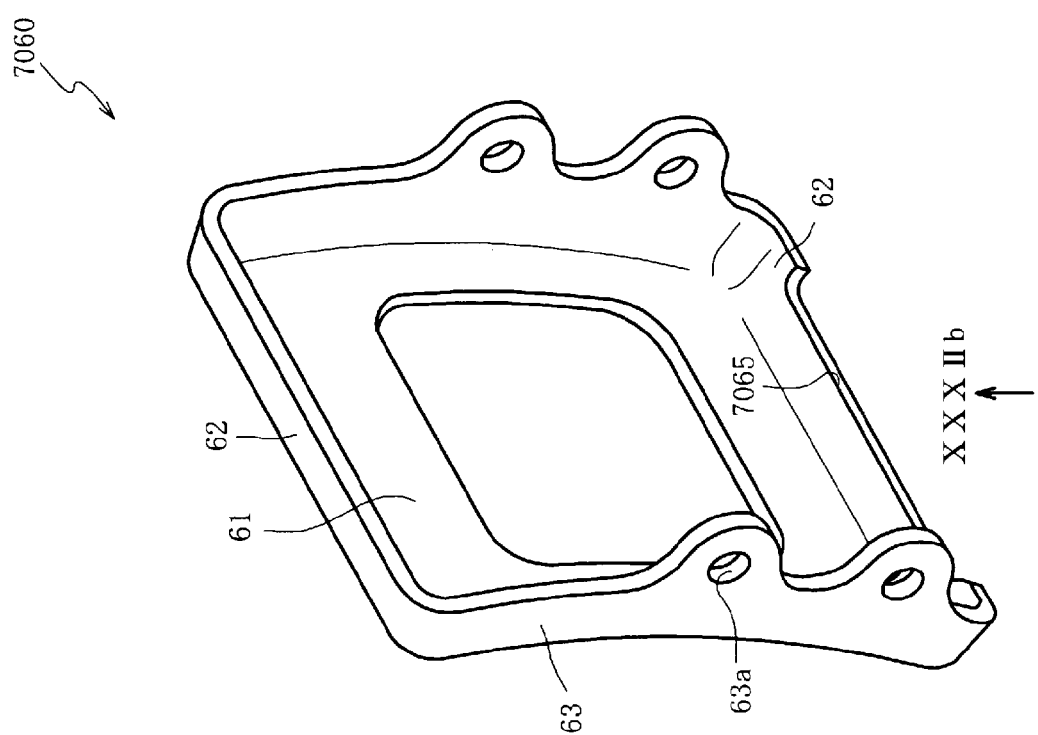
FIG. 32A is a perspective view illustrating an outer member according to a seventh embodiment.
Figure 33B:
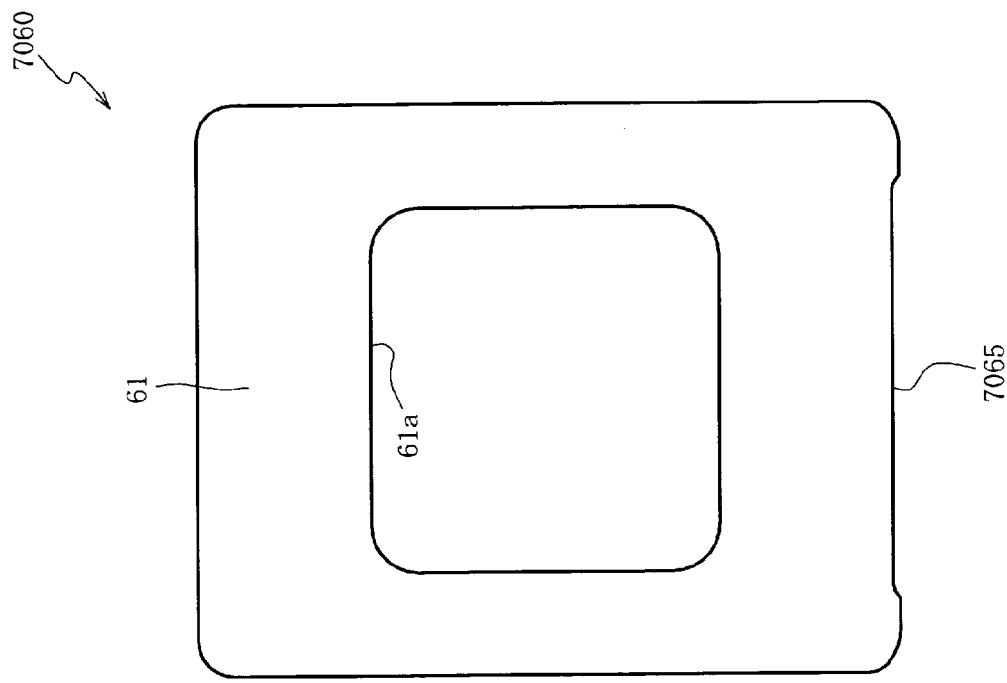
FIG. 33B is a front view illustrating the outer member.
Figure 33A:
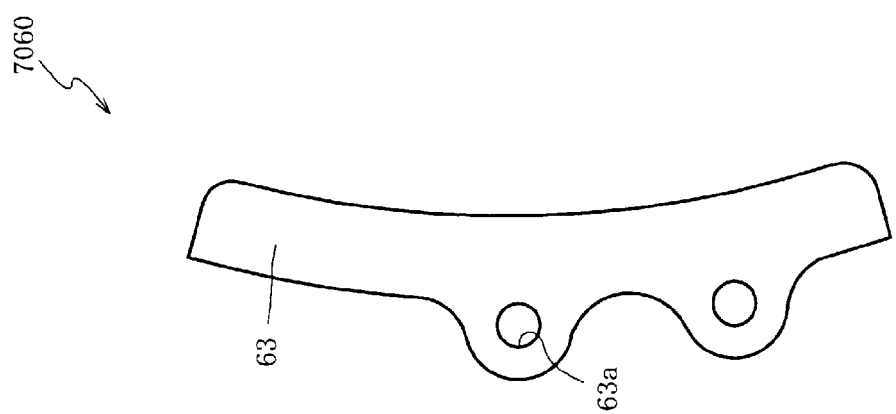
FIG. 33A is a side view illustrating the outer member.

Next, a seventh embodiment will be described with reference to FIGS. 32 to 35. FIG. 32A is a perspective view illustrating an outer member 7060 according to the seventh embodiment, and FIG. 32B is a bottom view of the outer member 7060 taken in the direction of an arrow XXXIIb. FIG. 33A is a side view illustrating the outer member 7060, and FIG. 33B is a front view illustrating the outer member 7060.

In the outer member 60 of the first embodiment, the first wall parts 62 and the second wall parts 63 extending from the base plate part 61 are connected along the periphery of the base plate part 61. However, in the outer member 7060 of the seventh embodiment, a fitting notch 7065 is formed in a portion of a first wall part 62 in a state where first wall parts 62 and second wall parts 63 are continuously connected along the periphery of the outer member 7060. The same elements as those of the previous embodiments will be denoted by the same reference numerals, and description thereof will not be repeated.

The outer member 7060 of the seventh embodiment has the same structure as that of the outer member 60 of the first embodiment except for the fitting notch 7065. Thus, the same elements will be denoted by the same reference numerals, and descriptions thereof will not be repeated.

As shown in FIGS. 32 and 33, the fitting notch 7065 is formed in one of the pair of first wall parts 62. The fitting notch 7065 is formed as a depression portion by cutting only a center region of an end side (upper side in FIG. 32B) of the first wall part 62 in the width direction (left-to-right direction in FIG. 32B) of the first wall part 62. That is, both end portions of the first wall part 62 connected to the second wall parts 63, and a portion of the first wall part 62 connecting both the end portions to each other and to a base plate part 61 are not cut.

Further, the first wall part 62 in which the fitting notch 7065 is formed is located at a position (lower side in FIG. 33A) to which holes 63a are close, and is close to an injection gate mark 30a (refer to FIG. 2A).

Figure 34:
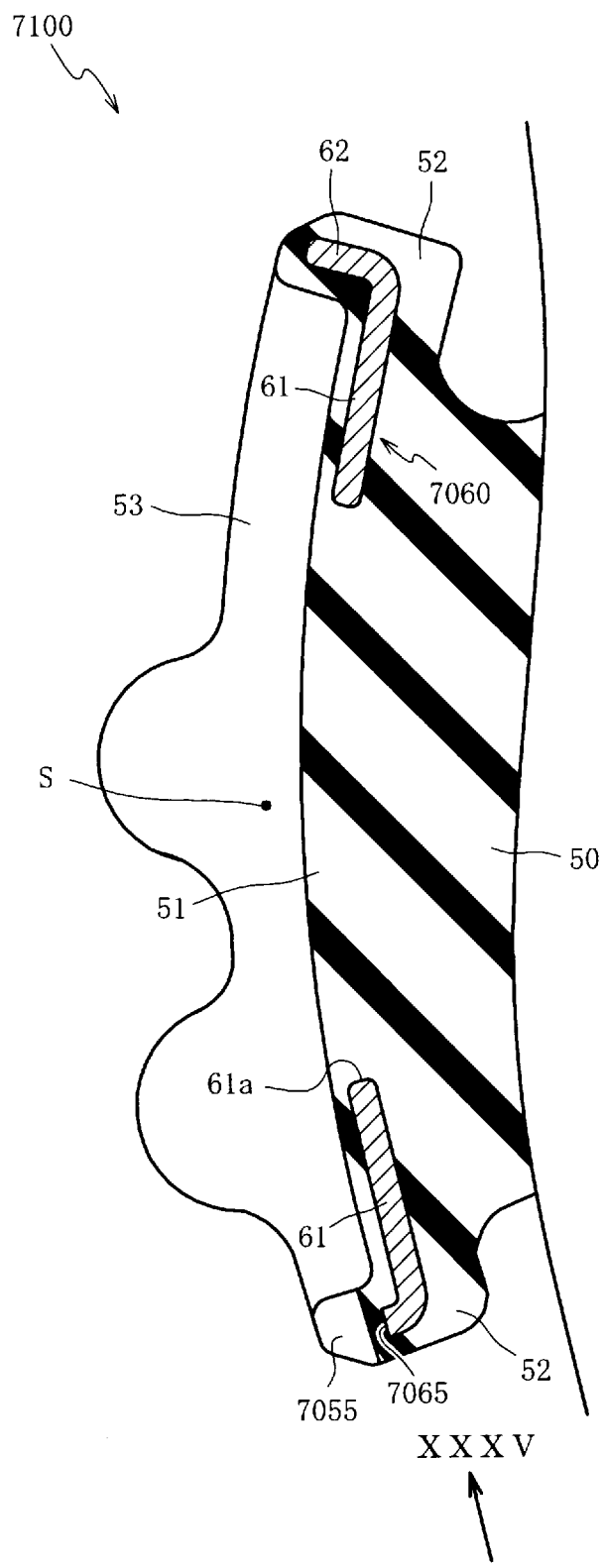
FIG. 34 is a partially enlarged sectional view illustrating a first molding product.
Figure 36B:
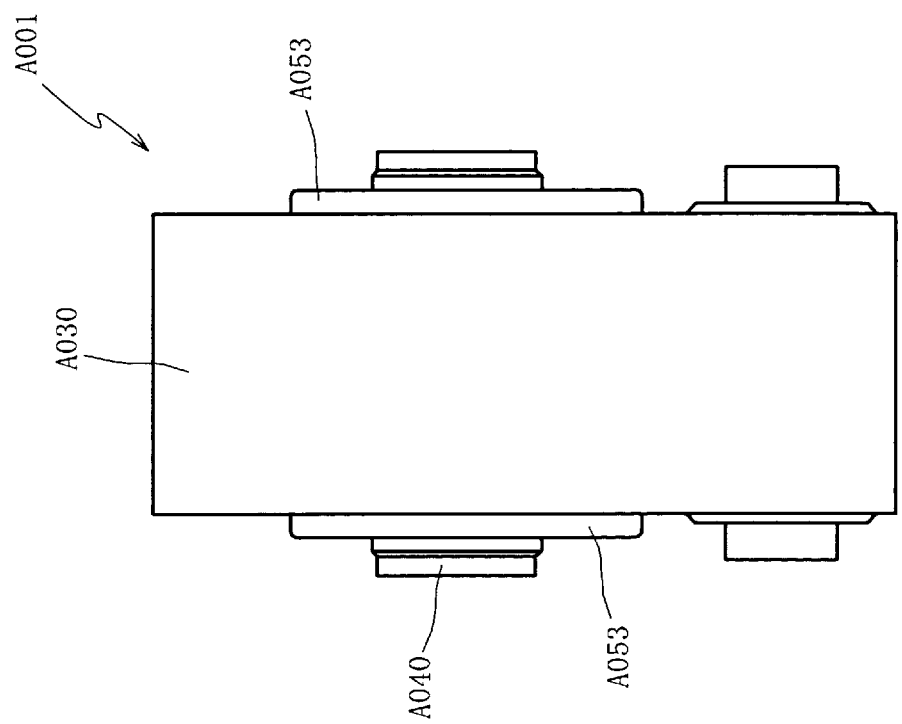
FIG. 36B is a side view illustrating the vibration isolation apparatus.
Figure 36A:
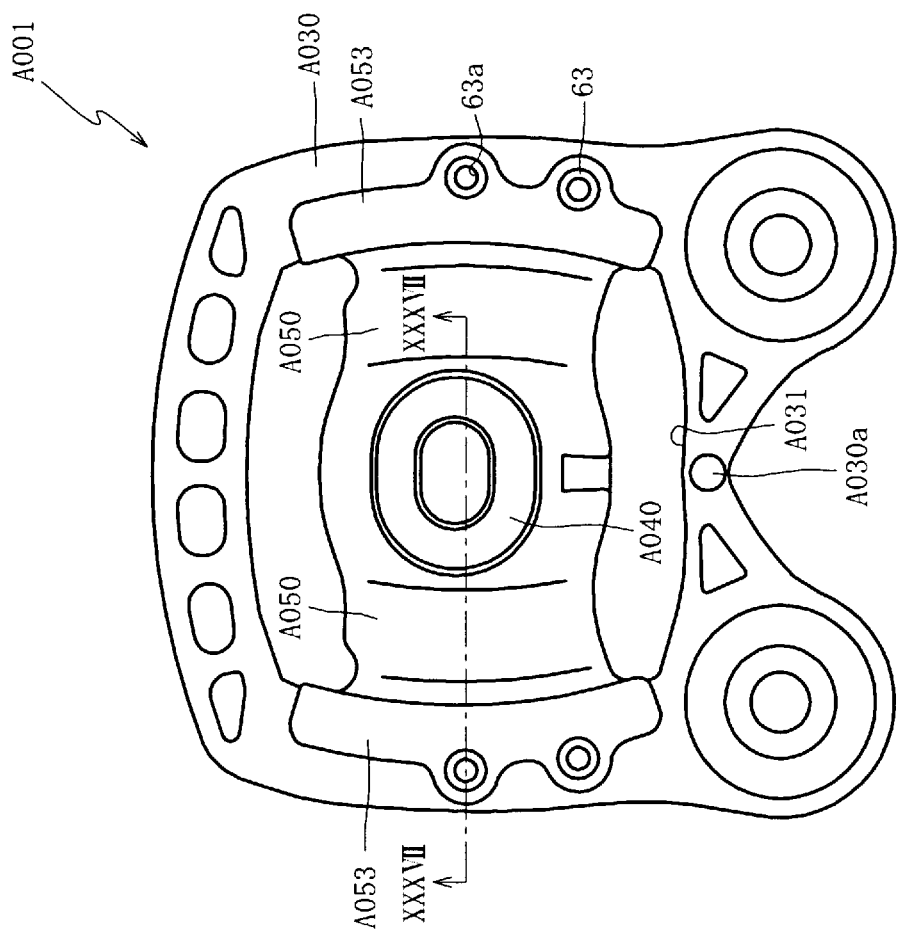
FIG. 36A is a front view illustrating a vibration isolation apparatus.
Figure 37:
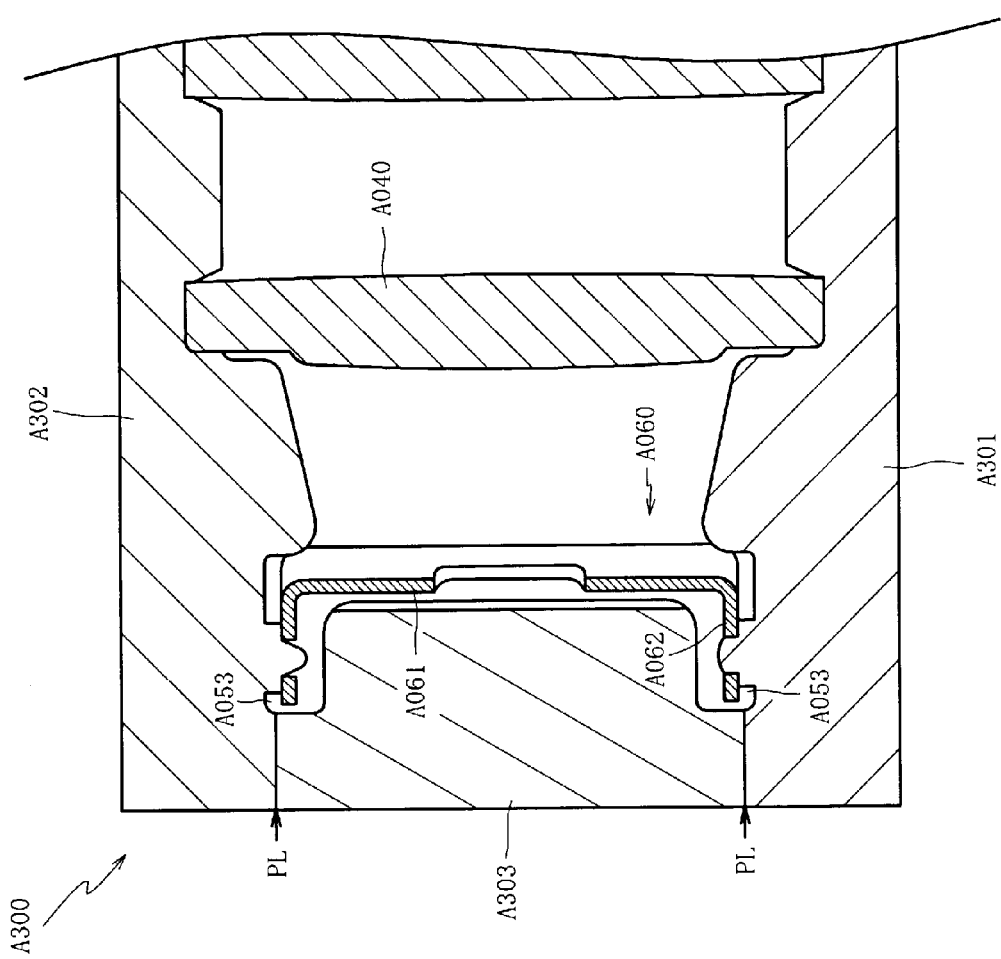
FIG. 37 is a sectional view illustrating a closed rubber vulcanization mold.
Figure 38:
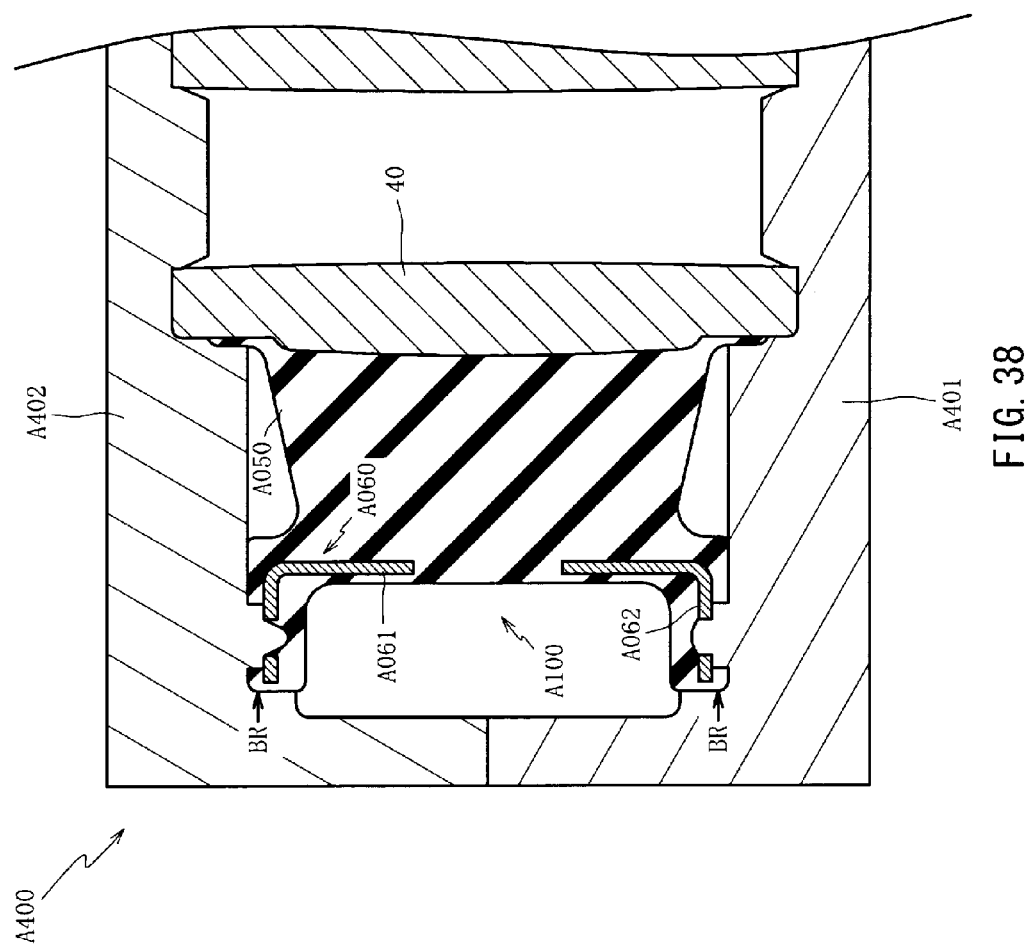
FIG. 38 is a sectional view illustrating a closed resin mold.

Next, a first molding product 7100 of the seventh embodiment will be described with reference to FIGS. 34 and 35. FIG. 34 is a partially enlarged sectional view of the first molding product 7100. FIG. 34 corresponds to FIG. 7B. Further, FIG. 35 is a side view of the first molding product 7100 taken in the direction of an arrow XXXV of FIG. 34.

The first molding product 7100 of the seventh embodiment has the same structure as the first molding product 100 of the first embodiment except for a rubber notch 7055. Thus, the same elements will be denoted by the same reference numerals, and descriptions thereof will not be repeated.

As shown in FIGS. 34 and 35, the rubber notch 7055 is formed in one of first wall covering rubber parts 52. That is, since the first wall covering rubber parts 52 cover the outer surfaces of the first wall parts 62 to a constant thickness, the rubber notch 7055 slightly smaller than the fitting notch 7065 (by the covering thickness of rubber) is formed as a depression portion at a position corresponding to the position of the fitting notch 7055 formed in the first wall part 62.

Further, as shown in FIG. 34, the bottom surface of the rubber notch 7055 (lower surface in FIGS. 34 and 35) is higher than the top surface of a base plate covering rubber portion 51. In addition, since the rubber notch 7055 is formed at a position corresponding to the position of the fitting notch 7065, the first wall covering rubber part 52 in which the rubber notch 7055 is formed is close to an injection gate mark 30a (refer to FIG. 2A).

Therefore, when a resin material injected into a cavity (C) of a resin mold 400 through an injection gate is in a state of flowing upward along both sides of the first molding product 7100 (refer to FIG. 30), the pressure of the flowing resin material can be relieved by the rubber notch 7055, and thus the first wall covering rubber parts 52 may be less pushed by the resin material. This reduces positional deviation of a vibration isolation leg 50 and sealing errors caused by deformation of the first wall covering rubber parts 52, and thus generation of resin burrs can be suppressed in the vicinity of second wall covering rubber parts 53. As a result, the elastic stopper function of the second wall covering rubber parts 53 can be ensured.

Owing to the rubber notch 7055, flows of the resin material are not disturbed but the fluidity of the resin material can be improved. Thus, the injection pressure of the resin material can be reduced.

Further, in the vibration isolation apparatus of the seventh embodiment, since the fitting notch 7065 is formed in the outer member 7060 in a manner such that both end portions of the first wall part 62 and a portion of the first wall part 62 connecting both the end portions to each other and to the base plate part 61 are not removed (refer to FIGS. 32A and 32B), an engagement area corresponding to the remaining portions of the first wall part 62 can be ensured between a bracket member 30 and the outer member 7065 (refer to the area of a region including a length L, and the area of a region not including the length L but engaged with the bracket member 30 in FIG. 16), and thus separation of the other end of the vibration isolation leg 50 from the bracket member 30 can be prevented.

Particularly, in the embodiment, both end portions of the first wall part 62 remaining on both sides of the fitting notch 7065 are connected to the second wall parts 63, and furthermore, both the end portions are connected to each other through a portion of the first wall part 62 adjoining the base plate part 61. Therefore, as much fitting strength as that can be ensured. Therefore, the vibration isolation leg 50 can be engaged with the bracket member 30 more rigidly, and thus separation of the other end of the vibration isolation leg 50 from the bracket member 30 can be surely prevented.

Further, since the rubber notch 7055 is formed as a depression portion, when the first molding product 7100 is inserted in the bracket member 30, generation of fusing zones of a resin material can be suppressed, and the yield of a manufacturing process of a vibration isolation apparatus can be improved.

While embodiments of the present invention have been described, the present invention is not limited thereto, and it will be easily understood that many modifications are possible within the scope and spirit of the present invention.

Numeral values mentioned in the above-described embodiments are exemplary values. That is, other numeral values may be applied. For example, the holes 63a are formed in the pair of second wall parts 63 at four positions in the above-described embodiments. However, the holes 63a may be formed at three positions or five or more positions. For example, two holes 63a may be formed in one of the pair of second wall parts 63, and one hole 63a may be formed in the other of the pair of second wall parts 63. If the minimal number of the holes 63a is ensured, rotation or falling of the outer member 60 can be surely prevented in a vulcanization process.

Further, in the above-described embodiments, the same number of holes 63a is allocated to each of the pair of second wall parts 63 so that a drawing process or a drilling process can be symmetrically performed to improve precision.

In the above-described embodiments, the outer member (60 to 7060) is manufactured from a single flat plate (flat blank) through a drawing process using a press machine. However, the present invention is not limited thereto. That is, other manufacturing methods may be used. For example, the outer member may be manufactured by fixedly welding plural plate materials or cutting a rectangular parallelepiped material.

In the above-described embodiments, the pair of first wall parts 62 that face each other are entirely widened in a direction away from the base plate part (61, 2061 to 4061) (that is, the space between the pair of first wall parts 62 is entirely widened). However, the present invention is not limited thereto as long as at least a portion of the pair of first wall parts 62 is engageable with the bracket member 30. Here, the term "engageable" means that when the outer member (60 to 7060) is moved in a direction where the first wall parts 62 are separated from the bracket member 30, movement of the first wall parts 62 in the separation direction can be restricted by the resin material of the bracket member 30. Therefore, for example, portions (right portions in FIG. 4A) of the first wall parts 62 adjoining the base plate part 61 may be parallel with each other, and only the other portions (portions opposite to the base plate part 61, left portions in FIG. 4A) of the first wall parts 62 may be widened (the space between the other portions may be widened). Alternatively, the pair of first wall parts 62 may include: portions extending in parallel with each other to the same height as the second wall parts 63; and flange portions folded inward or outward from the ends (left ends in FIG. 4A) of the portions. In any of the cases, the second wall parts 63 are engageable with the bracket member 30.

In the above-described embodiments, ends of the pair of first wall parts 62 and the pair of the second wall parts 63 are connected to each other. However, the present invention is not limited thereto. For example, ends of the first wall parts 62 and the second wall parts 63 may be partially or entirely disconnected.

In the above-described embodiments, the penetration hole (61a and 2061a to 4061a) is formed through the base plate part (61, 2061 to 4061). The present invention is not limited thereto. For example, the penetration hole (61a, 2061a to 4061a) may not be formed. Further, the shape of the penetration hole (61a, 2061a to 4061a) is not limited to a rectangular shape when viewed from the front. For example, the penetration hole (61a, 2061a to 4061a) may have a curved shape such as a circular or elliptical shape or a polygonal shape such as a triangular or pentagonal shape. In addition, one or more penetration holes (61a, 2061a to 4061a) may be formed.

In the above-described first embodiment, the outer member 60 is buried in the other end of the vibration isolation leg 50. However, the present invention is not limited thereto. For example, the outer member 60 may not be buried. For example, in a rubber vulcanization process, only the internal cylinder member 40 may be placed in the rubber vulcanization mold 300 to form the first molding product 100 without the outer member 60, and then the first molding product 100 may be placed in the resin mold 400 to perform an insertion process for forming the vibration isolation apparatus 1. Even in this case, rubber burrs can be buried in a resin material. That is, the effect of burring rubber burrs in a resin material can be obtained like in the above-described first embodiment.

Further, in this case, it may be possible not to pins 301b, 302b, 401b, and 402b such as the rubber lower mold pins 301b and the resin lower mold pins 401b, and seat parts 301c, 302c, 401c, and 402c such as the rubber lower mold seat parts 301c and the resin lower mold seat parts 401c. Even in this case, like in the case where the outer member 60 is buried, separation of the vibration isolation leg 50 from the bracket member 30 can be prevented owing to: fitting of the bracket member 30 in the concave space (S) (refer to FIGS. 7A and 7B) of the other end of the vibration isolation leg 50; and engagement between the bracket member 30 and the sloped sides of the first wall covering rubber parts 52.

In the above-described fifth and sixth embodiments, the pair of fitting recess portions 5066 are formed in the base plate part 61. However, the present invention is not limited thereto. For example, the fitting recess portions 5066 may not be formed.

In the seventh embodiment, the fitting notch 7065 is formed in only one of the pair of first wall parts 62, and the rubber notch 7055 is formed in only one of the pair of first wall covering rubber parts 52. However, the present invention is not limited thereto. For example, like in the sixth embodiment, fitting notches 7065 may be formed in the pair of first wall parts 62, respectively and rubber notches 7055 may be formed in the pair of first wall covering rubber parts 52, respectively. Further, in this case, the shapes (areas) of the fitting notches 7065 may be different from one to the other of the first wall parts 62, and the shapes (areas) of the rubber notches 7055 may be different from one to the other of the first wall covering rubber parts 52. This is the same as in the sixth embodiment.

Although not explained in the fifth to seventh embodiments, it may be preferable that the area (viewed from the front in FIGS. 29 and 35) of the rubber notch (5055, 7055) is 1% to 50% of the area of the first wall covering rubber part 52 in which the rubber notch (5055, 7055) is formed. More preferably, the area of the rubber notch (5055, 7055) may be 15% to 35% of the area of the first wall covering rubber part 52. The fluidity of a resin material can be improved by setting the area of the rubber notch (5055, 7055) to a predetermined value or more, and the strength of the outer member (5060, 7060) (the first wall parts 62) can be ensured by setting the area of the rubber notch (5055, 7055) to a predetermined value or less. This is the same for the area of the fitting notch (5065, 7065).

Combinations of the first embodiment and the other embodiments are possible. For example, the vibration isolation apparatus 1 of the first embodiment may include any of the outer members 2060 to 4060 of the second to fourth embodiments or any of the outer members 5060 to 7060 of the fifth to seventh embodiments, instead of the outer member 60. In another example, any of the outer members 2060 to 4060 of the second to fourth embodiments may be combined with any of the outer members 5060 to 7060 of the fifth to seventh embodiments so as to construct an outer member including: the protrusion part 2064 or 3064, or the base plate part 4061 as a protrusion part; and the fitting notch 5065 or 7065.

DESCRIPTION OF REFERENCE NUMERALS

1, 2001, 3001, 4001, 5001 Vibration isolation apparatus
30, 2030, 3030, 4030 Bracket member
31 Inner Hole
40 Internal cylinder member
50, 2050, 3050, 4050 Vibration isolation legs
51, 2051, 3051, 4051 Plate covering rubber
(plate covering rubber part)
52 First wall covering rubber parts
(a part of insert rubber parts, wall covering rubber parts)
53 Second wall covering rubber parts
(a part of insert rubber parts, wall covering rubber parts)
53a Sloped surfaces
(the outer surface of the insert rubber part)
5055, 7055 Rubber notch (notch)
60, 2060, 3060, 4060, 5060, 7060 Outer members
61, 2061, 3061, 4061 Base plate part
62 First wall parts (extension wall parts)
63 Second wall parts (wall parts, extension wall parts)
2064, 3064 Protrusion part
4061b Protrusion front part (a part of protrusion part)
4061c Protrusion side part (a part of protrusion part)
5065, 7065 Fitting notch (notch)
301 Lower mold
302 Upper mold
303 Middle mold
S Space
PL Parting lines

What is claimed is:

1. A vibration isolation apparatus comprising:
   an internal cylinder member attached to a vibration source or a vehicle body;
   a bracket member formed of a resin material and comprising an inner hole in which the internal cylinder member is disposed, the bracket member being attached to the other of the vibration source and the vehicle body;
   a pair of vibration isolation legs formed of an elastic material, the vibration isolation legs comprising ends connected to an outer surface of the internal cylinder member and the other ends connected to an inner surface of the inner hole of the bracket member by insert molding; and
   a pair of outer members formed of a metal material and buried respectively in the other ends of the vibration isolation legs,
   wherein the vibration isolation legs and the outer members are symmetrically arranged with the internal cylinder member being disposed therebetween, and an injection gate for injecting the resin material of the bracket member is disposed at a position spaced the same distance from the vibration isolation legs and the outer members,
   wherein each of the outer members comprises: a base plate part to which the other end of one of the vibration isolation legs is connected by vulcanization adhesion; and plate-shaped extension wall parts extending from outer edges of the base plate part toward the bracket member for being buried in the bracket member for engagement with the bracket member,
   wherein each of the vibration isolation legs comprises: a base plate covering rubber part that covers the base plate part of one of the outer members; and wall covering rubber parts extending from the base plate covering rubber part and covering the extension wall parts in a state where at least a portion of the wall covering rubber parts protrude from an outer surface of the bracket member,
   wherein a portion of the bracket member is fitted in a space surrounded by the base plate covering rubber part and the wall covering rubber parts,
   wherein a notch is formed in at least portions of the extension wall parts of the outer member and the wall covering rubber parts of the vibration isolation leg that are close to the injection gate.

2. The vibration isolation apparatus according to claim 1, wherein the base plate part of respective outer members has a rectangular front shape, and the plate shaped extension wall parts include four extension wall parts respectively extending from four sides of the base plate part toward the bracket member in a state where the four extension wall parts are connected to each other along a periphery of the base plate part, and mutually facing two sides of the base plate part are parallel with a circumferential direction of the inner hole of the bracket member,
   wherein the notch is formed as a depression portion in one of the four extension wall parts close to the injection gate and one of the wall covering rubber parts covering the extension wall part in which the notch is formed, and the notch is formed in a manner such that at least both end portions of the extension wall part in which the notch is formed are not removed and the both end portions respectively adjoin two of the four extension wall parts extending in the circumferential direction.

3. The vibration isolation apparatus according to claim 2, wherein the notch is formed as a depression portion in one of the four extension wall parts close to the injection gate and one of the wall covering rubber parts covering the extension wall part in which the notch is formed in a manner such that the notch is formed only in an end side of the extension wall part so that both end portions of the extension wall part in which the notch is formed and a portion of the extension wall part in which the notch is formed connected to the both end portions and the base plate part are not removed, and the both end portions respectively adjoin the two of the four extension wall parts extending in the circumferential direction.

4. The vibration isolation apparatus according to claim 2, wherein another notch is formed in one of the four extension wall parts opposite to the extension wall part close to the injection gate and in one of the wall covering rubber parts covering the one of the four extension wall parts opposite to the extension wall part close to the injection gate.

5. The vibration isolation apparatus according to claim 3, wherein another notch is formed in one of the extension wall parts opposite to the extension wall part close to the injection gate and one of the wall covering rubber parts covering the opposite extension wall part.

* * * * *